(12) United States Patent
Frampton et al.

(10) Patent No.: US 10,778,123 B2
(45) Date of Patent: Sep. 15, 2020

(54) SYNCHRONOUS INVERTER

(71) Applicant: Kohler Co., Kohler, WI (US)

(72) Inventors: Isaac S. Frampton, Strattanville, PA (US); Adam Larson, Mequon, WI (US)

(73) Assignee: Kohler Co., Kohler, WI (US)

( * ) Notice: Subject to any disclaimer, the term of this patent is extended or adjusted under 35 U.S.C. 154(b) by 0 days.

(21) Appl. No.: 15/843,833

(22) Filed: Dec. 15, 2017

(65) Prior Publication Data

US 2018/0167002 A1    Jun. 14, 2018

Related U.S. Application Data

(63) Continuation-in-part of application No. 15/287,485, filed on Oct. 6, 2016, now Pat. No. 10,148,202, which
(Continued)

(51) Int. Cl.
*H02P 5/00*      (2016.01)
*H02P 5/74*      (2006.01)
(Continued)

(52) U.S. Cl.
CPC ............... *H02P 5/74* (2013.01); *B60L 1/00* (2013.01); *B60L 1/003* (2013.01); *B60L 1/20* (2013.01); *B60L 58/10* (2019.02); *H02J 7/0068* (2013.01); *H02J 7/022* (2013.01); *H02J 7/1492* (2013.01); *H02J 7/2434* (2020.01); *H02K 19/26* (2013.01);
(Continued)

(58) Field of Classification Search
CPC .. H02P 9/30; H02P 9/08; H02P 27/16; H02M 7/00; H02M 5/00; H02M 5/02; H02M 5/293; H20M 11/00; H20M 2001/0077; H02J 7/1492

USPC .... 322/59, 44, 28, 89, 7; 180/65.26, 65.512; 290/40 C, 40 R; 56/14.8, 14.7, 10.1
See application file for complete search history.

(56) References Cited

U.S. PATENT DOCUMENTS

| | | |
|---|---|---|
| 3,641,418 A | 2/1972 | Plette |
| 3,659,168 A | 4/1972 | Salihi et al. |

(Continued)

FOREIGN PATENT DOCUMENTS

| | | | |
|---|---|---|---|
| CN | 102150357 A | 8/2011 |
| GB | 2160027 A | 12/1985 |

(Continued)

OTHER PUBLICATIONS

Bhavsar et al., Topological Advancements in Matrix Converter Technology: A Review Paper, Dec. 2013, vol. 2, Issue 12, International Journal of Advanced Research in Electronics and Instrumentation.
(Continued)

*Primary Examiner* — Julio C. Gonzalez
(74) *Attorney, Agent, or Firm* — Lempia Summerfield Katz LLC

(57) ABSTRACT

An apparatus includes a first inverter circuit and a second inverter circuit. The first inverter circuit is configured to couple an alternator and a load device to deliver a driving signal from the alternator to the load device. The second invertor circuit is configured to couple the alternator to the load device to deliver a driving signal from the alternator to the load device and configured to couple a battery to the alternator to deliver a charging signal from the alternator the battery.

20 Claims, 57 Drawing Sheets

Related U.S. Application Data is a continuation-in-part of application No. 15/175,761, filed on Jun. 7, 2016, now Pat. No. 10,063,097, which is a continuation-in-part of application No. 14/885,112, filed on Oct. 16, 2015, now Pat. No. 10,148,207.

(51) Int. Cl.

| | | |
|---|---|---|
| *H02M 5/27* | (2006.01) | |
| *H02K 19/26* | (2006.01) | |
| *H02P 9/42* | (2006.01) | |
| *B60L 1/00* | (2006.01) | |
| *H02P 27/08* | (2006.01) | |
| *H02P 27/16* | (2006.01) | |
| *H02P 9/14* | (2006.01) | |
| *H02J 7/00* | (2006.01) | |
| *H02J 7/02* | (2016.01) | |
| *H02J 7/14* | (2006.01) | |
| *B60L 58/10* | (2019.01) | |
| *H02J 7/24* | (2006.01) | |
| *H02P 6/16* | (2016.01) | |
| *A01D 34/64* | (2006.01) | |
| *A01D 34/43* | (2006.01) | |
| *B60L 58/40* | (2019.01) | |
| *H02J 3/38* | (2006.01) | |
| *B60L 50/60* | (2019.01) | |

(52) U.S. Cl.
CPC .......... *H02M 5/271* (2013.01); *H02M 5/272* (2013.01); *H02P 9/14* (2013.01); *H02P 9/42* (2013.01); *H02P 27/08* (2013.01); *H02P 27/16* (2013.01); *A01D 34/43* (2013.01); *A01D 34/64* (2013.01); *B60L 50/66* (2019.02); *B60L 58/40* (2019.02); *B60L 2200/40* (2013.01); *B60L 2240/12* (2013.01); *H02J 3/381* (2013.01); *H02P 6/16* (2013.01); *Y02E 60/721* (2013.01); *Y02T 10/7005* (2013.01); *Y02T 10/92* (2013.01); *Y04S 10/126* (2013.01)

(56) References Cited

U.S. PATENT DOCUMENTS

| | | | | |
|---|---|---|---|---|
| 3,742,336 | A * | 6/1973 | Bedford | H02M 5/271 363/1 |
| 3,882,369 | A * | 5/1975 | McMurray | H02M 5/271 363/1 |
| 3,937,974 | A | 2/1976 | Lafuze | |
| 3,989,996 | A | 11/1976 | Stacey | |
| 4,152,882 | A | 5/1979 | Howard | |
| 4,318,266 | A | 3/1982 | Taube | |
| 4,443,997 | A | 4/1984 | Namdari | |
| 4,539,483 | A | 9/1985 | Freeny, Jr. | |
| 4,559,768 | A | 12/1985 | Dunn | |
| 4,841,202 | A | 6/1989 | Dishner et al. | |
| 4,870,811 | A | 10/1989 | Steele | |
| 4,883,973 | A | 11/1989 | Lakey | |
| 4,964,265 | A | 10/1990 | Young | |
| 5,007,234 | A | 4/1991 | Shurman et al. | |
| 5,204,814 | A | 4/1993 | Noonan et al. | |
| 5,237,260 | A | 8/1993 | Takakado | |
| 5,323,593 | A | 6/1994 | Cline et al. | |
| 5,329,439 | A | 7/1994 | Borojevic et al. | |
| 5,433,066 | A | 7/1995 | Wenzel et al. | |
| 5,442,901 | A | 8/1995 | Niemela et al. | |
| 5,550,457 | A | 8/1996 | Kusase | |
| 5,563,774 | A | 10/1996 | Welsch | |
| 5,568,023 | A * | 10/1996 | Grayer | B60K 6/30 180/165 |
| 5,794,422 | A | 8/1998 | Reimers et al. | |
| 5,848,659 | A * | 12/1998 | Karg | B60L 11/02 180/65.245 |
| 5,909,367 | A | 6/1999 | Change | |
| 6,018,233 | A * | 1/2000 | Glennon | F02N 11/04 322/22 |
| 6,023,137 | A * | 2/2000 | Kumar | B60L 11/123 318/400.27 |
| 6,037,752 | A * | 3/2000 | Glennon | H05K 7/1432 322/22 |
| 6,082,084 | A | 7/2000 | Reimers et al. | |
| 6,269,617 | B1 | 8/2001 | Blanchard | |
| 6,359,344 | B1 | 3/2002 | Klein et al. | |
| 6,449,934 | B1 | 9/2002 | Reimers et al. | |
| 6,487,838 | B2 | 12/2002 | Handlin | |
| 6,571,542 | B1 | 6/2003 | Fillman et al. | |
| 6,591,593 | B1 | 7/2003 | Brandon et al. | |
| 6,603,227 | B2 | 8/2003 | Rose, Sr. | |
| 6,604,348 | B2 | 8/2003 | Hunt | |
| 6,622,804 | B2 | 9/2003 | Schmitz et al. | |
| 6,644,004 | B2 | 11/2003 | Reimers et al. | |
| 6,729,114 | B2 | 5/2004 | Fillman et al. | |
| 6,739,116 | B2 | 5/2004 | Stover et al. | |
| 6,892,518 | B1 | 5/2005 | Bares | |
| 6,938,400 | B2 | 9/2005 | Fillman et al. | |
| 6,948,299 | B2 | 9/2005 | Osborne | |
| 6,987,328 | B2 | 1/2006 | Osborne | |
| 7,003,936 | B1 | 2/2006 | Yue et al. | |
| 7,017,327 | B2 | 3/2006 | Hunt et al. | |
| 7,117,964 | B1 | 10/2006 | Kuang et al. | |
| 7,318,493 | B2 | 1/2008 | Medina | |
| 7,392,869 | B2 | 7/2008 | Carlson et al. | |
| 7,493,697 | B2 | 2/2009 | Yoshida | |
| 7,610,975 | B1 | 11/2009 | Gust et al. | |
| 7,721,517 | B2 | 5/2010 | Hunt et al. | |
| 7,728,534 | B2 | 6/2010 | Lucas et al. | |
| 7,735,592 | B2 | 6/2010 | Bellot et al. | |
| 7,878,279 | B2 | 2/2011 | Hoogenraad | |
| 8,026,679 | B2 * | 9/2011 | Seo | H02P 27/16 318/139 |
| 8,056,653 | B2 | 11/2011 | Hunt et al. | |
| 8,191,342 | B2 | 6/2012 | Ishii et al. | |
| 8,299,892 | B2 | 10/2012 | Manita et al. | |
| 8,544,570 | B2 | 10/2013 | Ishii et al. | |
| 8,662,600 | B2 | 3/2014 | Koga et al. | |
| 8,742,606 | B2 | 6/2014 | Kim et al. | |
| 8,769,917 | B1 | 7/2014 | Howell | |
| 8,811,039 | B2 | 8/2014 | The Ngo et al. | |
| 8,811,049 | B2 | 8/2014 | Fornage | |
| 8,863,485 | B2 | 10/2014 | Pitcel et al. | |
| 8,930,117 | B2 | 1/2015 | Raasch | |
| 9,113,596 | B2 * | 8/2015 | Bricko | A01D 69/025 |
| 9,155,247 | B1 | 10/2015 | Force | |
| 9,210,839 | B2 | 12/2015 | Schygge et al. | |
| 9,226,444 | B2 | 1/2016 | Schygge et al. | |
| 9,282,695 | B2 | 3/2016 | Goto | |
| 9,321,358 | B2 | 4/2016 | Robins et al. | |
| 9,499,199 | B1 | 11/2016 | Laymon et al. | |
| 2005/0169025 | A1 | 8/2005 | Huang et al. | |
| 2005/0207190 | A1 | 9/2005 | Gritter | |
| 2005/0237774 | A1 | 10/2005 | Lacaze et al. | |
| 2006/0090351 | A1 | 5/2006 | Yoshida | |
| 2007/0007056 | A1 | 1/2007 | Bowers et al. | |
| 2007/0274109 | A1 * | 11/2007 | Oyobe | B60K 6/26 363/37 |
| 2008/0031019 | A1 | 2/2008 | Alexander | |
| 2008/0234096 | A1 | 9/2008 | Joshi et al. | |
| 2008/0289309 | A1 | 11/2008 | Gust et al. | |
| 2009/0091954 | A1 | 4/2009 | Yamanaka | |
| 2009/0279338 | A1 | 11/2009 | Inagawa et al. | |
| 2010/0005769 | A1 | 1/2010 | Landry | |
| 2010/0034003 | A1 | 2/2010 | Rozman et al. | |
| 2010/0067272 | A1 | 3/2010 | Alexander | |
| 2011/0006545 | A1 | 1/2011 | Himmelmann | |
| 2011/0241465 | A1 | 10/2011 | Anghel et al. | |
| 2012/0182774 | A1 | 7/2012 | Boecker et al. | |
| 2012/0320648 | A1 | 12/2012 | Harrison et al. | |
| 2013/0167495 | A1 | 7/2013 | Borinato | |
| 2013/0257319 | A1 | 10/2013 | Akiyama et al. | |
| 2014/0257614 | A1 | 9/2014 | Niizuma | |

(56) References Cited

U.S. PATENT DOCUMENTS

| 2015/0107914 A1 | 4/2015 | Zhao |
| 2015/0130432 A1 | 5/2015 | Yamazaki et al. |
| 2016/0014959 A1 | 1/2016 | Atsumi |
| 2016/0014961 A1 | 1/2016 | Force |

FOREIGN PATENT DOCUMENTS

| JP | H11332001 A | 11/1999 |
| JP | 2007331454 A | 12/2007 |
| JP | 2010206880 A | 9/2010 |

OTHER PUBLICATIONS

Chen et al., Combined Device and System Simulation for Automotive Application using SABER, 2002, International Rectifier.
European Search Report for related European Application No. 16193829.5 dated Apr. 12, 2017.
Hustler "Zeon Parts Manual, Zeon model 929141 & 929141EX" https://www.hustlerturf.com/file/112480_1111.pdf, pp. 1-78.
Jacobsen. Eclipse 322, www.eclipse322.com/_media/pdf/EclipseBrochure.pdf, 2009.
Kolar et al., Review of Three-Phase PWM AC-AC Converter Topologies, Nov. 2011, pp. 4988-5006, vol. 58, No. 11, IEEE Transactions on Industrial Electronics.
Nguyen-Quang et al., A Three-Phase to Single Matrix Converter for High-Frequency Induction Heating, Sep. 8-10, 2009, Power Electronics and Applications.
Smartec "Integrated Electric LT Drive System Service and Repair Manual" Apr. 2010, pp. 1-52.
Smartec "Integrated Electric ZT Drive System Service and Repair Manual" Feb. 2012, pp. 1-52.
Szczesniak, Three-Phase AC-AC Power Converters Based on Matrix Converter Topology, Chapter 2: Review of AC-AC Frequency Converters, 2013, Springer.
Chinese Office Action for Chinese Patent Application No. 201610905342.7, dated Oct. 29, 2018.
European Office Action for European Application No. 16193829.5-1202 dated Jun. 7, 2019.
Chinese Office Action for Chinese Patent Application No. 201610905342.7, dated Jul. 19, 2019, with Summary.
Chinese Office Action for Chinese Patent Application No. 201610905342.7, dated Nov. 28, 2019.

\* cited by examiner

Series Drive System with Synchronous Inverter

Parallel Drive System with Synchronous Inverter

Series Drive System with Synchronous Inverter

Parallel Drive System with Synchronous Inverter

SYNCHRONOUS INVERTER

CROSS REFERENCE TO RELATED APPLICATION

This application is a continuation-in-part under 37 C.F.R. § 1.53(b) of U.S. patent application Ser. No. 15/287,485 filed Oct. 6, 2016, U.S. patent application Ser. No. 15/175,761 filed Jun. 7, 2016, and U.S. patent application Ser. No. 14/885,112 filed Oct. 16, 2015. The entire disclosures of each are hereby incorporated by reference.

FIELD

This application relates to the field of variable speed generators, and more specifically, an alternating current (AC) to AC converter for controlling the output of a controlled-field synchronous alternator on a variable-speed generator.

BACKGROUND

An engine-generator set, which may be referred to as a generator or a genset, may include an engine and an alternator or another device for generating electrical energy or power. One or more generators may provide electrical power to a load through a power bus. The power bus, which may be referred to as a generator bus or common bus, transfers the electrical power from the engine-generator set to a load. In many examples, the electrical load on the engine-generator set may vary over time.

The frequency of the output of a synchronous generator is based on the speed of the engine and the number of poles in the generator. In order to provide a constant output frequency, the prime mover may have to operate at a fixed speed. The engine may not need to operate at the fixed speed in order to provide enough power to supply the load, but does so to maintain frequency.

Although allowing the engine speed to decrease at light loads may reduce wear, fuel consumption, and sound emissions from the generator, converting the frequency is required in order to allow the engine speed to decrease from rated speed.

BRIEF DESCRIPTION OF THE DRAWINGS

Exemplary embodiments are described herein with reference to the following drawings.

DETAILED DESCRIPTION

Figure 1A:
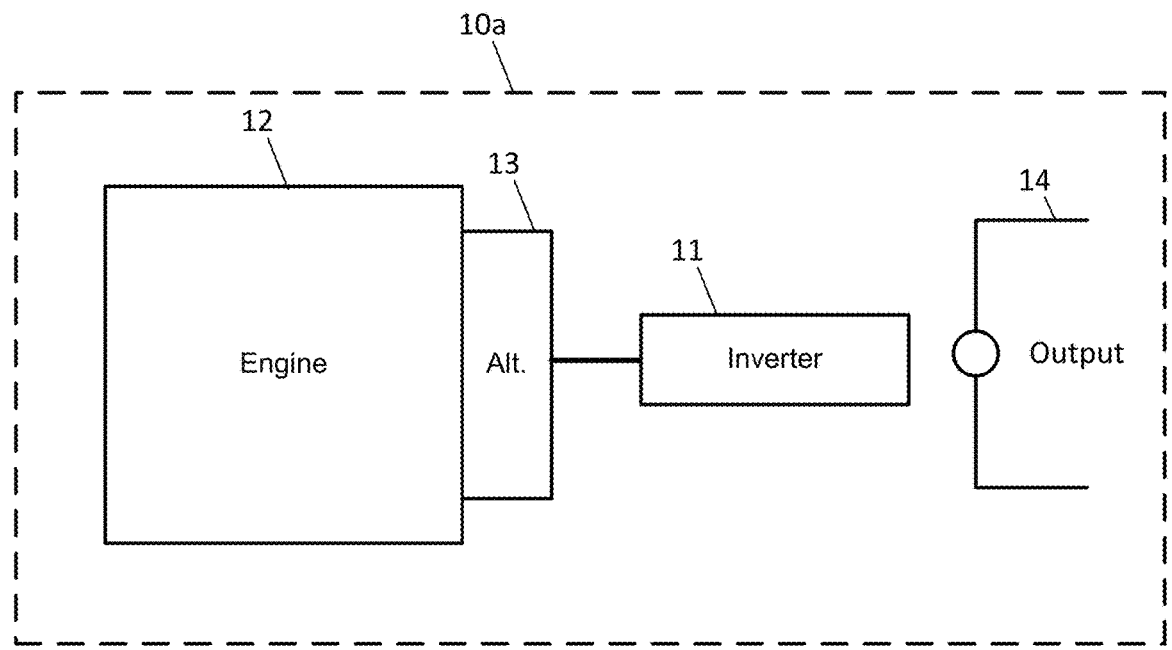
FIGS. 1A and 1B illustrate example engine-generator sets including one or more synchronous inverters.

An alternating current (AC) to AC converter converts an AC signal or waveform to another AC signal having a different or changed electrical property. The changed electrical property may be voltage, frequency, or another property. Example types of AC to AC converters include cycloconverters, matrix converters, and hybrid converters. A cycloconverter converts the input waveform to a lower frequency output signal by synthesizing segments of the input waveform without a direct current link. Cycloconverters may use silicon controlled rectifiers (SCRs) as switches to synthesize the inputs. Matrix converters utilize a network of transistors to similarly synthesize segments in a piecewise manner in order to generate the desired output waveform. Hybrid converters may combine a combination of the two approaches. Although frequency converters or cycloconverters may allow for correction of the frequency, they operate to control the output of the generator without control of the input.

Any of these examples may be referred to collectively as a segmented waveform converter. The segmented waveform converter may generate a single phase output from a multiple phase input. The output of the segmented waveform converter may be a four-quadrant output as the segmented waveform converter can transfer both real power and reactive power in either direction through the segmented waveform converter. The segmented waveform converter generates the output waveform one segment at a time by directly passing a combination of one or more of the input signals. Appropriate filtering of the input waveform may be used to remove high-frequency ripple, switching noise, and undesirable distortion of the output. The output waveform is created from sequential piecewise sampling of the input voltage. The frequency of the sampling defines the length of the segments. The frequency of the sampling may be significantly higher than the frequency of the input waveform and the output waveform. For example, an input frequency of 200 Hz and an output frequency of 60 Hz may require a sampling and switching frequency of 20 kHz in order to provide acceptable output power quality.

An additional advantage realized from the segmented waveform converter, as opposed to conventional inverters, is that lower rated components may be used. The segmented waveform converter uses more switching elements between the source and load than conventional rectifiers. Thus, on average, less current must go through each of the switching elements, and the switching elements may have a smaller current or power rating. Lower rated components may be much less costly. The segmented waveform converter may be electrically connected to one or more filters and configured to provide a filtered output to a variety of loads. Such a segmented waveform converter may be referred to as a synchronous inverter herein.

It is preferred to allow the cycloconverter to control the input voltage and frequency in addition to the output voltage in order to optimize efficiency and provide protection for components in the cycloconverter. In addition, many cycloconverters generate total harmonic distortion (THD) on the output voltage due to switching and commutation noise. This THD can be undesirable depending on the application.

FIG. 1A illustrates an example engine-generator set 10a including a synchronous inverter 11, an engine 12, and an alternator 13. The synchronous inverter may include at least one controller (i.e., microprocessor) for controlling a network of switches of a segmented waveform converter. The alternator 13 may be a controlled field alternator in which a field current is actively controlled by a generator controller (field current controller) to adjust the output of the alternator 13. The synchronous inverter controller and the field current controller may be the same device or different devices. The output device 14 of the synchronous inverter provides the output waveform to a load or another device.

The controlled field alternator 13 is configured to generate a poly-phase signal through operation of the engine 12. The controlled field alternator 13 may include an exciter armature for generating a field current. As the exciter armature is rotated in a magnetic flux, a time varying voltage is induced in the windings of the exciter armature. The output from the exciter armature is connected to the main field portion of generator. The connection may be made with or without brushes and slip rings. The field current of the output of the exciter provides a magnetic field in rotor field of the generator. As the field portion of the alternator is rotated relative to the stator, a magnetic flux is passed through and across the alternator stator windings producing time varying voltage. The field current from the exciter armature output may be rectified or otherwise controlled.

The output of the alternator 13 may be a three phase signal. The phases of the poly-phase signal may be offset one another by a predetermined angle (e.g., 120 degrees or 2*Pi/3 radians). The poly-phase signal may vary with respect to amplitude and frequency.

The controlled field alternator 13 provides the poly-phase signal to the segmented waveform converter of the synchronous inverter 11, which may include a matrix cycloconverter. The segmented waveform converter includes a network of switches that selectively controls passing a combination of the components of the poly-phase signal to the output 14. For example, consider an example in which the poly-phase signal includes two components, A and B. The network of switches could provide several combinations of the two components to the output, which may include only the A component, only the B component, an additive signal of A+B, a subtracted signal of A−B or B−A, and 0 or a null signal, which may be achieved by A−A or B−B.

Before the output 14, the synchronous inverter 11 may include an output filter and electrical quantities may be measured by the controller at the output filter by one or more sensors. The controller of the synchronous inverter 11 may be configured to provide a control signal for the network of switches based on measured electrical quantities associated with the output filter and provide a field current control signal to the controlled field alternator.

The controller may receive the electrical quantities from at least one sensor. The controller may perform a calculation or consult a lookup table to determine a combination of the components of the poly-phase signal to pass to the output 14. In one example, a lookup table relates combinations of available voltages to different settings for the plurality of switches. The available voltage may change over time. In one example, the available voltages vary according to a time-based schedule of expected values. In another example, the available voltages vary according to measured values.

Figure 1B:
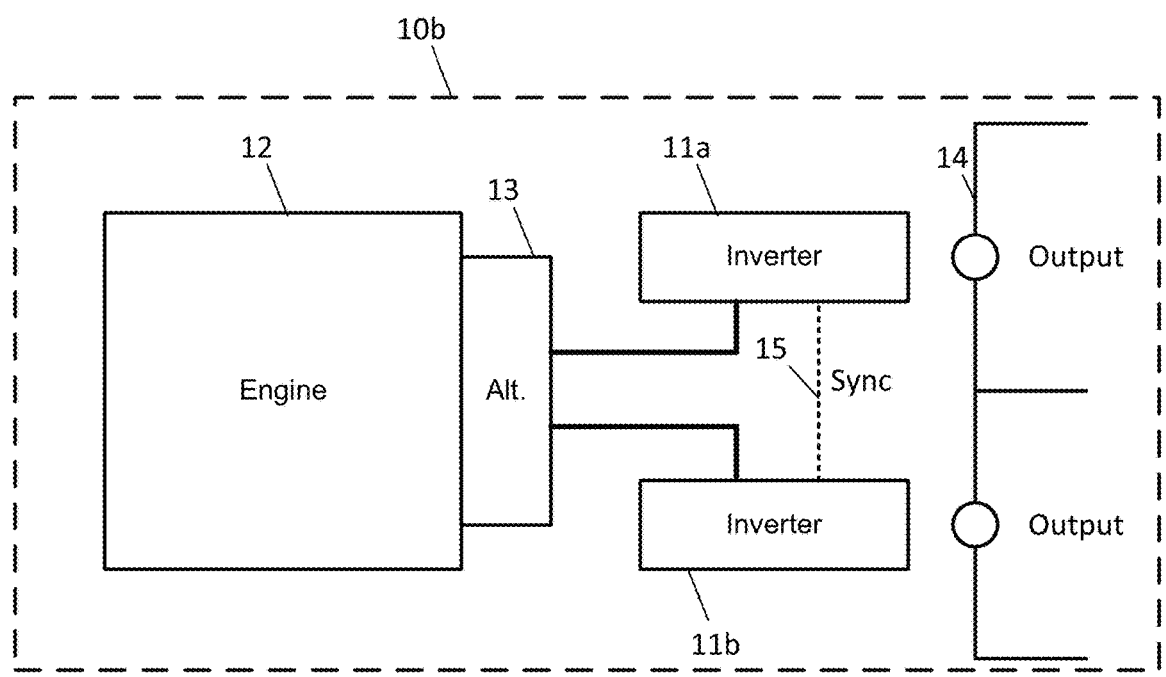

FIG. 1B illustrates another example engine-generator set 10b including two synchronous inverters 11a and 11b, an engine 12, and an alternator 13. The two synchronous inverters 11a and 11b may be connected through a synchronization path 15.

Both synchronous inverters 11a and 11b are fed by alternator 13 and are configured to synchronize their output waveforms using the sync signal on the synchronization path 15 between synchronous inverters 11a and 11b. The sync signal may include a digital signal which may indicate a peak, a positive-going or negative-going zero-crossing on the target voltage waveform, or another element of the internal target signal. The sync signal may include an analog signal, indicating a target waveform, a phase angle indicator, or another element of the target output waveform.

The sync signal may be a communications signal communicating a target voltage, target frequency, real load, reactive load, apparent load, zero-crossing timestamp, time synchronization signal, or other information related to the measured output waveform, the target output waveform, or the input to the inverter from the alternator. In one example, one of the synchronous inverters 11a detects a zero crossing and slope of the output of synchronous inverter 11a, which is sent to the other synchronous inverter 11b using the sync signal. The other synchronous inverter 11b may introduce a delay in order to synchronize with the synchronous inverter 11a. Various techniques may be used to synchronize the synchronous inverters.

The supplies from the alternator 13 to the synchronous inverters 11a and 11b may be magnetically isolated from each other to allow connection of the inverters in series, the two inverters may allow for connection in a center-tap configuration, allowing 120 or 240 output voltage as desired.

Figure 2:
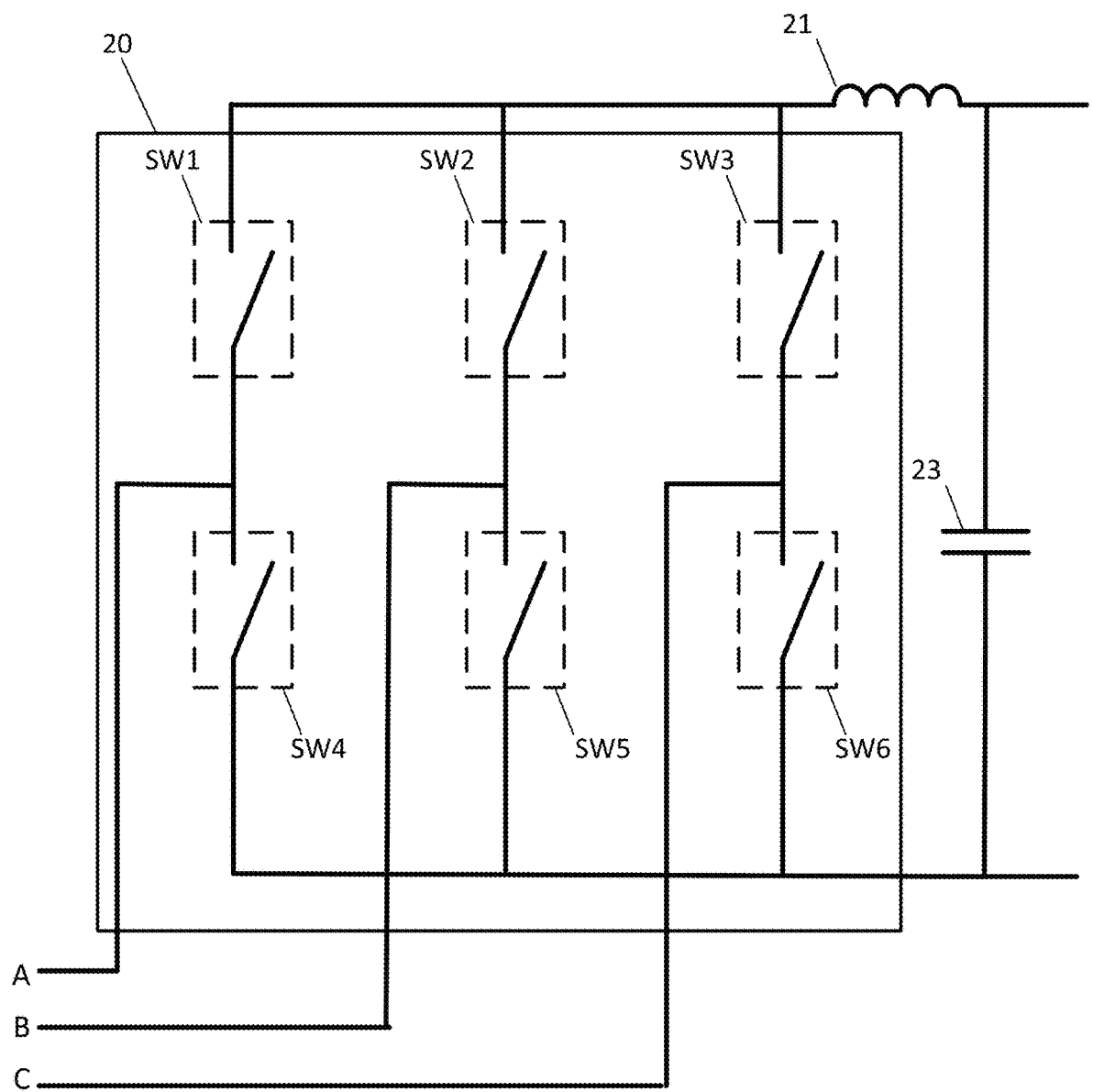
FIG. 2 illustrates an example single phase segmented waveform converter.

FIG. 2 illustrates an example synchronous inverter 11 including segmented waveform converter 20. The segmented waveform converter 20 includes a network of switches SW1-6 and at least one energy storing device. The example shown in FIG. 2 includes an inductor 21 and a capacitor 23. The inputs, A, B, and C, to the segmented waveform converter 20 are components of the poly-phase AC waveforms.

In one example, the segmented waveform converter 20 is configured to supply a control signal to each of the switches for any combination of two or fewer of the components of the poly-phase input waveform. The control signal may include A, B, C, A−B, A−C, B−C, B−A, C−B, C−A, and 0. Other switch configurations may be configured to provide other combinations, such as additive combinations A+B, B+C, and A+C, using a switch configuration other than that illustrated. In another example, the segmented waveform converter 20 is configured to supply a predetermined set of outputs based on combinations of the components of the poly-phase input waveform. The predetermined set of outputs may include a subtractive combination of exactly two of the components, including A−B, A−C, B−C, B−A, C−B, and C−A. The predetermined set of outputs may include 0, any single component (A, B, or C) or any subtractive combination of exactly two of the components.

The controller may access a target output level as a function of time. For example, the target output may be an AC waveform at a specific frequency and/or a specific amplitude. The target output level may be stored as a series of time based target values. For example, time values are associated with target output levels (e.g., {time1, output1}, {time2, output2}). The target output level may follow a sinusoidal function, and the target output levels may be computed based on a specified voltage and frequency for the output.

The controller may calculate a target electrical parameter for the output filter. In one example, the controller calculates a target current for the inductor 21, and in another example, the controller calculates a target voltage for the capacitor 23. The controller may calculate a desired change in the electrical parameter based on a measured quantity (e.g., voltage or current) at the output filter. The controller may calculate a change value (delta) based on the difference between the target output level and the current measured quantity. The controller may compare the change values to the available output segments from the combinations of components and selects the closest combination.

TABLE 1

| Time | A-B | B-C | C-A | B-A | C-B | A-C | Target |
|------|-----|-----|-----|-----|-----|-----|--------|
| 1 | 49 | 163 | −212 | −49 | −163 | 212 | 110 |
| 2 | −80 | −135 | 215 | 80 | 135 | −215 | 168 |
| 3 | −197 | 173 | 24 | 197 | −173 | −24 | 18 |
| 4 | 201 | −25 | −176 | −201 | 25 | 176 | −150 |
| 5 | −94 | 230 | −136 | 94 | −230 | 136 | −170 |
| 6 | 196 | −189 | −7 | −196 | 189 | 7 | −75 |

Different switch combinations correspond to different output ranges. For example, at time interval 3 on Table 1, combination C-A provides 24V, which is closest to the target at time interval 3 (18). In another example, at time interval 2, combination C-B provides 135, which is the closest to the target at time interval 2 (168). For each time interval, the controller selects one of the possible combinations. Only six combinations are shown, but more combinations are possible. A lookup table based on a single phase measurement may be used. Alternatively, each phase may be measured and compared. The controller may compare the possible combinations to the target value and select the closest combination. The controller generates a field current control signal for the selected combination. The controller may output an individual control signal for each of the switches SW1-6. Each switch SW1-6 may be either on or off. Each of the combinations represents different current paths through the segmented waveform converter.

As another example, the controller may select the switch combination that provides that largest voltage to the output and determine a pulse width modulated (PWM) duty cycle to operate between that switch combination and a freewheeling state. The PWM duty cycle may be chosen based on a ratio between the target voltage and the available voltage, a predetermined sequence, a closed-loop output voltage controller, a model-based control of the output, or a similar technique.

The controller may determine whether the closest available combination is within a threshold difference to the target. When the closest available combination is farther away from the target than the threshold, the controller may apply PWM control to adjust the signal. For example, a PWM duty cycle may be applied to the closest combination to approach the target. In another example, when the closest available combination is farther away from the target than the threshold, the controller first selects the available combination that is greater than the target. Then, the controller applies a PWM duty cycle to adjust the selected combination to approach the target. The PWM duty cycle may be calculated according to Equation 1.

PWM Duty Cycle=Target/Selected Combination Output     Eq. 1.

For example, consider the example at time interval 2, combination C-B provides 135, which is the closest to the target at time interval 2 (168). The controller may revert to the next largest output (215) from combination (C-A). Using Equation 1, the PWM duty cycle would be (168/215) =0.78 or 78%. In one example, the PWM duty cycle may be finely tuned (e.g., every 1%). In another example, a few examples are available and the closest PWM duty cycle is selected. For example, when five duty cycles are available, the options may be 20%, 40%, 60%, 80%, and 100%. In the example above, when equation 1 provides 78%, the PWM duty cycle of 80% is selected.

Table 2 illustrates example control signals for each of the switches in order for the segmented waveform converter 20 to provide the various output levels or combination of components of the poly-phase signal. The controller may include an output pin for each of the switches to provide the individual control signals to the switch. In another example, the segmented waveform converter 20 may include a switch controller that receives a bitwise signal according to rows of Table 2. For example, each series of bits corresponds to a set of control signals in the format {SW1, SW2, SW3, SW4, SW5, SW6}.

TABLE 2

|            | SW1 | SW2 | SW3 | SW4 | SW5 | SW6 |
|------------|-----|-----|-----|-----|-----|-----|
| A-B        | 1   | 0   | 0   | 0   | 1   | 0   |
| A-C        | 1   | 0   | 0   | 0   | 0   | 1   |
| B-C        | 0   | 1   | 0   | 0   | 0   | 1   |
| B-A        | 0   | 1   | 0   | 1   | 0   | 0   |
| C-B        | 0   | 0   | 1   | 0   | 1   | 0   |
| C-A        | 0   | 0   | 1   | 1   | 0   | 0   |
| 0 or A-A   | 1   | 0   | 0   | 1   | 0   | 0   |
| 0 or B-B   | 0   | 1   | 0   | 0   | 1   | 0   |
| 0 or C-C   | 0   | 0   | 1   | 0   | 0   | 1   |

The controller may calculate a target electrical parameter for the output filter. In one example, the controller calculates a target current for the inductor 21, and in another example, the controller calculates a target voltage for the capacitor 23. The controller may calculate a desired change in the electrical parameter based on a measured quantity (e.g., voltage or current) at the output filter. The controller calculates a change value (delta) based on the difference between the target output level and the measured quantity. The controller compares the change values to the available output segments from the combinations of components and selects the closest combination.

The filter components Inductor 21 and capacitor 23 may be selected to minimize THD on the output of the inverter. They may also be selected based on a target switching frequency of the segmented waveform converter. The filter components may be replaceable or integral to the design. The filter components may be different based on target output voltages and frequencies from the inverter. As an example, the inductor 21 may be decreased in size when the output frequency increases. As another example, the capacitor may be increased in size for a lower voltage application. The filter components may vary by application, such as decreased filter size when feeding a motor load or increased filter size when feeding a sensitive load.

The filter components may also enable the inverter to control short-circuit current by limiting the rate that the current through the switch can rise. The current control may provide a sinusoidal, trapezoidal, saw-tooth, triangular, DC, square-wave or otherwise shaped output current into a short circuit. The frequency of the output current into a short circuit may differ from nominal frequency. The current control may provide a high level of output current slowly decreasing to a lower level of output current. As an example, the current control may provide 300% of rated generator current into a short circuit for 2 seconds, then decrease the output current to 100% of rated current over the next 5 seconds. As another example, the current control may provide 300% of rated generator current into a short circuit for 5 seconds, then stop sourcing current.

Figure 3A:
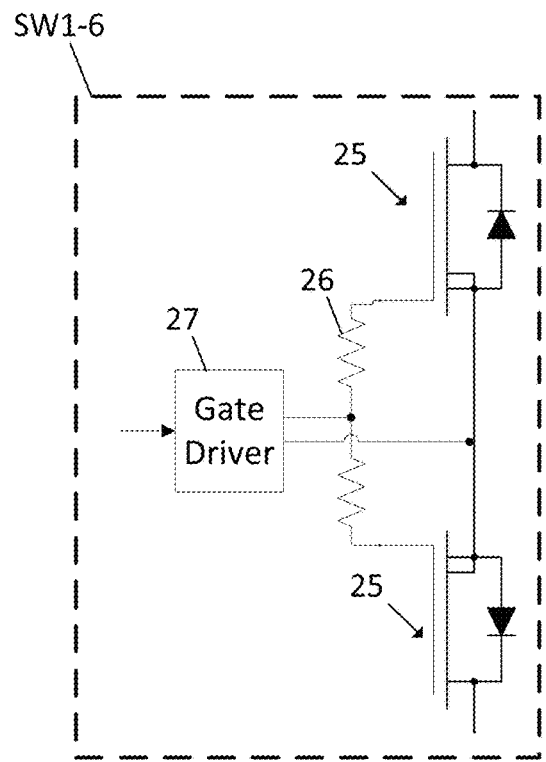
FIGS. 3A and 3B illustrate example switches for the segmented waveform converter.

FIG. 3A illustrates example switches SW1-6 for the segmented waveform converter 20. The switches SW1-6 include a pair of transistors 25 (e.g., metal-oxide-semiconductor field-effect transistors or MOSFETs) which are controlled by a gate driver 27 through one or more gate resistors 26. The sources of the transistors 25 may be directly electrically connected. The switches may also utilize a plurality of transistors connected in parallel in order to increase the current rating or to decrease the losses in the power conversion.

The switches are configured such that they block current traveling in either direction. This allows the segmented waveform converter to switch between two AC waveforms. The body diode, if present, on each transistor can conduct when the transistor is conducting in one direction, so the voltage drop across one transistor is typically lower than the other. The gate driver circuit provides the necessary isolation to allow the sources of the switches to float relative to the input and output of the converter, while providing a voltage or current referenced to the sources to trigger the switch. The gate drivers pass a digital signal from the controller to the actual switch.

Figure 3B:
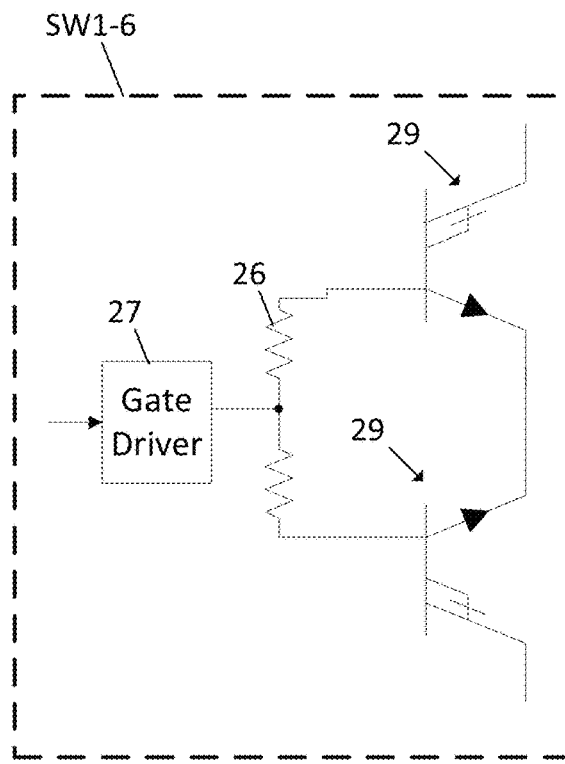

FIG. 3B illustrates another example switches SW1-6 for the segmented waveform converter 20. The switches SW1-6 include a pair of transistors 29 (e.g., insulated-gate bipolar transistor (IGBT) or another three-terminal power semiconductor device.) The emitters of the transistors 29 may be directly electrically connected. The switches may also utilize a plurality of transistors connected in parallel in order to increase the current rating or to decrease the losses in the power conversion. The emitters may be connected using paralleling resistors if the thermal characteristics of the IGBTs are not conducive to paralleling.

The switches are configured such that they block current traveling in either direction. This allows the segmented waveform converter to switch between two AC waveforms. The body diode on each transistor can conduct when the transistor is conducting in one direction, so the voltage drop across one transistor is typically lower than the other. The gate driver circuit provides the necessary isolation to allow the emitters of the switches to float relative to the input and output of the converter, while providing a voltage or current referenced to the emitters to trigger the switch. The gate drivers pass a digital signal from the controller to the actual switch.

Figure 4:
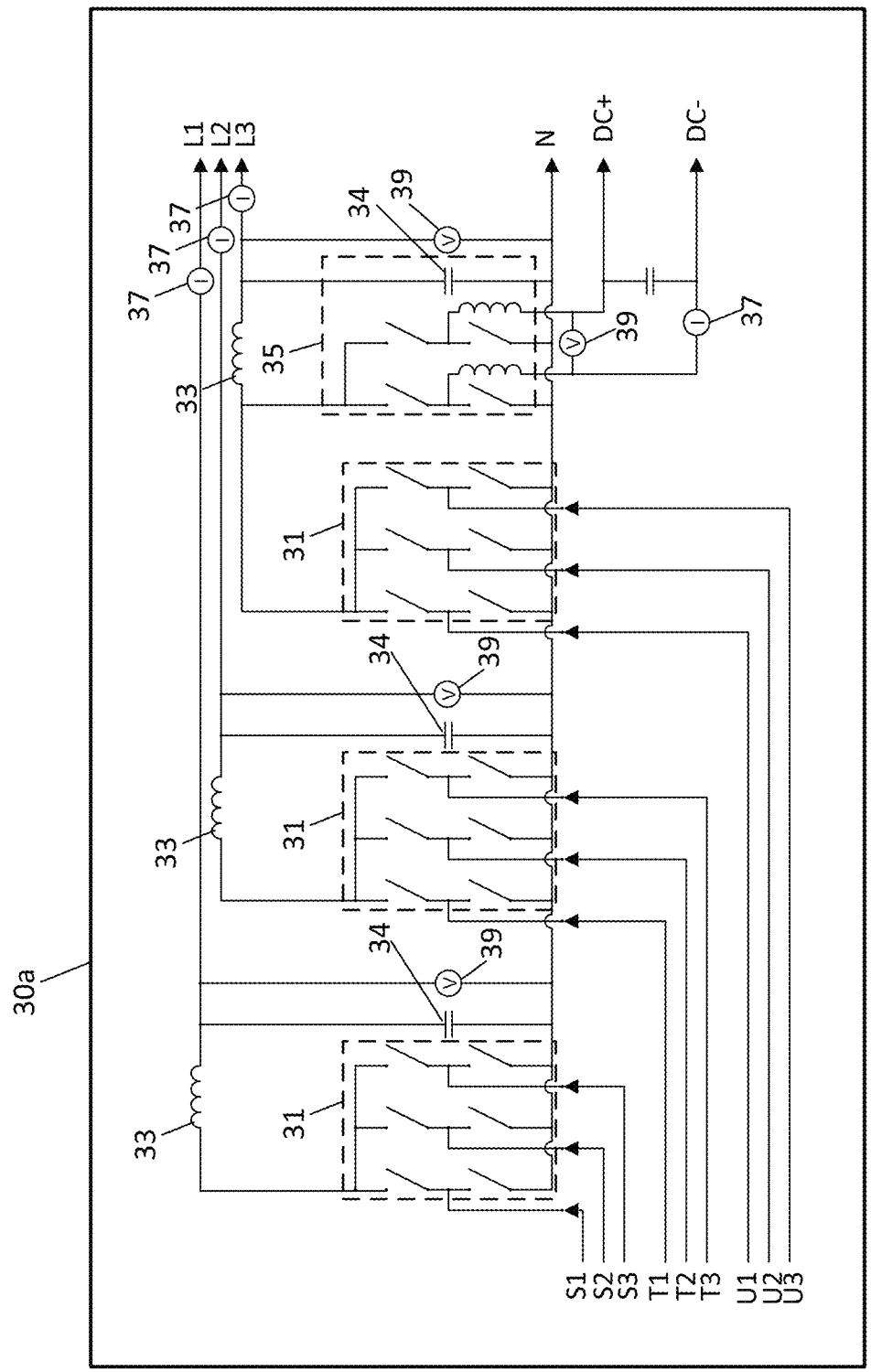
FIG. 4 illustrates an example three phase segmented waveform converter with alternator field current control.

FIG. 4 illustrates an example network 30a of segmented waveform converters. The inputs to the network 30a include S1, S2, and S3 for the first segmented waveform converter, T1, T2, and T3 for the second segmented waveform converter, and U1, U2, and U3 for the third segmented waveform converter. The outputs of the network 30 include one output line (L1, L2, L3) for each of the segmented waveform converters. The energy storing devices 33, which may be inductors, in combination with energy storing devices 34, which may be capacitors, combine to form an output filter. The measurement points 37, for current, and 39, for voltage, illustrate example locations on the network 30 where electrical quantities may be measured for controlling the segmented waveform converters. Other voltage and current measurement locations may be utilized. A circuit 35 includes a field current power supply for generating a field current (DC+, DC−) that is transmitted back to the field coils of the alternator.

Figure 5:
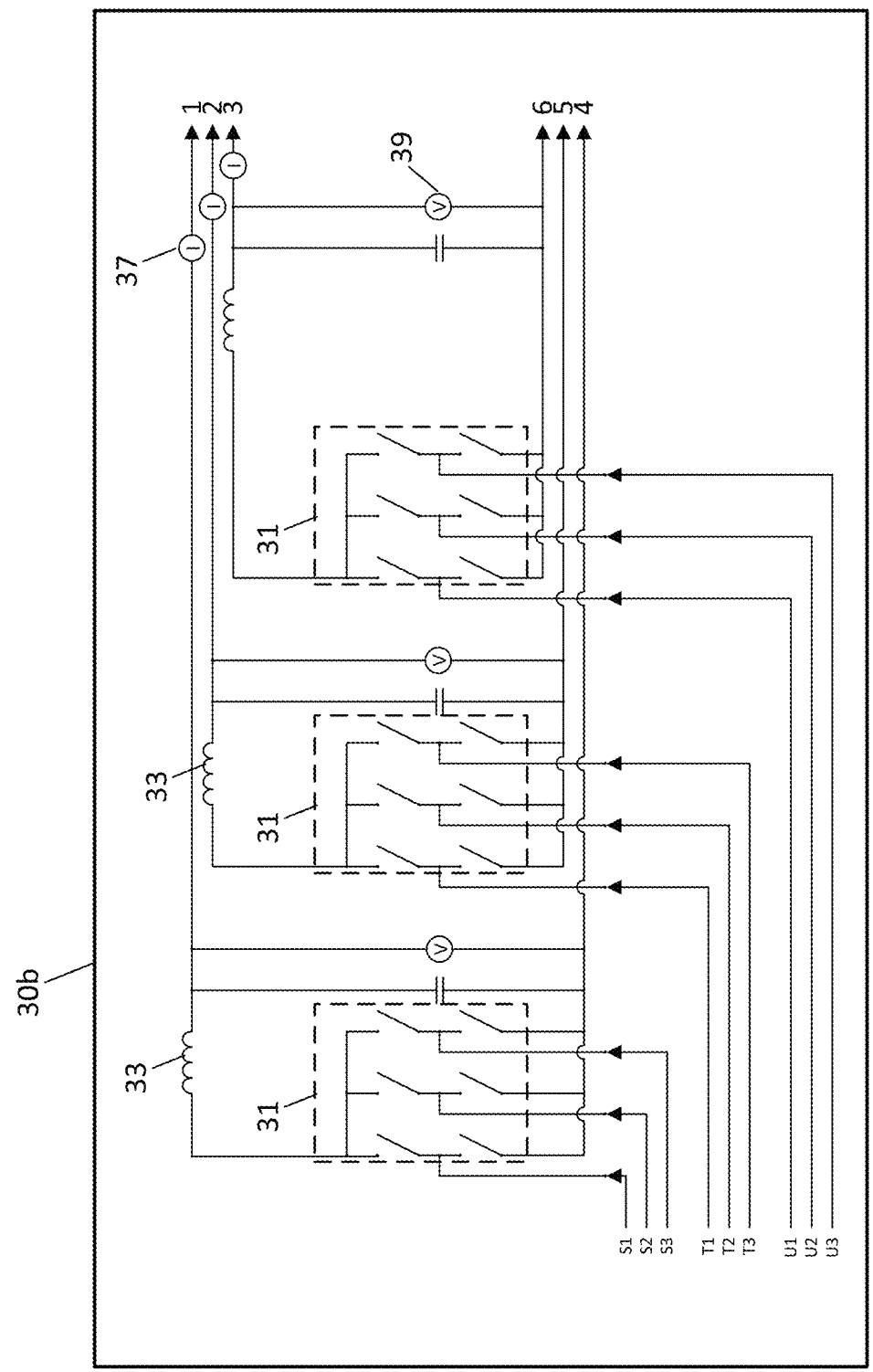
FIG. 5 illustrates another example three phase segmented waveform converter.

In FIG. 4 each of the segmented waveform converters share the neutral connection (N). Thus, each of L1 and L2 and L3 can be connected only in parallel or in a three-phase wye configuration. FIG. 5 illustrates another example three phase segmented waveform converter in which each of the segmented waveform converters are independent and can be connected in any configuration.

Each of the converters is capable of providing a single-phase AC output, but the phase between the outputs may be fixed such that the network of converters produces a polyphase AC output. For example, the output of the three converters, between 1 and 4, 2 and 5, and 3 and 6, may be fixed at 120 electrical degrees apart, providing three phase power. As another example, the three outputs, between 1 and 4, 2 and 5, and 3 and 6, may all produce voltage at the same phase angle, allowing them to be connected in parallel to provide increased current sourcing capability in a single-phase application. In yet another example, one of the three outputs, 3 and 6, could produce voltage at 180 electrical degrees from the other two, 1 and 4, 2 and 5, allowing center-tap single-phase output voltages such as 120/240. In this case, one of the output lines from the generator has double the current rating of the other output line because two converters are connected in parallel. In another example, outputs 1 and 4 may be 180 electrical degrees from 2 and 5 with 3 and 6 at the same phase angle as 1 and 4 with twice the magnitude. This enables center-tap single-phase output voltages with balanced line current ratings but only half the line current is available from the neutral connections. This final configuration may require higher voltage switches for the converter, 31, connected to inputs U1, U2, U3.

Figure 6B:
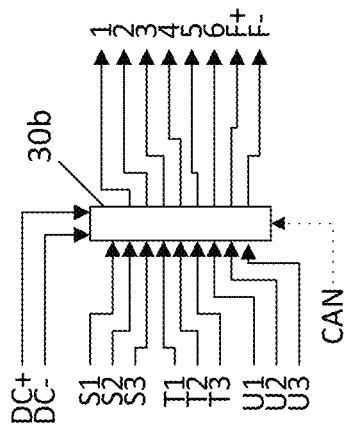
FIG. 6B illustrates an example pin diagram for an integrated circuit for the segmented waveform converter of FIG. 5.
Figure 6C:
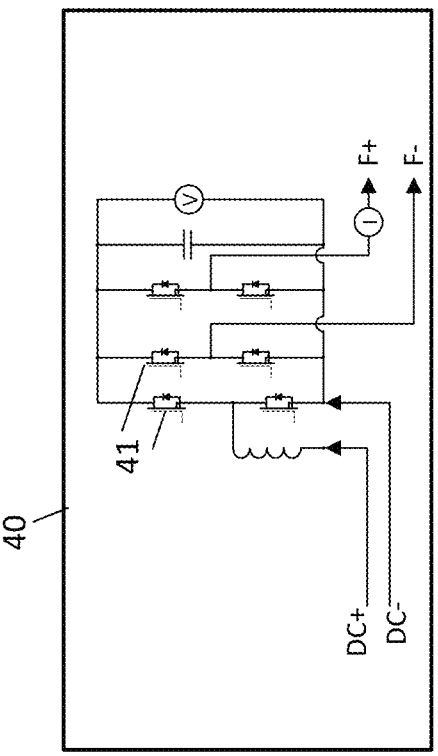
FIG. 6C illustrates an example power supply for supplying current to the alternator field.
Figure 6A:
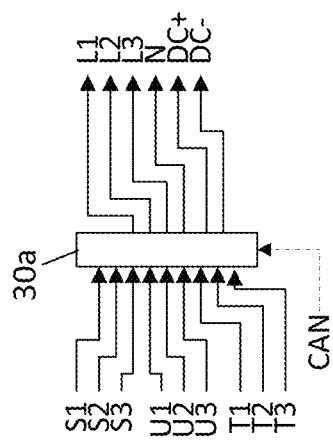
FIG. 6A illustrates an example pin diagram for an integrated circuit for the segmented waveform converter of FIG. 4.

FIG. 6A illustrates an example pin diagram for a circuit package or integrated circuit for a network of segmented waveform converters 30a. The inputs to network 30a, which are S1, S2, S3, U1, U2, U3, T1, T2, and T3, are on one side of the circuit package, and the line outputs L1, L2, and L3, neutral line N, and field current outputs DC+, DC− are on the other side of the circuit package. The controller area network (CAN) provides a control input to the circuit package in order to set the output. The control input may be the bitwise switch settings describe above (e.g., {SW1, SW2, SW3, SW4, SW5, SW6}) or the control input may be a target output, and the switch settings are controlled internal to the circuit package.

FIG. 6B illustrates an example pin diagram for a similar circuit package or integrated circuit for the network of segmented waveform converters 30b. The inputs to network 30b, which are S1, S2, S3, U1, U2, U3, T1, T2, and T3, are on one side of the circuit package, and the differential outputs 1, 2, 3, 4, 5, and 6, and field current outputs F+, F− are on the other side of the circuit package. As described above the CAN control input to the circuit package sets the output with either bitwise switch settings or a target output level.

FIG. 6C illustrates an example power supply 40 for controlling the field current. The field current power supply 40 may be used in combination with the circuit of FIG. 5 or in lieu of circuit 35 in FIG. 4. The power supply 40 includes an array of transistors 41 and a switching power supply for stepping up the voltage.

The network of waveform converters provides an output to control the field on the alternator 13, allowing the converters to control supply voltage(s). The field on the alternator 13 may be supplied by a high-voltage DC bus, generated from battery voltage by a DC-DC converter. Control of the supply voltage may allow for improved efficiency, decreased stress on components, broader output voltage range, and improved control under short-circuit conditions, among other benefits.

In any of the examples above, the synchronous inverters may be connected to provide two equally-rated (e.g., 120V) power supplies or the synchronous inverters may be connected in a variety of configurations. The inverters are in communication via a synchronization signal between them to allow the inverters to provide synchronized output voltage. In this case, the two inverters provide a very versatile range of output voltages, allowing a single generator package to be used in a variety of applications.

Figure 7A:
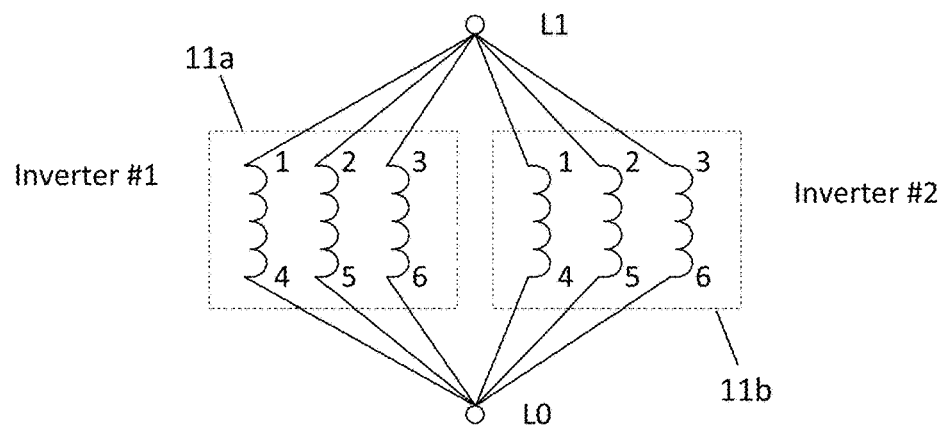
FIGS. 7A and 7B illustrate example single phase wiring diagrams for synchronous inverters.
Figure 7B:
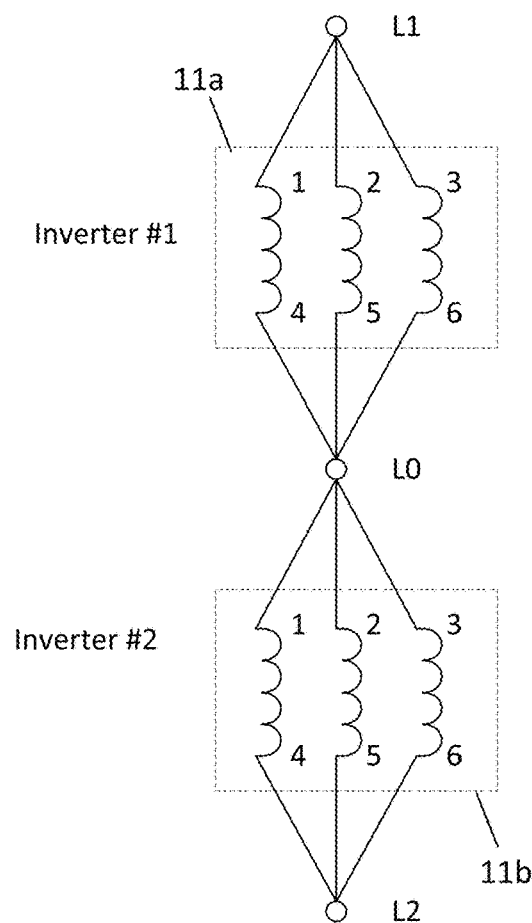

FIGS. 7A and 7B illustrate example single phase wiring diagrams for synchronous inverters that may be achieved by the segmented waveform converters of either FIG. 4 or FIG. 5. FIG. 7A illustrates circuitry as a means for connecting a low voltage (e.g. 120 VAC), single-phase output. FIG. 7B illustrates circuitry as a means for connecting a nominal voltage (e.g. 220 or 240 VAC) for a single-phase configuration.

Figure 8A:
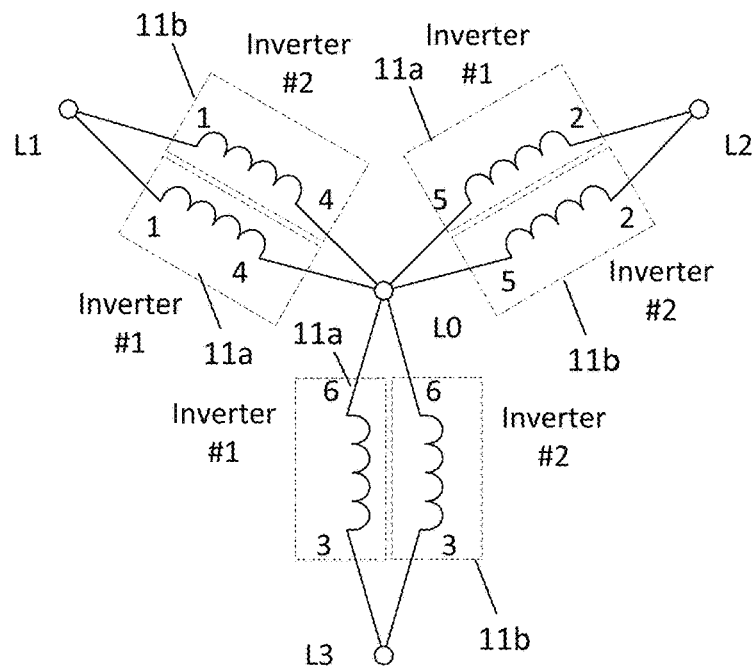
FIG. 8A illustrates an example low wye wiring diagram for synchronous inverters.
Figure 8B:
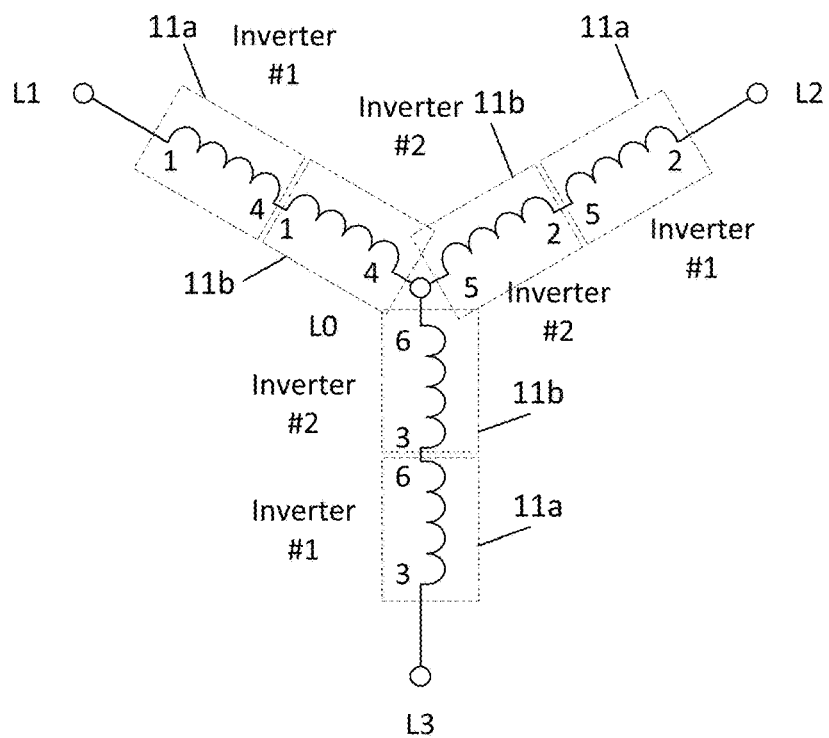
FIG. 8B illustrates an example high wye wiring diagram for synchronous inverters.
Figure 9:
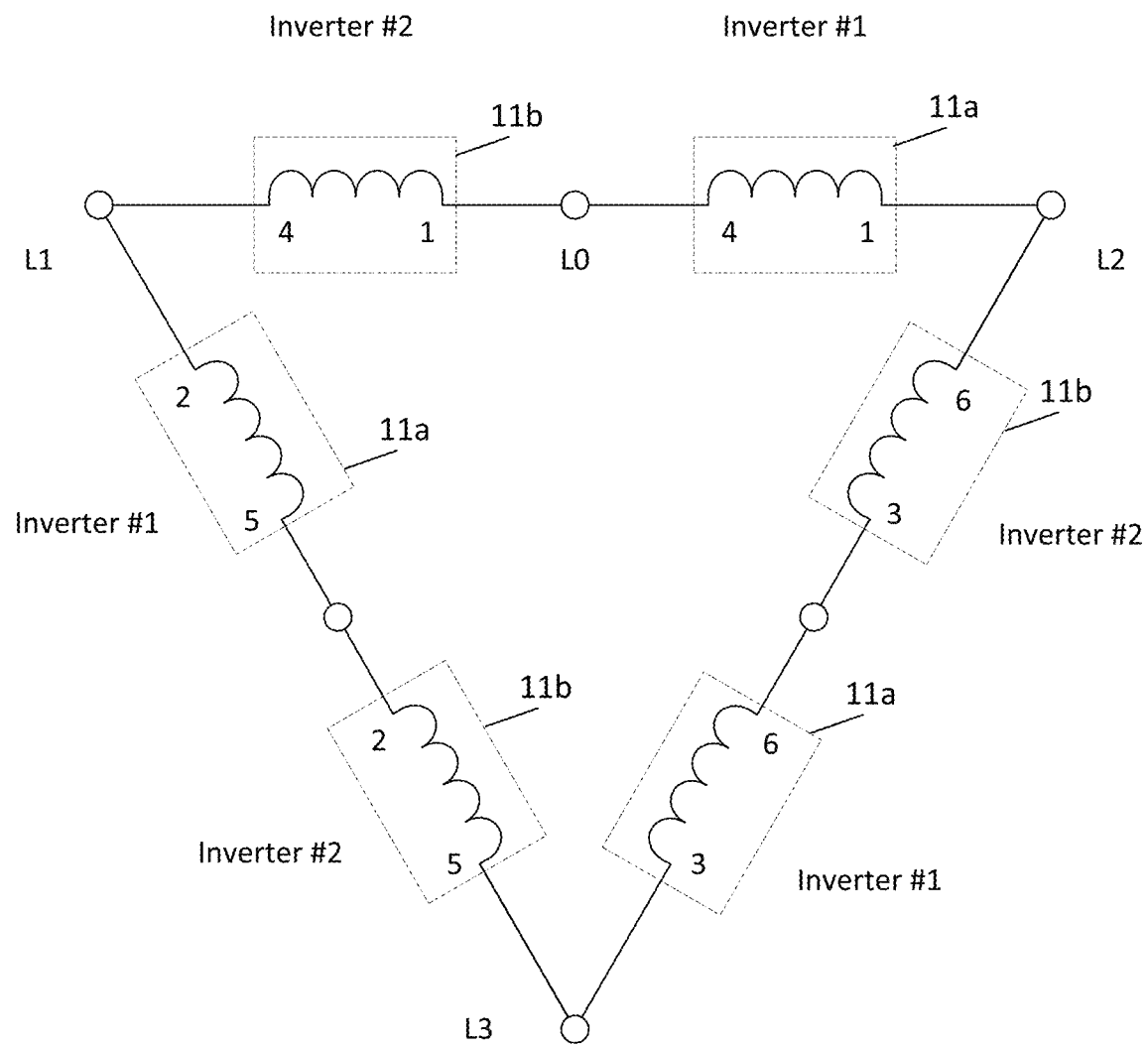
FIG. 9 illustrates an example low delta wiring diagram for synchronous inverters.

FIG. 8A illustrates circuitry as a means for connecting a Low Wye (e.g. 120/208 VAC) three-phase configuration that may be achieved by the segmented waveform converters of either FIG. 4 or FIG. 5. FIG. 8B illustrates circuitry as a means for connecting a High Wye (e.g. 230/400 or 277/480 VAC) three-phase configuration that may be achieved by the segmented waveform converters of FIG. 5. FIG. 9 illustrates circuitry as a means for connecting a center-tap Delta (e.g. 120/240/208 VAC) three phase configuration that may achieve by the segmented waveform converters of FIG. 5.

Figure 10:
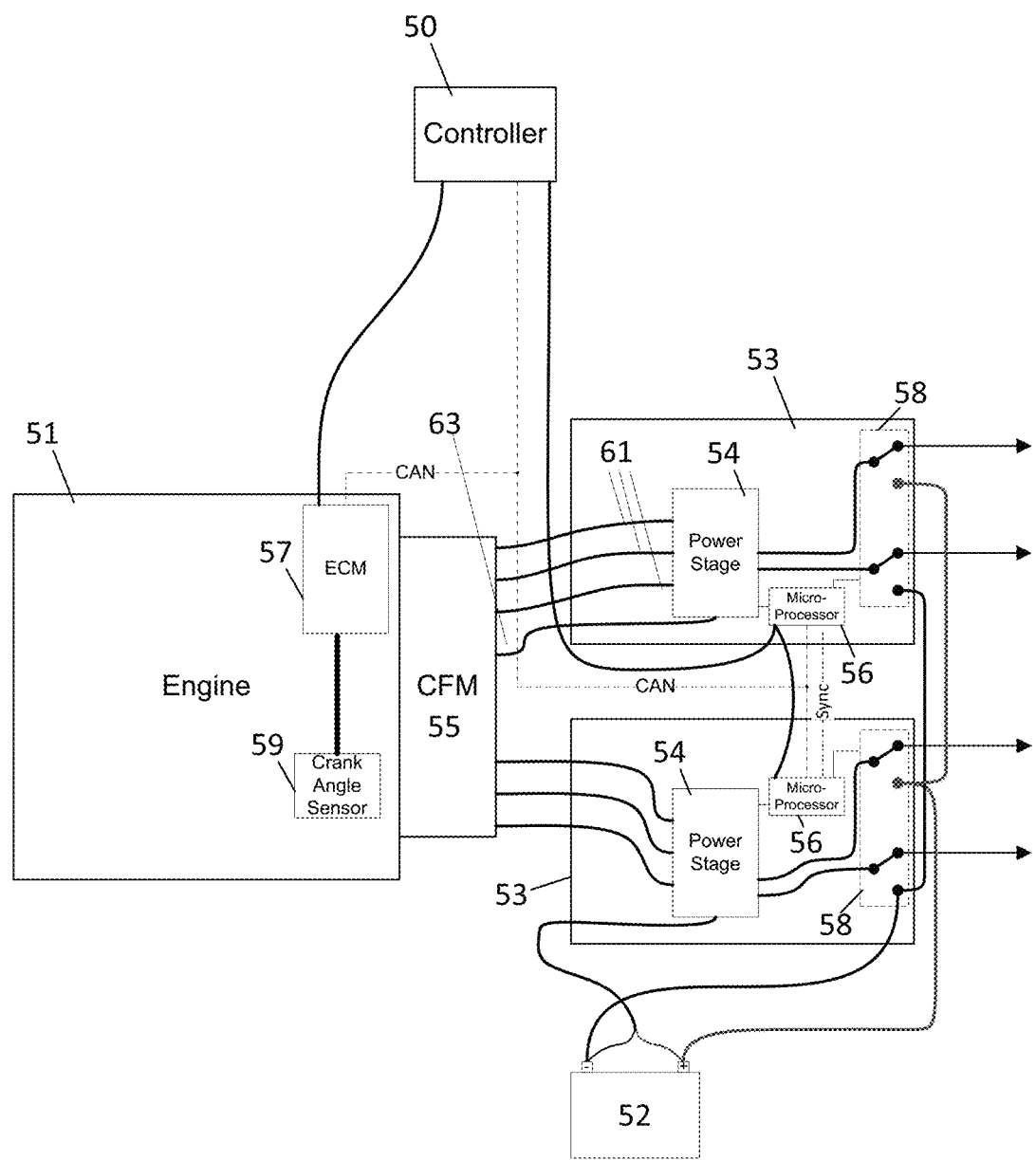
FIG. 10 illustrates a synchronous inverter generator configured to crank the engine using the alternator and synchronous inverter.

FIG. 10 illustrates an example engine-generator set including an engine 51, a battery 52, a controlled field machine (CFM) 55, two segmented waveform converters 53, and a generator controller 50. Each of the segmented waveform converters 53 includes a power stage 54, a microprocessor 56, and a cranking switch 58. The engine 51 includes or is electrically connected with an engine control module (ECM) 57 and a crank angle sensor 59. The power stage 54 includes the array of switches for receiving the CFM outputs 61 that feed into the segmented waveform converters 53 and the field current line 63 to supply field current back to the CFM 55. The CFM 55 may be an alternator or another rotary device that is controlled by an electrical field. Additional, different, or fewer components may be included in the genset.

The synchronous inverter 53 may be used to initiate engine rotation (crank the engine 51). The synchronous inverter 53 receives battery power from battery 52 on the normal AC output and provides an AC voltage waveform on the alternator stator windings, generating a rotating magnetic flux in the stator. The rotating magnetic flux on the stator may generate a torque on the rotor. The generated torque causes the engine to spin, causing air and fuel to be compressed in the cylinders and allowing the engine to initiate combustion (start).

Based on the layout of the segmented waveform converter, the switches allow for bi-directional power flow. Given this configuration, it may be possible to provide a signal that allows the alternator to act as a motor to rotate the engine. The alternator may act as an induction machine using damper windings in the rotor, induced current in the rotor field winding, reluctance variation between the rotor and stator, magnetic hysteresis in the rotor, or eddy currents generated in the rotor steel or laminations. The alternator may also act as a synchronous machine by exciting the rotor field, by rectifying induced voltage in the rotor field, or providing a permanent magnet rotor. The rotor field may be excited by an AC voltage, a DC voltage, or a combination of AC and DC voltage. The rotor field supply may couple through the exciter armature when the rotor is stationary.

The generator controller 50 is configured to provide a start signal to the segmented waveform converter 53. In addition to the start signal, the segmented waveform converter 53 may receive a position signal of the rotational components relative to the stationary components to determine the speed and position of the engine. In some cases, the position signal may provide information to the segmented waveform converter 53 that allows the synchronization of the AC voltage applied to the alternator stator. The segmented waveform converter may also determine engine position by measuring back electromagnetic fields (EMF) from the stator windings, stator impedance, stator current, or another signal. In some cases, the output of the crank angle sensor 59 (an angle) may be fed directly into the synchronous inverter 53. In other cases, the crank angle sensor 59 may be read by the ECM 57 or generator controller 50 and the information communicated to the synchronous inverter 53.

The engine cranking may be performed by one or more of the segmented waveform converters. The converters may share the cranking load simultaneously, share the cranking load by switching converters occasionally, or some combination of the two techniques. The converter to supply the cranking current may be chosen based on a temperature of each converter, the time that the converter has supplied the current, in order to assess functionality of the components on each converter, or for another reason.

The engine cranking may also be performed by a separate converter or a three-phase inverter. The separate inverter may be part of the segmented waveform converters or a separate converter. The separate converter may connect to a dedicated set of windings on the alternator. The dedicated set of windings on the alternator may be galvanically isolated from the windings connected to the segmented waveform converters. The dedicated set of windings may have a different number of turns than the main windings. The dedicated set of windings may be used to recharge the battery that supplies the cranking current.

The engine cranking may be performed by controlling the frequency and amplitude of the applied voltage. The engine cranking may be performed by controlling the voltage and phase angle between the rotor and stator. The engine cranking may be performed by controlling the torque applied to the engine 51. The torque applied to the engine can be measured from the phase angle between the current and voltage, the amplitude of the current, the amplitude of the voltage, the engine speed, or other characteristics of the stator or rotor.

Figure 11A:
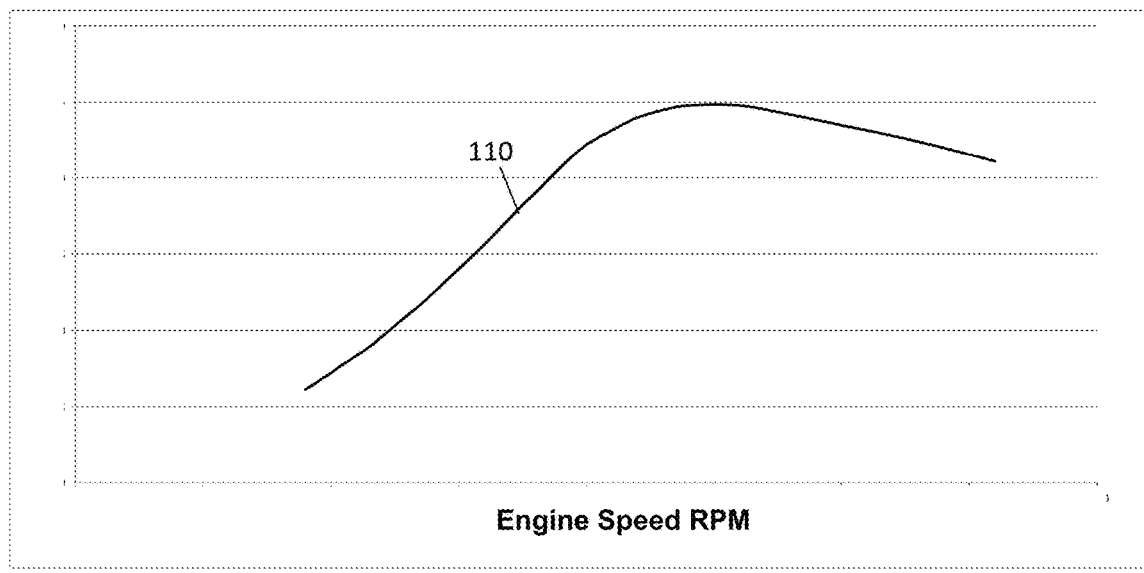
FIG. 11A illustrates an example engine torque curve.

FIG. 11A illustrates a chart for engine gross torque for an example engine-generator set including a synchronous inverter. As shown by plot 110, the engine provides increasing torque as the speed increases for most of the operating speed of the engine. Due to the torque output limitations of the engine, it may be difficult to accelerate the engine quickly from a lower speed. In addition, accelerating from a lower speed may take longer because of the infrequency of combustion events.

The engine torque produced may be significantly less than is indicated in FIG. 11A, depending on the torque demanded by the alternator. The engine output torque may be controlled by controlling the fuel supply to the engine. The engine output torque may be controlled by controlling the air supply to the engine. The torque demanded by the alternator may increase with increasing electrical load. The engine speed may decrease if the alternator torque exceeds the engine torque produced. The engine speed may increase if the engine torque exceeds the alternator torque. The alternator torque may have to be limited to a level slightly below the engine torque in order to allow the engine to accelerate.

Figure 11B:
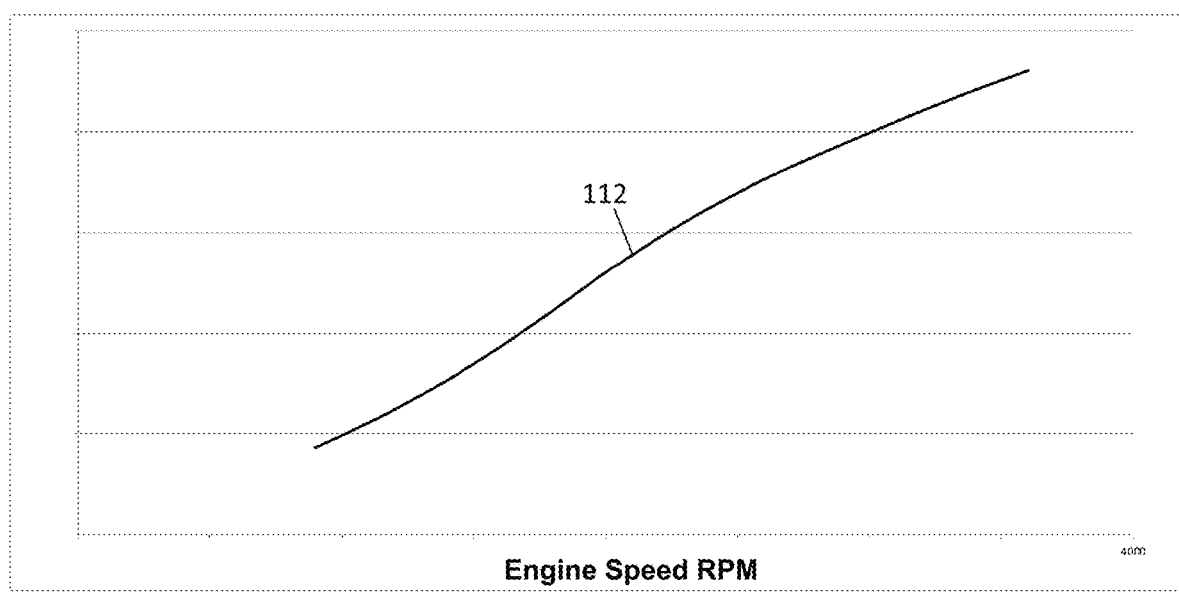
FIG. 11B illustrates an example power curve for an engine.

FIG. 11B illustrates a chart for engine power for an example engine-generator set including a synchronous inverter. As shown by plot 112, the engine speed may increase in order to provide enough power to meet the load demand. The engine speed may be controlled by controlling the torque output of the engine. In order to allow the engine speed to increase, the synchronous inverter may have to reduce output voltage temporarily. If the engine is unable to provide enough power to supply the load, the inverter may have to reduce output voltage temporarily.

The engine may operate at a fixed speed, with the output voltage controlled by adjusting the field current. The engine may operate at a variable speed with the output voltage controlled by adjusting the engine speed. The engine may operate at a combination of fixed speed and variable speed, with the output voltage controlled by a combination of adjusting the speed and adjusting the field current. The output frequency of the alternator may be controlled by adjusting the engine speed. The synchronous inverter may increase the frequency of the output voltage from that of the alternator. The synchronous inverter may decrease the frequency of the output voltage from that of the alternator. Different alternator and engine types require different means of controlling the input voltage to the synchronous inverter.

The synchronous inverter may control the output from the alternator in order to control the input voltage to the segmented waveform converter. Control of the alternator output may provide improved protection for switches in the converter, decreased THD on the output, improved efficiency, better durability, and improved response.

Figure 12A:
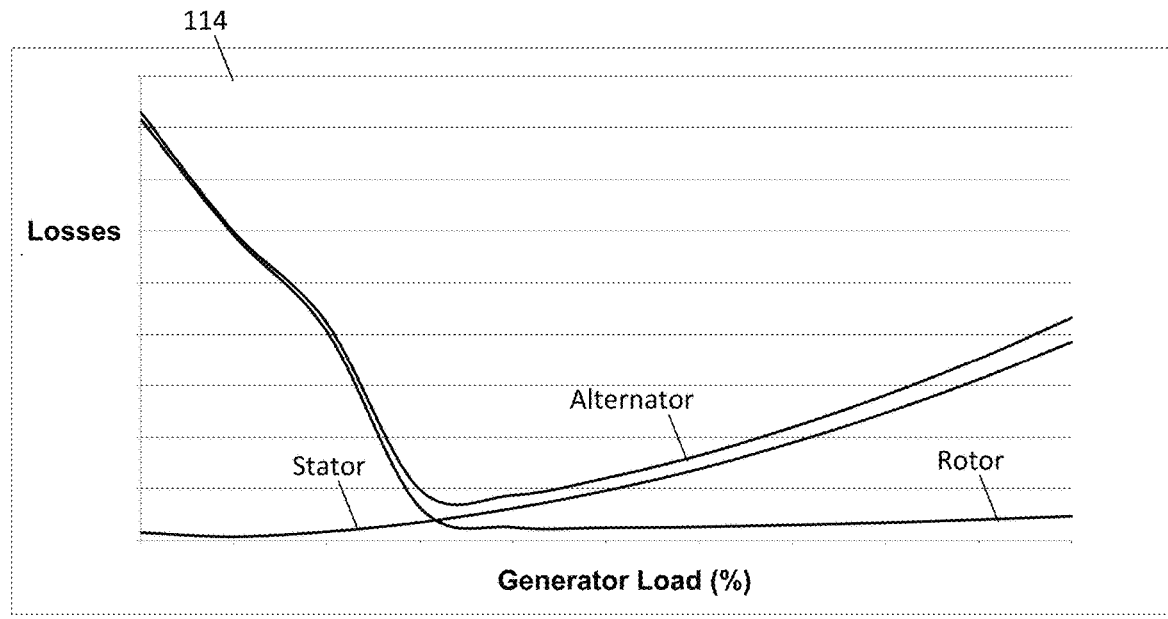
FIG. 12A illustrates a chart for alternator losses in an example controlled field alternator on a variable speed generator containing a synchronous inverter.

FIG. 12A illustrates a chart 114 for rotor and stator losses in an alternator on an example engine-generator set including a synchronous inverter. The example design uses a wound-field alternator to produce the voltage supply to the synchronous inverter and an ECM that allows adjustment of the engine speed. The rotor losses in the alternator may be at a maximum at low speed because the alternator is operating in saturation at low speed in order to allow maximum voltage generation at a minimum speed. The stator losses may increase due to increasing copper losses from current due to increasing load. The total losses may be at a maximum at no load because the system efficiency is not important at no load. The system losses may be at a minimum at 30% load because 30% load is the most common operating point for the generator.

Figure 12B:
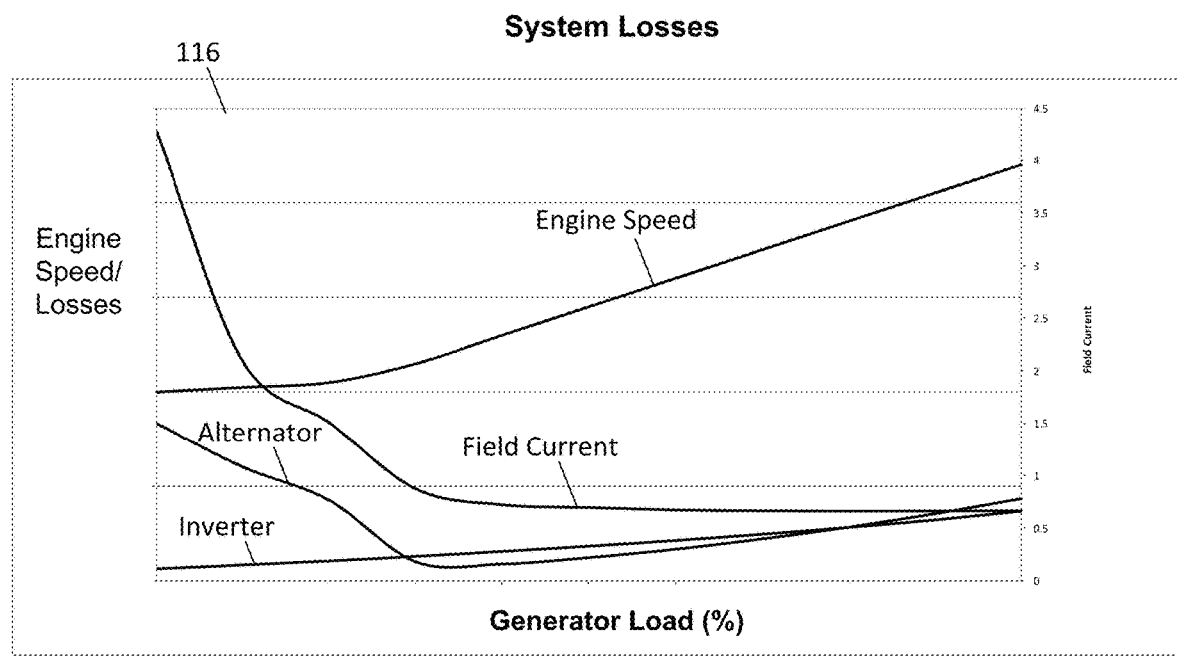
FIG. 12B illustrates an example engine speed versus load curve and system loss curves for a system including a synchronous inverter.

FIG. 12B illustrates a chart 116 for total system losses for an example engine-generator set including losses from the synchronous inverter. The example generator set may be rated to produce 10 kW. The total system losses may be approximated by the sum of the alternator and inverter losses. The total efficiency may be computed as the ratio between the total power provided by the alternator to the total power produced by the engine. The example generator set may have an efficiency approaching 90%.

As illustrated in FIG. 12B, the engine speed increases with increasing generator load. This may allow the engine to provide sufficient power to supply the load and may also improve fuel consumption, sound and air pollutant emissions, and system longevity. The engine speed may remain constant, decrease or increase in a different example. The alternator voltage produced by the system may increase with increasing load, remain constant, or decrease with increasing load. Increasing alternator voltage with increasing load may help to minimize THD, constant voltage with changing load may simplify inverter control, and decreasing voltage with increasing load may help to minimize stress on components in the segmented waveform converter.

Figure 13:
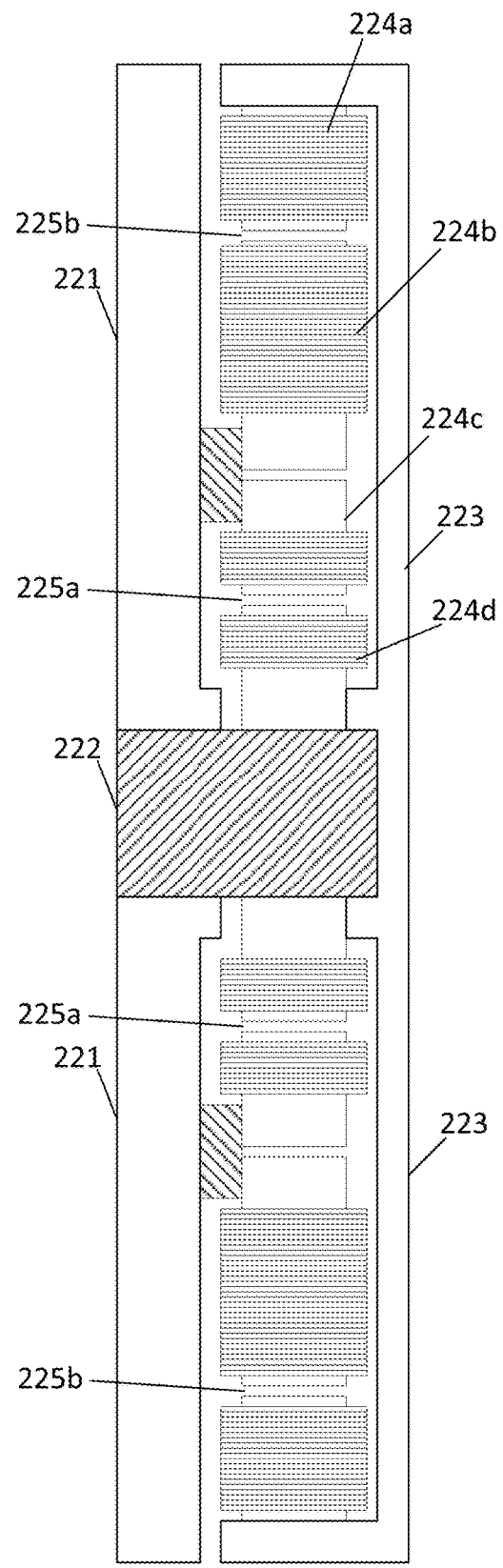
FIG. 13 illustrates an example side view of a dual axis generator.

FIG. 13 illustrates an example wound-field alternator to provide voltage to the synchronous inverter. The example alternator is configured with the exciter field lying in a common plane with the main machine. The example alternator topology may provide additional voltage control and improved speed range over a permanent magnet alternative. The example alternator topology may provide a similar size profile and efficiency to a permanent magnet alternative. The example alternator topology may be integral to the flywheel of the engine. In this example, the output shaft of the engine may drive a coolant pump, a fan, a fuel pump, another device, or be removed from the shaft casting. The output seal may also be removed from the end-plate casting of the engine.

FIG. 13 illustrates a shaft 222 that supports a rotor frame 223. A stator frame 221 is supported by a fixed member that provides the frame of reference for the rotating rotor. The fixed member may be an engine block or skid or other fixed member. The rotor frame 223 rotates with the shaft. The rotor frame 223 supports a rotor field device and an exciter armature device 224d. Thus, the rotor field device 224a and the exciter armature device 224d may be rigidly mounted together or integrally formed. The stator frame 221 supports an exciter field device 224c, and a main stator device 224b. Thus, the exciter field device 224c and the main stator device 224b are rigidly mounted in the same frame of reference relative to the rotor or may be integrally formed. Either or both of the stator side and the rotor side may be formed of cast iron or steel or laminated silicon steel or other magnetically permeable materials. The outermost component may be designed to act as a shield for electromagnetic interference due to high frequency switching of a power electronic device or devices interior to the outermost component. Also, this may be designed to minimize radiated electromagnetic interference conducted to the alternator from an external power electronic device such as a synchronous inverter.

An exciter air gap 225a is maintained between the exciter field device 224c and the exciter armature device 224d. The exciter field device 224c is energized by a voltage regulator or another power source to generate an exciter magnetic field in the exciter air gap 225a. The exciter armature device 224d is configured to rotate with respect to the exciter field device 224c and impart a first time varying voltage in a set of coils in the exciter armature across the exciter air gap 225a. In one alternative, the exciter field device 224c may include permanent magnets. In another alternative, the exciter field device may include coils or another magnetic field generating device.

A main air gap 225b is maintained between the rotor field device 224a and the main stator device 224b. The main stator device 224b includes a second set of coils. The rotor field device 224a is configured to be energized by the first current in the first set of coils and generate a main magnetic field that imparts a second time varying voltage in the coils of the main stator device 224b across the main air gap 225b.

As illustrated in FIG. 13, the main stator device 224b and the exciter field device 224c lie in on a common plane normal to an axis of rotation of the shaft 222. In a first embodiment, only the main stator device 224b and the exciter field device 224c lie in on the common plane with the rotor field device 24a and the exciter armature device 224d lying in an adjacent plane. In this example, the adjacent plane including the rotor field device 224a and the exciter armature device 224d are axially spaced from the main stator device 224b and the exciter field device 224c. In this embodiment, the main air gap 225b and the exciter air gap 225a lie in adjacent planes or a common plane normal to the shaft. In this first embodiment, magnetic flux travels parallel to the axis of shaft rotation across the main airgap 225b and the exciter airgap 225a. In a another embodiment, the main stator device 224b, the exciter field device 224c, the rotor field device 224a and the exciter armature device 224d lie in the common plane. In this embodiment, the main air gap 225b and the exciter air gap 225a may be concentrically aligned parallel to the axis of the shaft 222 with all or part of the cylindrical exciter air gap 225a contained within the cylindrical main air gap 225b. The exciter armature device 224d is inwardly spaced from the exciter field device 224c, main stator device 224b, and the rotor field device 224a. In other words, the exciter armature device 224d is closer to the shaft 222 than the exciter field device 224c, the main stator device 224b, and the rotor field device 224a. In this second embodiment, magnetic flux travels normal to the axis of shaft rotation across the main airgap 225b and the exciter airgap 225a. Note combinations of the first and second embodiments are possible and contemplated.

Figure 14:
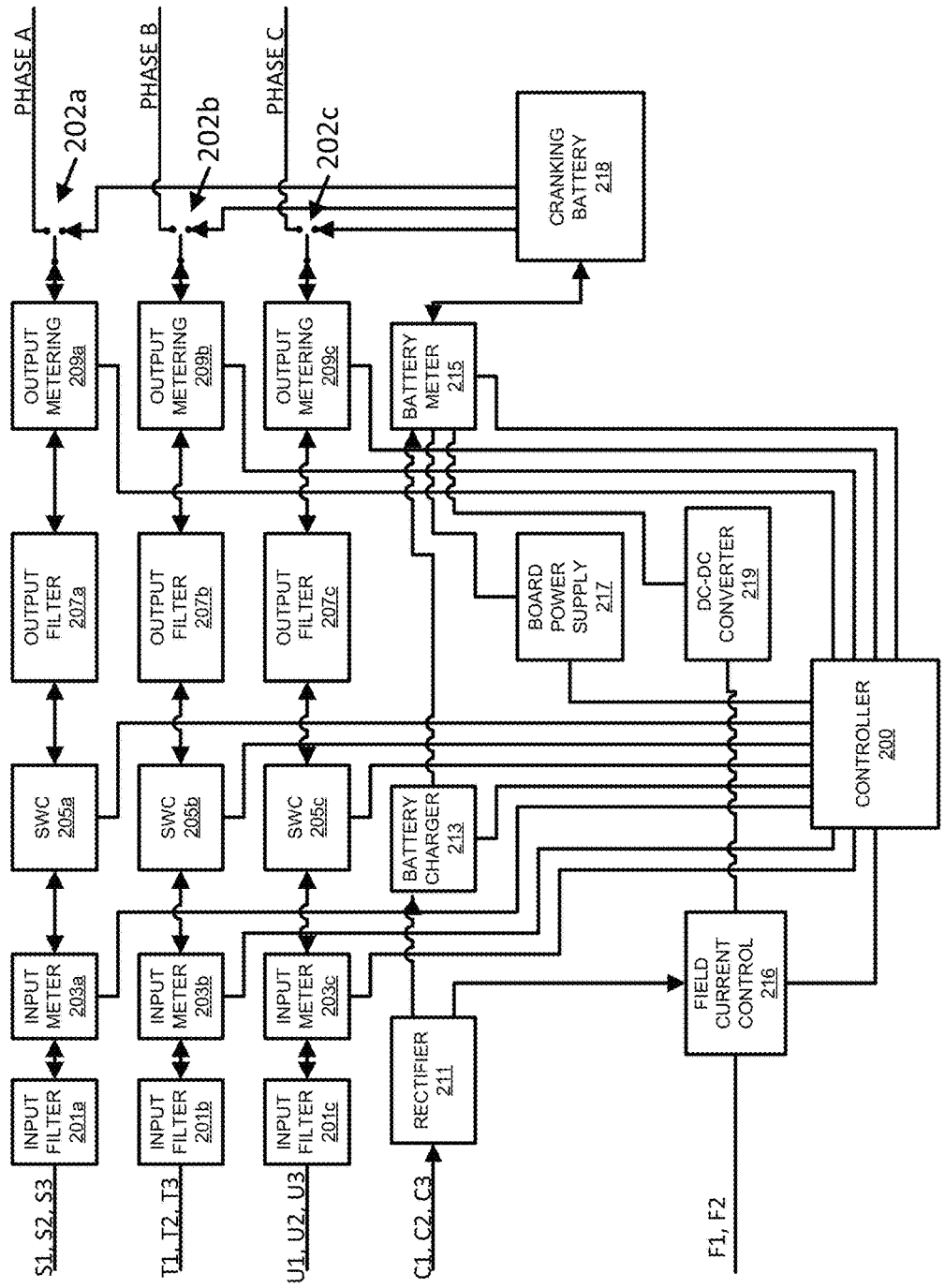
FIG. 14 an example block diagram for an example synchronous inverter system.

FIG. 14 illustrates a block diagram for an example synchronous inverter system. The example synchronous inverter contains three segmented waveform converters 205a, 205b and 205c which may provide the potential to produce three-phase output power through the filter circuits 207a, 207b, and 207c. The segmented waveform converters 205a, 205b and 205c may be supplied with controlled voltages S1, S2, S3, T1, T2, T3, U1, U2 and U3 from the alternator 13 through the input filters 201a, 201b, and 201c. The input voltages S1, S2, S3, T1, T2, T3, U1, U2 and U3 may be adjustable using the field current control device 216. The field current control device 216 may be circuitry or a device configured to receive a command or control signal from the microcontroller 200 and generate a field current in response to the command. The control signal or command for field current control device 216 may be generated by the microcontroller 200. The segmented waveform converters may be controlled based on the input metering 203a, 203b and 203c and the output metering 209a, 209b and 209c. The segmented waveform converters may be controlled by the microcontroller 200.

The cranking battery voltage may be applied to the segmented waveform converters 205a-c through the filters 207a-c by switching output contactors 202a-c. The synchronous inverter may provide engine cranking capability using the segmented waveform converters 205a-c to provide a three-phase AC voltage on the alternator windings. Voltages S1, S2 and S3, T1, T2 and T3 and U1, U2 and U3 may be galvanically isolated from each other. Voltages S1, S2 and S3, T1, T2 and T3 and U1, U2 and U3 may be connected to separate windings in the alternator 13.

The cranking battery 218 may be charged from the inputs C1, C2 and C3 from the alternator 13. The voltage generated on C1, C2 and C3 may be galvanically isolated from the voltage generated on S1, S2, S3, T1, T2, T3, U1, U2, and U3. The voltage provided to C1, C2 and C3 may be generated by a separate winding in the alternator 13. The battery charger 213 may receive a rectified DC voltage from C1, C2 and C3 through the rectifier 211. The battery charger 213 may be controlled based on a fixed sequence. The fixed battery charging sequence may include a bulk charge mode where the voltage is maintained at a higher level until the current drops below a threshold, a float mode where the voltage is maintained at a low enough level to avoid overcharging the battery and an equalize mode where the voltage is increased for a short duration to ensure that the charge in all cells in the battery is equal. The battery charger 213 may be controlled based on the battery metering 215. The battery charger 213 may be controlled by the microcontroller 200. The microcontroller 200 may be powered by the board power supply 217. All components on the synchronous inverter may be switched at the same frequency to minimize electromagnetic interference (EMI) due to aliasing of the signals.

The input filters 210a-c may provide protection to the switches in the segmented waveform converters 205a-c in addition to the snubber circuits provided with the switches. In addition, the input filters 201a-c may provide a bypass path for the current flowing through the inductance of the output windings supplying S1, S2, S3, T1, T2, T3 U1, U2 and U3, allowing the current to be switched as necessary to minimize the THD of the output voltage.

The output filters 207a-c may provide a bypass for the high-frequency switching noise from the segmented waveform converters 205a-c. The microcontroller 200 may determine the voltage on the output and the current in the filter inductor using the output metering 209a, 209b and 209c. The microcontroller 200 may determine the output current from the inverter based on the filter inductor current, the voltage on the filter capacitor, the switching position, past information from a variety of signals, and system parameters such as the capacitance of the filter capacitor and the inductance of the filter inductor. The microcontroller 200 may determine the capacitance value of the filter capacitor over time. The microcontroller 200 may learn the inductance of the filter inductor over time. The output metering 209a, 209b and 209c may include measurement of the output current.

The microcontroller 200 may determine a real and reactive droop characteristic based on the computed or measured output current from each inverter. The real and reactive droop characteristic may be used to operate seamlessly in parallel with a standard generator. The real and reactive droop characteristics may allow for parallel operation with another generator using a synchronous inverter. The output of the generator may be protected outside the four-quadrant capability curve for the generator by opening all switches, closing all switches, some combination thereof, or some other function of microcontroller control.

Figure 15:
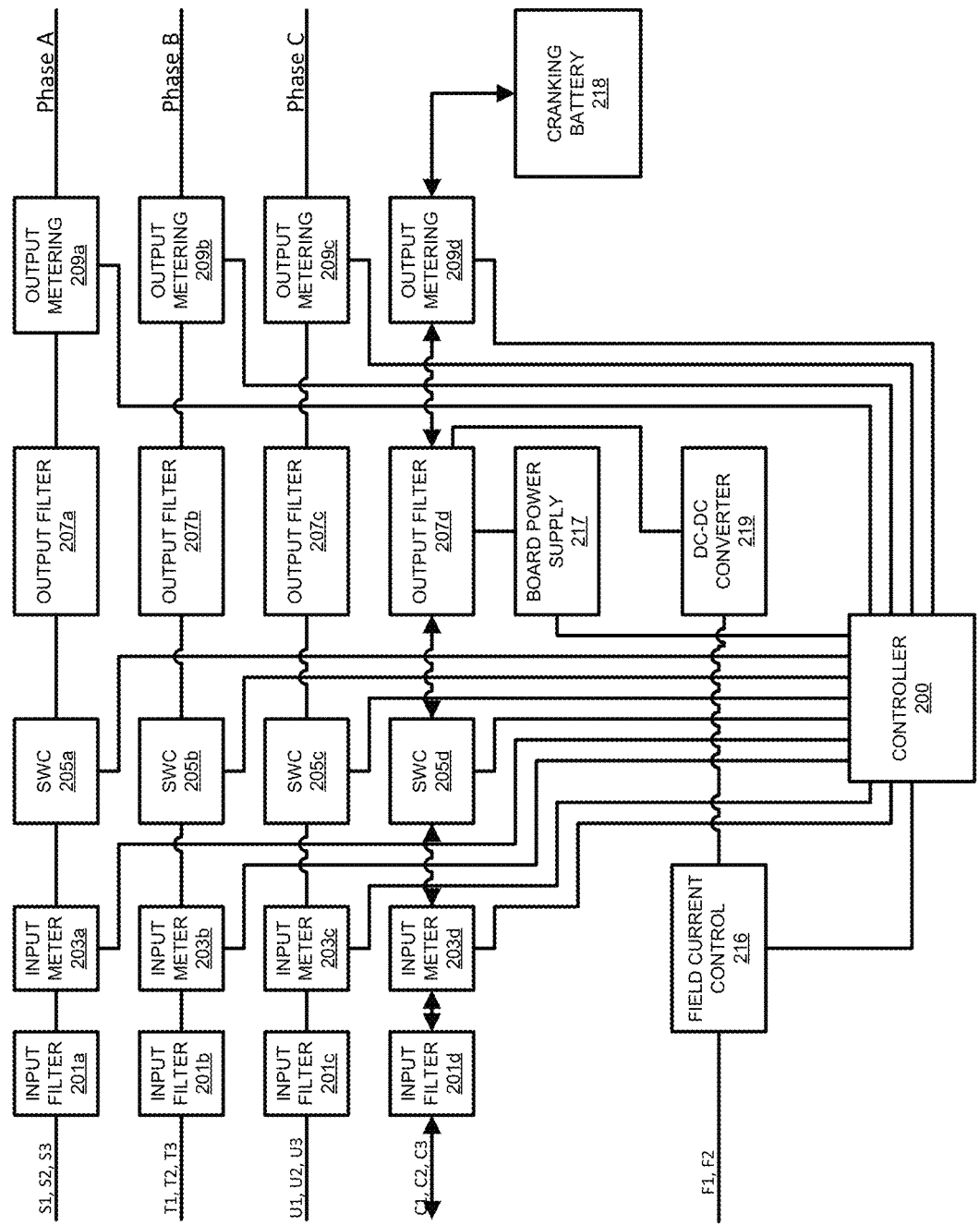
FIG. 15 illustrates a block diagram for another example synchronous inverter system.

FIG. 15 illustrates an example synchronous inverter topology that provides a segmented waveform converter on C1, C2 and C3 to crank the engine. The example is similar to that illustrated in FIG. 14 with the addition of the fourth segmented waveform converter 205d, as well as corresponding input filter 201d, input meter 203d, output filter 207d, and output metering 209d, and the removal of output contactors 202a-c. The additional segmented waveform converter 205d may provide the capability of sourcing AC output voltage from the generator without running the engine if a magnetic flux is applied to the stator without exciting the rotor field. The magnetic flux applied to the stator through windings C1, C2 and C3 may generate a voltage on windings S1, S2, S3, T1, T2, T3, U1, U2, and U3 of the alternator 13. This capability may require different alternator topology such as the ability to disconnect the rotor field from the exciter armature or rectifier and the removal of any damper or induction windings in the rotor.

When cranking battery voltage is applied to segmented waveform converters 205a-c, the synchronous inverter may crank the engine. The crank sequence may be initiated by a digital signal, a communications signal, a state of existing inputs and outputs, or by the presence of cranking battery voltage on the outputs as detected by the output metering 209a, 209b and 209c. Cranking may be controlled by the microcontroller 200. Cranking may be performed by measuring a phase angle of the alternator rotor and moving a magnetic flux to a position at a given angle away from the rotor position. Cranking may be controlled by measuring a speed of the alternator rotor and rotating a magnetic flux at a given difference in speed, also called slip frequency. Cranking may my controlled by providing a fixed rotation frequency in a known direction without feedback from the engine.

Combining the control of input voltage and frequency within the same synchronous inverter that provides the output voltage and frequency may provide various advantages. As an example, the synchronous inverter may provide 139 VAC line to neutral in order to produce 240 VAC line to line in a low-wye configuration or 480 VAC line to line in a high wye configuration. Providing this additional voltage may require increased input voltage from the alternator, but such increased voltage may be unnecessary when providing 120 VAC line to neutral to produce 208 VAC line to line. Including control of the engine speed may allow the synchronous inverter to improve the efficiency of the system by minimizing the engine speed or improve efficiency by providing a frequency that is an integer multiple or simple ratio to the desired output frequency. In addition, control of the engine speed may allow the synchronous inverter to adjust voltage outside the range otherwise provided by adjusting the field current. As an example, the alternator may only be able to produce 90 VAC at 1000 RPM, but 100 VAC may be required to produce 139 VAC line to neutral. In this case, the synchronous inverter may increase the engine speed to 1100 RPM in order to provide 100 VAC.

The alternator field current may be provided by a battery, the AC output of the generator, a dedicated coil on the alternator, or a combination of sources. The synchronous inverter may control the field current using a half bridge supply or a full bridge supply. The half bridge supply may be capable of providing positive voltage to the field and allowing it to decay naturally. The full bridge supply may be able to provide a negative and positive voltage to the field, increasing and decreasing the current more quickly. The half-bridge driver may be provided with battery voltage or with a higher voltage generated from the battery voltage or another source. The full-bridge driver may be provided with battery voltage or with a higher voltage generated from the battery voltage or another source.

Combining engine starting capability into the synchronous inverter may allow the total system complexity to be reduced by utilizing the same components for both operations and eliminating the need for a separate starting motor. Starting using the alternator may provide quieter starting operation by removing the power transfer through spur gears on the starter motor and flywheel, lower current draw on the cranking battery by improved efficiency, reduced wear on the system due to minimized side loading while cranking, higher cranking speed due to lower loss connection, decreased package size and lower cost due to removal of the dedicated starting motor, and galvanic isolation due to the use of separate windings in the alternator from the battery charging windings.

Integrating battery charging in the inverter may decrease total package size by eliminating the battery charging alternator, improve reliability of the system by removing the drive mechanism for the battery charging alternator, reduce system complexity by eliminating one controller, provide galvanic isolation between the battery and the generator outputs by using a separate winding, and provide a high-voltage supply for the field from the battery charging windings.

The alternator 13 may have inductance in the stator which may cause voltage spikes on the input to the segmented waveform converter. The voltage spikes that are generated by the inductance may be minimized by the input filter, by control algorithms for the segmented waveform converters, and by control of the alternator field and engine speed.

The output of the synchronous inverter may be used to operate a motor, similar to a variable frequency drive operation. The segmented waveform converter topology may allow for bi-directional power transfer from the motor, allowing regenerative breaking from the motors. If multiple motors are being driven by a given generator, power may be transferred from one motor to the other.

The alternator may have slightly varying characteristics with temperature and manufacturing tolerance stackup. The microcontroller in the inverter may adapt to the changing characteristics to allow for consistent operation between all products utilizing the synchronous inverter configuration. The engine performance characteristics may also vary with atmospheric conditions, manufacturing tolerances, fuel types and maintenance items. The microcontroller may be able to adapt to the engine characteristics in order to provide expected power quality over the entire load range.

The microcontroller 200 may control the output voltage using closed-loop feedback from the output metering. The microcontroller 200 may control the output voltage as a function of the input voltage. The voltage may be controlled with a combination feedback and feed-forward system, with feed-forward tables that may provide adaptive learning capability.

In a short circuit condition, the microcontroller 200 may control the output current using closed loop feedback from the output metering. The output filter inductor may limit the rise rate of the output current, potentially protecting the switches from damage when sourcing into a short-circuit condition. The short circuit current may be controlled by the switches in the segmented waveform converters, the excitation level in the alternator, or a combination of the two. In addition the output current may be controlled in a scenario where the inverter is connected to a motor in order to limit motor torque.

In cases were multiple inverters are used, the inverters may communicate a synchronizing signal in order to match phase angle across different inverters. The synchronizing signal may be provided over communications, a digital signal, and analog signal, or by observation of the input voltage from the alternator, among other techniques. The sync signal may provide loading information, target information, control mode, connection information, etc. If multiple inverters are used, only one inverter may have control of the field current. That said, the other inverter(s) in the system may want to adjust their supply voltage, so the inverters may communicate a desired input voltage over the communications network, a digital signal or an analog signal.

If multiple inverters are used in parallel, the inverters may need to share loading information in order to equalize the load on each inverter. This may be provided by communications, digital signals, analog signals, or simple droop handling.

The output voltage from different inverters may be tied in parallel with other inverters, or even multiple output stages from a single inverter may be connected together. The configuration of the output of the inverter may be user-adjustable or it may automatically detect that outputs are connected together in order to determine how to control the voltage. Automatic connection detection could involve a specific power up sequence where one inverter stage observes voltage on the input, it could involve current monitoring for abnormalities, it could involve transmission of a special signal on the outputs to be received by another device, or another technique.

Figure 16:
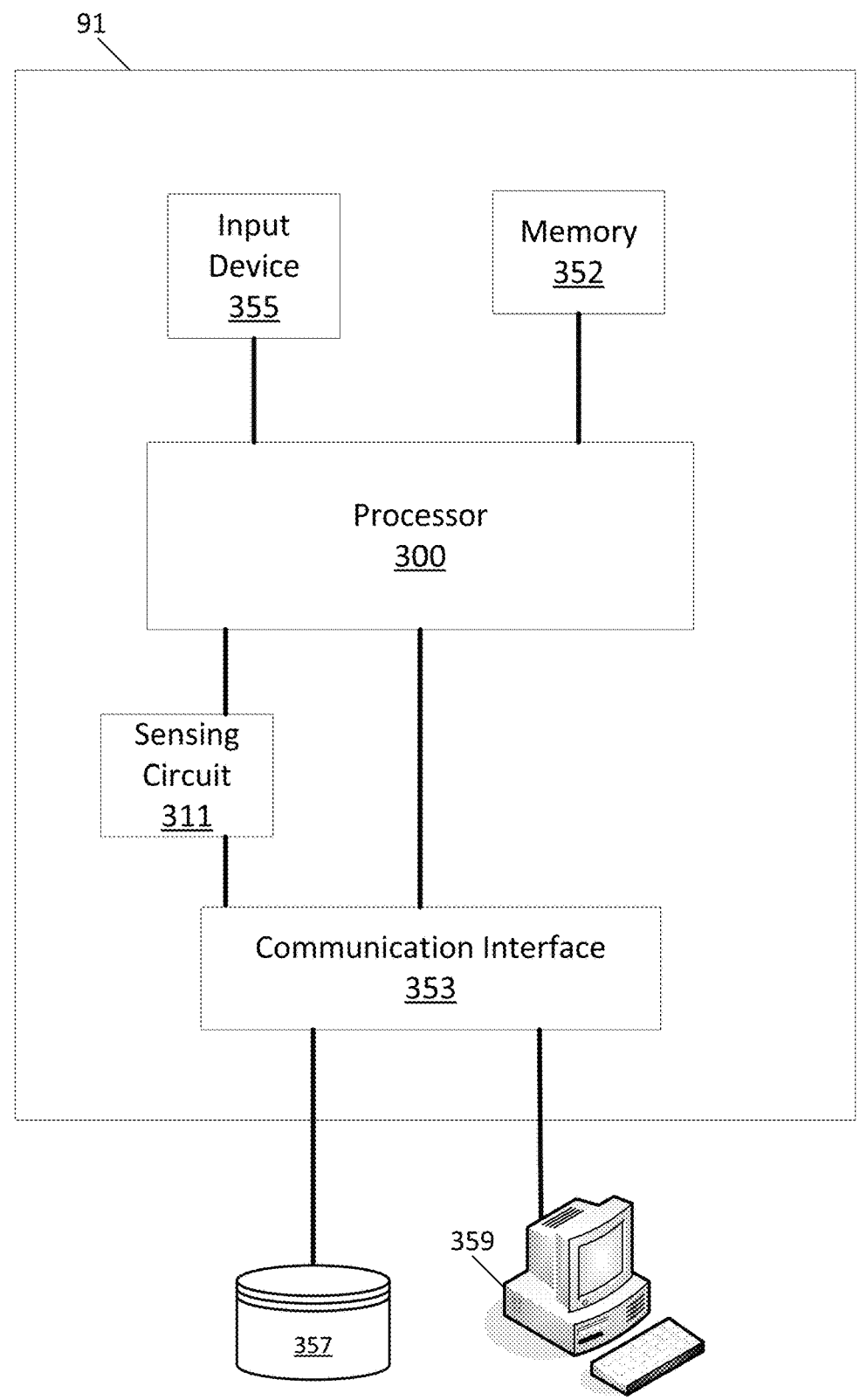
FIG. 16 illustrates an example controller.
Figure 17:
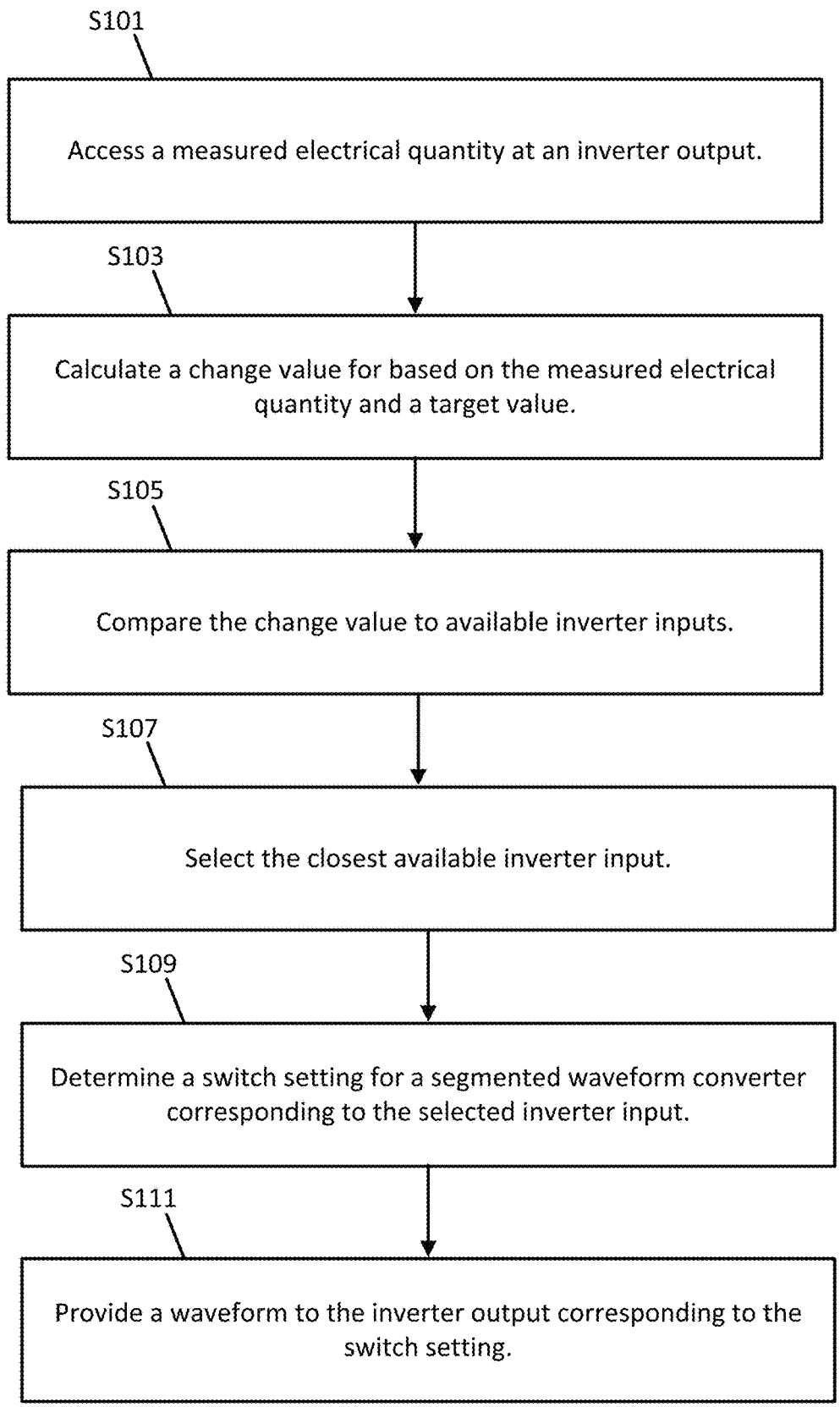
FIG. 17 illustrates a flow chart for the controller of FIG. 15.

FIG. 16 illustrates an example generator controller 91. The generator controller 91 may include a processor 300, a memory 352, and a communication interface 353. The generator controller 91 may be connected to a workstation 359 or another external device (e.g., control panel) and/or a database 357 for receiving user inputs, system characteristics, and any of the values described herein. Optionally, the generator controller 91 may include an input device 355 and/or a sensing circuit 311. The sensing circuit 311 receives sensor measurements from as described above (e.g., alternator output SWC output). Additional, different, or fewer components may be included. The processor 300 is configured to perform instructions stored in memory 352 for executing the algorithms described herein. The processor 300 may be compatible with a variety of engine and alternator combination and may identify an engine type, make, or model, and may look up system characteristics, settings, or profiles based on the identified engine type, make, or model. FIG. 17 illustrates a flow chart for the operation of the generator controller of FIG. 16. Additional, different of fewer acts may be included.

At act S101, the processor 300 accesses from memory 352 or from real time measurement (e.g., sensing circuit 311), a measured electrical quantity at an inverter output. The inverter output may be an actual power signal applied to a load under a specification. The specification may be a target value for a sinusoidal signal at time intervals. Alternatively, the target value may specify an amplitude range or root mean squared range for the inverter output. The target value may specify a variance or quality (e.g., THD) level for the inverter output.

At act S103, the processor 300 calculates a change value for based on the measured electrical quantity and the target value. In other words, the processor 300 determines the difference between the target value and the actual value of the inverter output. The change value may be either positive or negative.

At act S105, the processor 300 compares the change value to available inverter inputs. One set of available inverter inputs is shown on each row of Table 1 above. The available inverter inputs depend on either the expected or actual values of outputs of the alternator. For example, in a three phase alternator having outputs A, B, and C, the set of outputs may be A, B, C, A–B, B–C, A–C, B–A, C–B, and C–A. Each of the set of outputs has a value, which changes on each time interval (e.g., sampling interval).

At act S107, the processor 300 selects a closest available inverter input combination (alternator output) based on the comparison. In one embodiment, the closest available inverter input combination is used without modification. In another embodiment, the closest available inverter input combination is modified to more closely achieve the target value using PWM.

At act S109, the processor determines a switch setting for a switch array of a segmented waveform converted corresponding to the selected inverter input combination. The switch setting is a digital signal or series of bits that describes which of the switches of the segmented waveform converter should be turned on and off in order to provide the selected inverter input combination.

At act S111, the processor 300 provides a waveform to the inverter output corresponding to the switch setting. In one example, the processor 300 calculates a difference between the closest available inverter input combination and the target value, and modifies the waveform using a pulse width modulated signal with a duty cycle that is based on the difference between the closest available inverter input and the target value.

Figure 18:
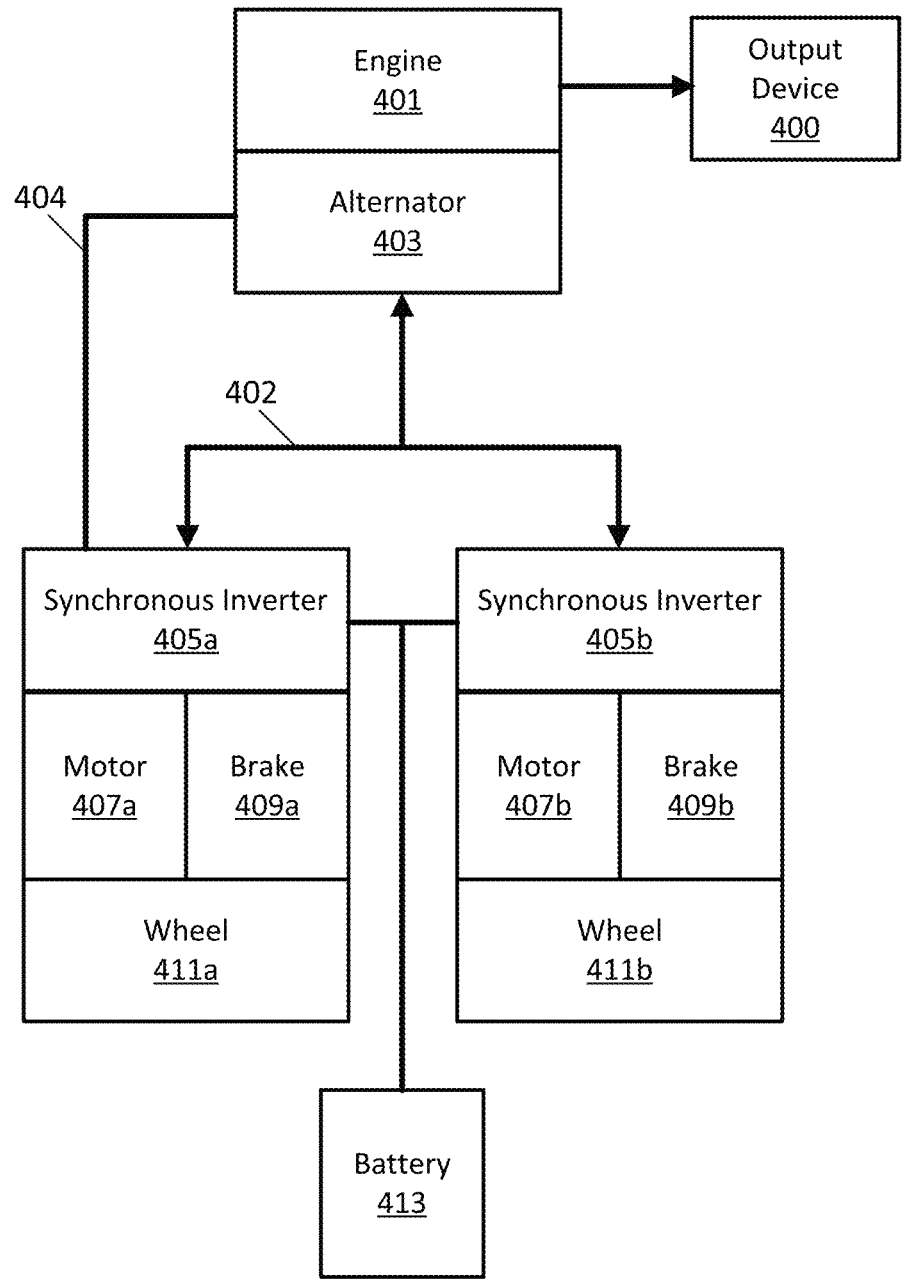
FIG. 18 illustrates an example alternator and two synchronous inverters.

FIG. 18 illustrates an example system including an engine 401, an alternator 403, two synchronous inverters or segmented waveform converter 405a and 405b, an output device 400, and a battery 413. One of the synchronous inverters 405a is coupled with a motor 407a, a brake 409a, and a wheel 411a, and the other of the synchronous inverters 405b is coupled with a motor 407b, a brake 409b, and a wheel 411b. Either or both of motors 407a and 407b are examples of an output drive mechanism for the system. The motors 407a and 407b may be referred to individually and interchangeably as motor 407, the brakes 409a and 409b may be referred to individually and interchangeably as brake 409, and the wheels 411a and 411b may be referred to individually and interchangeably as wheel 411. The engine 401 may directly drive the output device 400. Additional, different, or fewer components may be included.

The alternator 403 is mechanically coupled with the engine 401. As described in earlier embodiments, the rotation of an output shaft of the engine 401 rotates an exciter portion and a main field portion of the alternator 403. The exciter portion includes an exciter armature for generating a field current to induce a time varying magnetic flux in the armature windings, generating voltage. The induced voltage in the windings of the exciter armature is connected to the main field portion of generator. The corresponding field current of the output of the exciter provides a magnetic field in rotor field of the main field portion of the generator. As the main field portion of the alternator is rotated relative to the stator, a magnetic flux is passed through and across the alternator stator windings producing an alternator output signal in bus 402. Alternate forms of field control are included herein as well (e.g. brushes and slip rings, flux weakening coils, direct axis current injection).

The alternator output signal may include multiple components that are selectively controlled by the synchronous inverters 405a and 405b. The derivation of the output of the synchronous inverters 405a and 405b, or the conversion of the alternator output signal to the output of the synchronous inverters 405a and 405b may be performed by generator controller 50, generator controller 91, or microcontroller 200 (any one referred to individually as "controller") in the examples described previously. The controller may consult a lookup table or a configuration value that is specifically tailored to a particular type of motor application of the motor, or feedback based on the current operation of the motor. The controller may determine switch settings for multiple settings that set the output of the synchronous invertors as combination of the multiple components of the alternator output signal. One of the components may be passed or multiple components may be added or subtracted. The controller may apply the switch settings to at least one segmented waveform converter including multiple switches connected between the alternator 403 and the output drive mechanism (e.g., motors 407a and/or 407b).

The motors 407a and 407b may be AC motors comprising a stationary stator including coils supplied with alternating current by the synchronous inverters 405a and 405b (referred to individually or as synchronous inverter 405). The coils induce a rotating magnetic field that causes a rotor and attached to an output shaft of the AC motor to rotate. The stator and rotor may be housed in a casing, and the stator may be mechanically coupled to the casing. The output shaft may be rotatably mounted to the casing using a bearing.

The output of the synchronous inverter 405 may include a drive frequency that causes the output shaft of the motor to rotate at a particular speed. In one example, the speed of the output shaft in rotations per second is the same as the drive frequency in cycles per second or related by a predetermined ratio. In other examples, as with induction motors, the drive frequency and shaft speed may not be related by a predetermined ratio. The predetermined ratio may depend on the numbers of poles in the rotor and/or the number of poles of the stator.

The output of the synchronous inverter 405 may be selected, via switch settings, to cause the speed of the output shaft to change in time. The changes in the speed of the output shaft may be within a time interval that is less than a single rotation of the output shaft or even less than a cycle of the output of the synchronous inverter 405, which may be referred to as electrical subcycle torque control. Electrical subcycle torque control applies in torque changes to the output shaft in less than an electrical cycle of the output of the synchronous inverter 405. Electrical subcycle torque control may be on the order of 1 to tens of milliseconds. In this way, very quick changes may be applied to the output shaft. The shaft may rotate at multiple speeds within just a few rotations or even a single rotation.

The controller may select the output of the synchronous inverter 405 based on a feedback signal for the rotation of the output shaft, an input signal, or both. The input signal may be from an input device for setting the speed of the rotor. The feedback signal may be generated by a sensor such as a rotation sensor. The rotation sensor may magnetically, optically or mechanically measure the rotation of the output shaft. Thus, the feedback signal may be indicative of the speed of the output shaft.

Also, the feedback signal could be derived from the output of the synchronous inverter 405. The controller may calculate shaft output characteristics such as speed or torque as a function of the synchronous inverter output voltage or current. The controller may compare the feedback signal to the input signal. When the input signal indicates a speed or torque for the output shaft that is greater than a speed or torque target, the controller decreases the frequency, voltage, or current output of the synchronous inverter 405. Likewise, when the input signal indicates the speed for the output shaft that is less than the target, the controller increases the frequency, voltage, or current output of the synchronous inverter 405.

Through the synchronous inverter 405, the speed of engine 401 and alternator 403 may be independent of the frequency applied to the motors 407 and accordingly, independent of the speed of the wheels 411. Therefore, the engine 401 and alternator 403 may be controlled only to optimize the output device 400 (e.g., speed of the cutting device) and the synchronous inverters 405 control the speed of the motors 407. Only the alternator 403 power or voltage output is controlled to sufficiently supply the synchronous inverters.

The speed of the engine 401 and the output of the synchronous inverters 405 may be independent within an operating range of the engine 401. Through the operating range, the output device 400 speed may be adjusted without interrupting the speed applied to the motors 407 and the wheels 411. In other words, when the engine 401 is operated within a predetermined power range or rotational speed range, the speed of wheels 411 may be operating in any predetermined speed range in which the power requirements are met by the predetermined power range of the engine 401.

The battery 413 is connected to the synchronous inverter 405 to act as a source and sink of power. The synchronous inverter 405 may be configured to charge the battery 413 or utilize the battery 413 as a source of power to crank the engine 401 via the alternator 403. The synchronous inverter 405 may also use the battery 413 in a limited capacity to deliver power to the motor 407 or actuate the brake 409. The system is capable of transferring power between components without use of the battery. The battery capacity may not be sufficient to provide full power to all components.

Power may also travel in the reverse direction, from the motor 407 to the synchronous inverter 405. For example, a reverse torque may be applied to motor 407a, which induces a reverse current though the synchronous inverter 405a to the alternator 403. Through the power bus 402, the reverse current may contribute to the power drawn by the synchronous inverter 405b and applied to motor 407b.

In one example, the system illustrated in FIG. 18 is applied to a vehicle such as a forklift, a loader, a golf cart, or a lawnmower such as a zero turn radius lawnmower. A zero turn radius lawnmower may be a lawnmower in which at least two wheels are individually controlled. While the term "lawnmower" may be used in some of the following embodiments, substitutes may be made for other types of vehicles. Aside from the deck and mower apparatus, the drive systems and synchronous inventors may be applied to other types of vehicles. Thus, each wheel 411a and 411b are individually controlled by the outputs of the synchronous inverters 405a and 405b. A first segmented waveform converter 405a is associated with a first wheel 411a of a vehicle and a second segmented waveform converter 405b is associated with a second wheel 411b of the vehicle. The first wheel 411a and/or the second wheel 411b is coupled to a drive train, which is the output drive mechanism (primary drive system), to propel the vehicle. In alternative embodiments, only a single wheel is controlled, multiple wheels are connected to a single motor, or three or more motors for multiple wheels are controlled.

Advantages of electrical control using the synchronous waveform converters may be realized over hydraulic or other mechanical systems. For example, in addition to the increased granularity of torque control, electrical drive is more efficient than hydraulic systems. The efficiency improvements save in fuel costs and a smaller engine may be selected. Electrical systems have other advantages over hydraulic systems including the elimination of hydraulic fluid spills, which may damage equipment or vegetation.

The lawnmower may also include a mowing system. The mowing system includes one or more blades configured to cut grass or other vegetation. The mowing system may correspond to output device 400. A shaft, belt or other drive train may mechanically connect the engine 401 to the output device 400. The output device 400 and the engine 401 may respond to the power requirements of cutting depending on the specific local requirements (e.g., thickness of the vegetation, water content, or other factors).

In operation, when the vehicle is traveling generally in a straight line the speed of the wheels is the same. However, when making turns, the inner wheel with respect to the curve or turn experiences a lower average speed or number of revolutions than the outer wheel with respect to the curve or turn. For the slower wheel to reduce speed, a brake 409 may be applied to the wheel 411. In addition, a power transfer (e.g., negative torque, reverse torque, rear facing torque) may be made from the inner wheel to the outer wheel. The kinetic energy of the rotating mass of the inner wheel is consumed to deliver power to the outer wheel, thereby effecting a braking force on the inner wheel while effecting an accelerating force on the outer wheel without drawing power from or as supplement to power delivered by the engine. As an example, the kinetic energy of the rotating mass of the inner wheel 411a is used to drive the motor 407a to generate power, controlled by synchronous inverters 405a, which is delivered via bus 402 to synchronous inverters 405b for drive of the outer wheel 411b. In a further embodiment, the power delivered by the inner wheel synchronous inverters 405*a* may be used to charge battery 413 or battery 505.

In one example, the controller is configured to generate and provide a magnetic field control signal to the controlled field alternator 403. The magnetic field control may adjust the field current. Alternatively, an armature reaction technique such as adjustment of current on flux weakening coils or a mechanical technique such as changing a linkage path of the magnetic path may be used to modify the magnetic flux or the magnetic field control signal. In other examples, a DC output from at least one of the segmented waveform converter may be applied to the controlled field alternator 403 as a field current. The DC output may be generated by circuit 35 described in other embodiments. The magnetic field control may be provided by one or more of the synchronous inverter DC outputs. Alternatively, the magnetic field control may be provided by another device with or without a signal from the synchronous inverters 405.

The DC output of the other synchronous inverter may be applied to a release mechanism for the brakes 409. The primary function of the brakes is to slow the wheels 411 when activated. However, the brakes 409 may include a safety mechanism (e.g., a spring) that defaults to biasing the brakes 409 to stop the vehicle. The safety mechanism may be released by an actuator (e.g., solenoid) when so signaled by the DC output of the synchronous inverter. This causes the brakes to be applied when the engine 401 or the synchronous inverter is off and to be released when the engine 401 or the synchronous inverter is running and applying the DC output.

The DC output of the other synchronous inverter may be applied to another purpose such as a control panel, safety mechanism, or status indicator. The control panel may include an interface for setting the output of the synchronous inverter. The safety mechanism may be a circuit to measure an electrical quantity of the synchronous inverter and compare to a threshold and identify an error with the threshold is exceeded. The status indicator may include one or more lights or displays that indicates the synchronous inverter. In another embodiment, the DC output of the other synchronous inverter may be used to power an accessory outlet or lighting of a configurable AC or DC nature.

Figure 19:
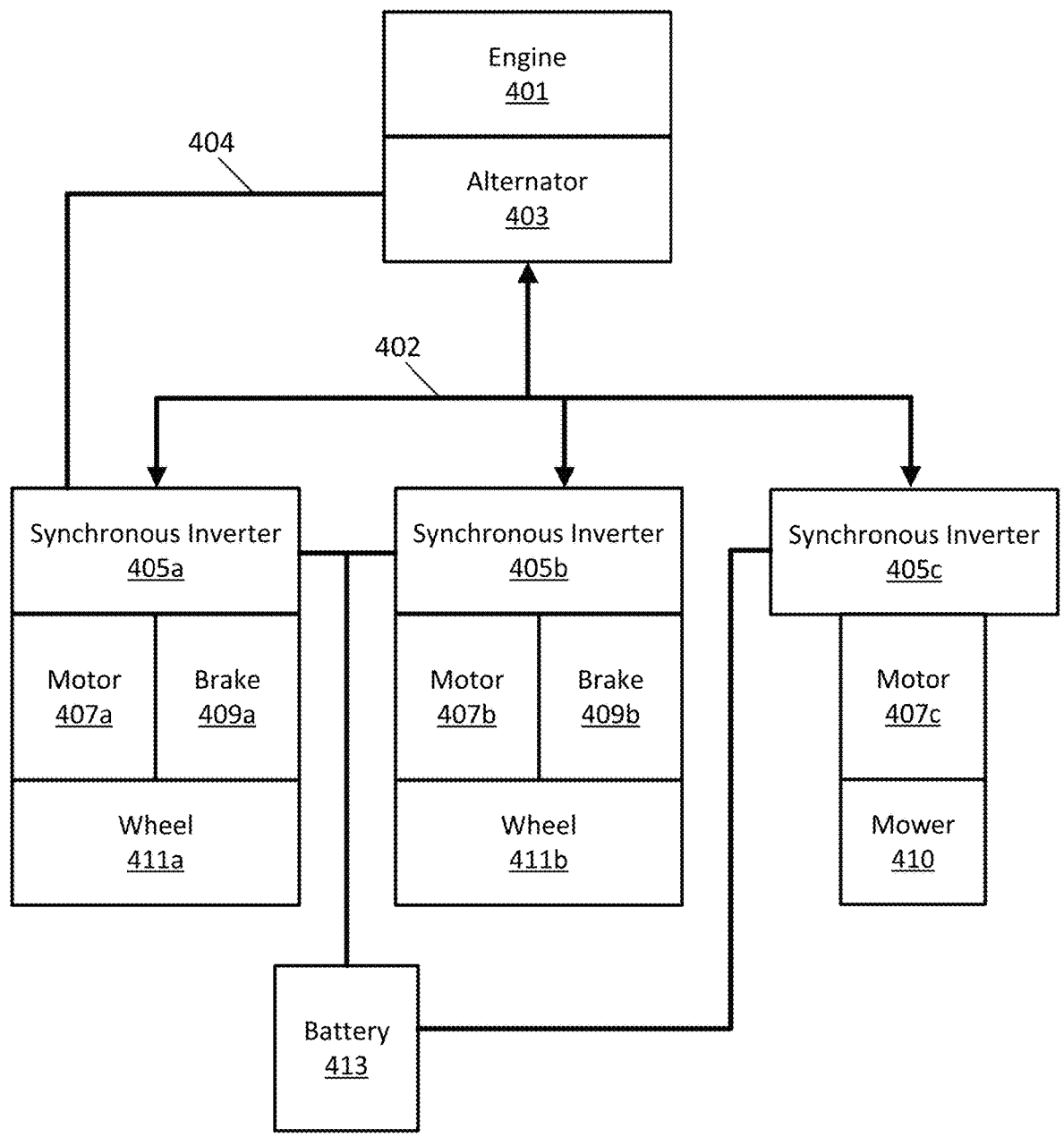
FIG. 19 illustrates an example alternator and three synchronous inverters.

FIG. 19 illustrates an example alternator and three synchronous inverters for a lawnmower. Similar components illustrated previously are consistent with FIG. 19. Additional, different or fewer components may be included.

FIG. 19 includes a third synchronous inverter 405*c* that controls a third motor 407*c* for the mower 410 (e.g., mower deck). Thus, the output drive mechanism (secondary drive system) coupled with the synchronous inverter 405*c* drives the mower 410. In this embodiment, the engine 401 only drives the alternator 403. Control of engine speed and torque may be made solely on total power requirements of the system, which may be balanced and allocated by the synchronous inverters 405. In other words, cutting speed for the mower 410 is independent of engine speed and the speed of each of the wheels 411 is independent of the engine speed. As well, the cutting speed for the mower 410 may be independent of the speed of each of the wheels 411 (e.g., wheel 411*a* is independent of mower 410, wheel 411*b* is independent of mower 410, and wheel 411*a* is independent of wheel 411*b*). In the embodiment of FIG. 19, any of the DC outputs of the synchronous inverters 405 may supply the field current to the alternator 403. In one example, the magnetic field control is provided by synchronous inverter 405*c* that drives the mower 410.

Figure 20:
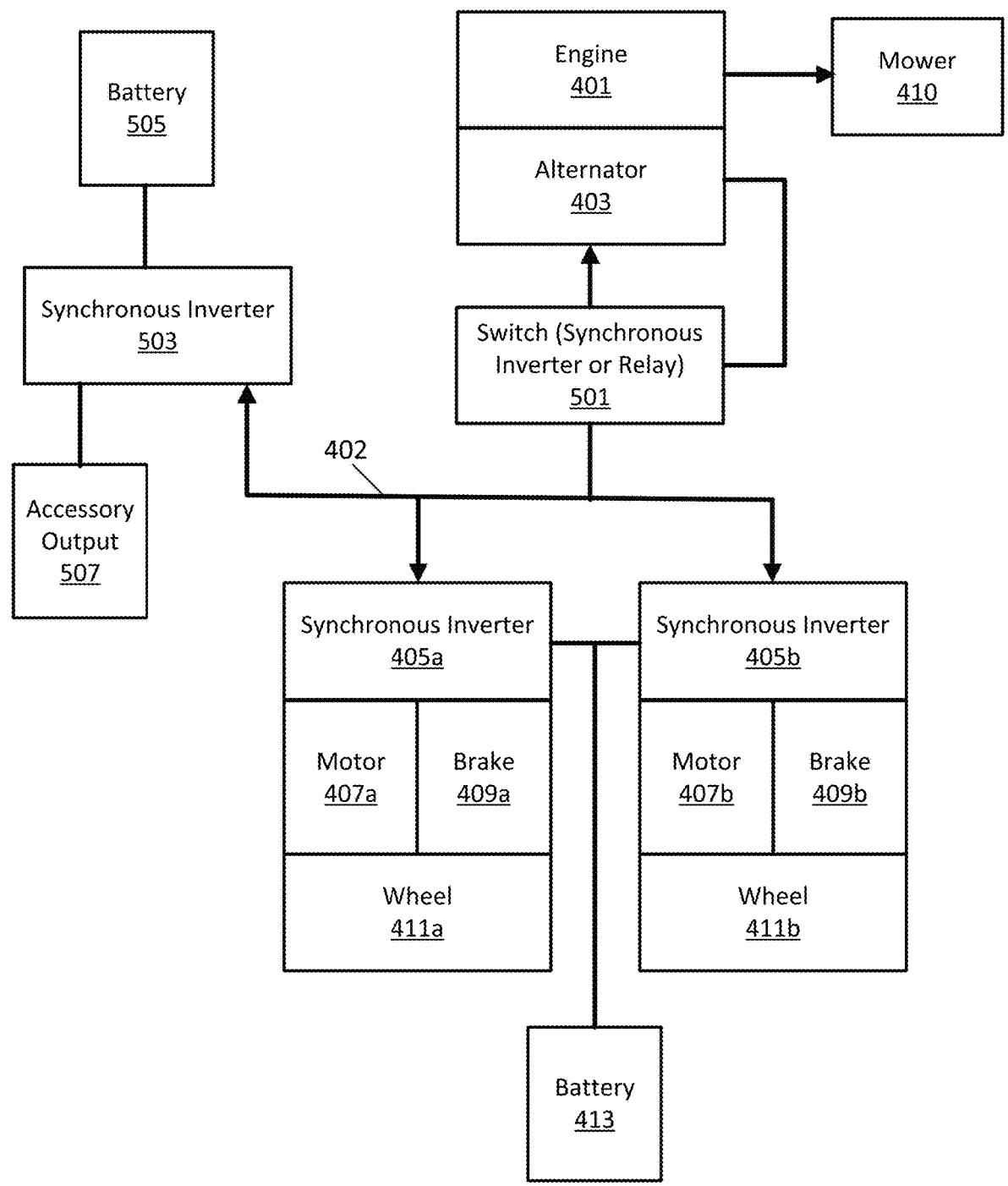
FIG. 20 illustrates an example lawnmower implementing a synchronous inverter for battery charging.

FIG. 20 illustrates an example lawnmower implementing a synchronous inverter for battery charging. The engine 401 in the embodiment of FIG. 20 directly drives the mower 410. Similar components illustrated previously are consistent with FIG. 20. Additional, different or fewer components may be included.

A synchronous inverter 503 (supplemental segmented waveform converter), which may also be configured and operated by the controller, applied power from battery 505 to the power bus 402, and accordingly, to synchronous inverters 405 and the motors 407. Power may also flow in the reverse direction. That is, when braking or otherwise slowing one of the wheels 411, the motor 407 may act as a generator and provide power back to synchronous inverter 503 to charge the battery 505. Therefore, either of synchronous inverters 405*a* and 405*b* may charge the battery 505.

A switch 501, which may be implemented as a relay or an addition synchronous inverter, connects and disconnects the alternator 403 to the power bus 402. The switch 501 may also be operated by the controller.

At accessory output 507 provided by the synchronous inverter 503 may power other electrical systems or accessories of the lawnmower. The other accessories may include headlights, gauge panels, turn signals, horns, radios, or other devices.

Figure 21:
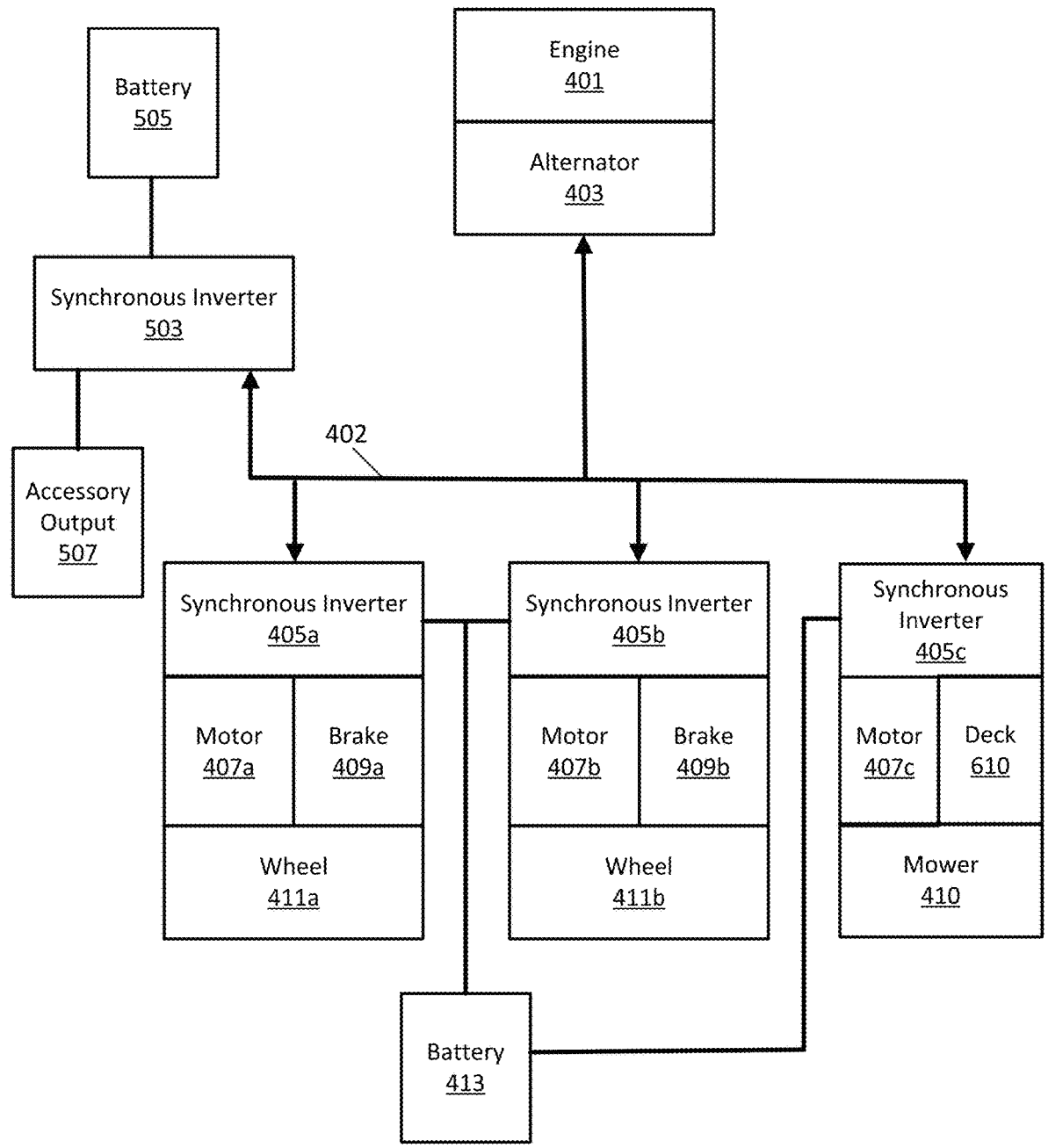
FIG. 21 illustrates an example lawnmower implementing three synchronous inverters in addition to a synchronous inverter for battery charging.

FIG. 21 illustrates an example lawnmower implementing three synchronous inverters in addition to a synchronous inverter for battery charging. Similar components illustrated previously are consistent with FIG. 21. Additional, different or fewer components may be included.

In this embodiment, synchronous inverter 405*c* provides power to motor 407*c*, which drives mower 410. In addition, the DC output of the synchronous inverter 405*c* may set the height of deck 610 of the mower 410. The controller may receive a user input for deck height (e.g., distances from the ground) and in response, control the switch settings of synchronous inverter 405*c* to raise or lower the deck 610 using another motor or drive mechanism.

Figure 22:
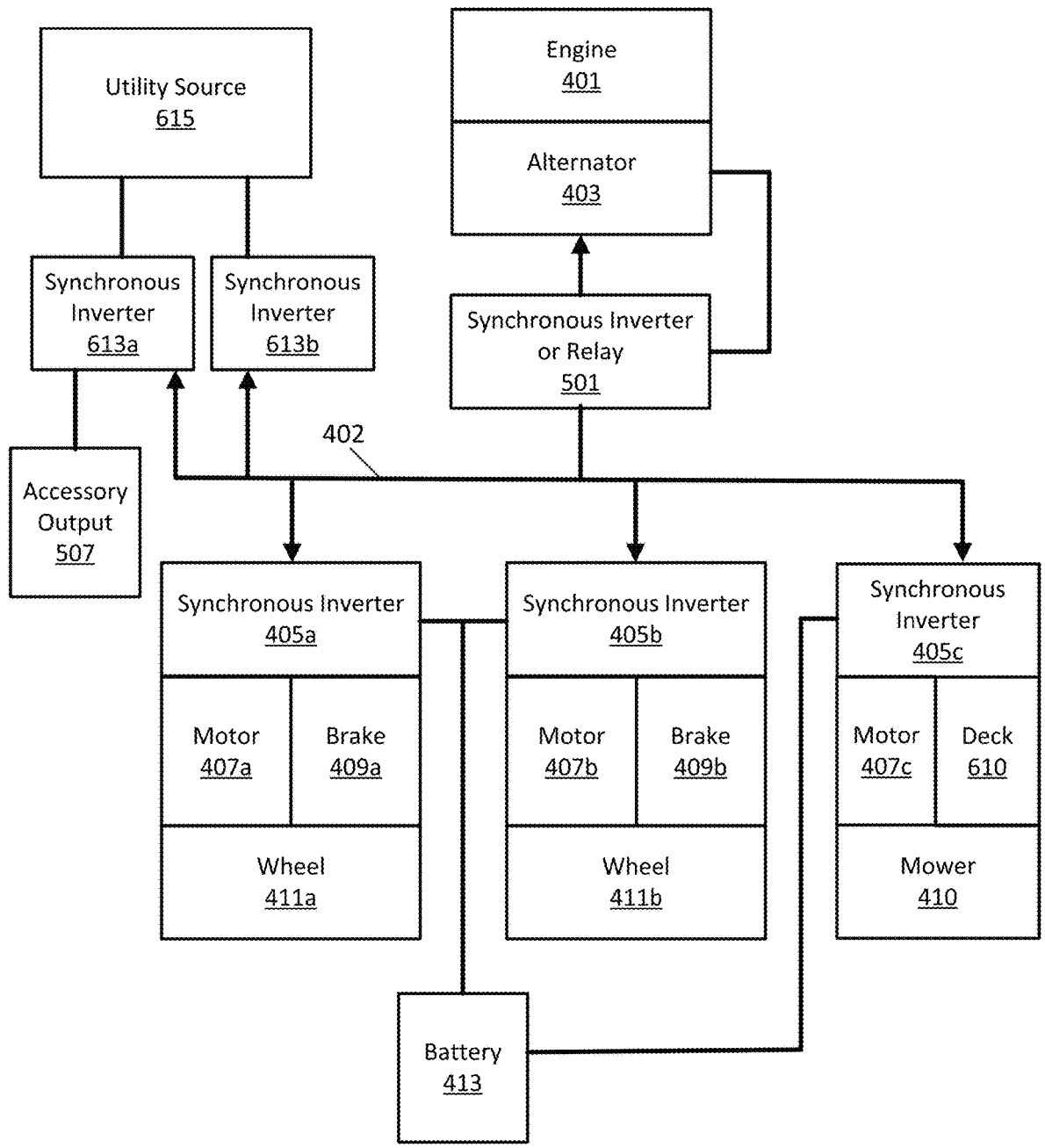
FIG. 22 illustrates an example lawnmower implementing three synchronous inverters and a utility source.

FIG. 22 illustrates an example lawnmower implementing three synchronous inverters and a utility source. Similar components illustrated previously are consistent with FIG. 22. Additional, different or fewer components may be included.

The embodiment of FIG. 22 includes a utility source that may also provide power to the power bus 402 through synchronous inverters 613*a* and 613*b*. Any number of synchronous inverters may be coupled to the utility source 615. The utility may be an AC source provided to the lawnmower through a variety of delivery mechanisms. In one example, an electrical cord may extend to the vehicle from the utility (e.g., electrical outlet). Alternatively, an inductive or other wireless coupling may provide the utility source 615. For example, one or more inductive coils may be buried or otherwise placed beneath a driving surface. The inductive coils induce a voltage on one or more receiving coils in the lawnmower and provide power to the synchronous inverters 613*a* and 613*b*, which are configured and operated by the controller.

Figure 23:
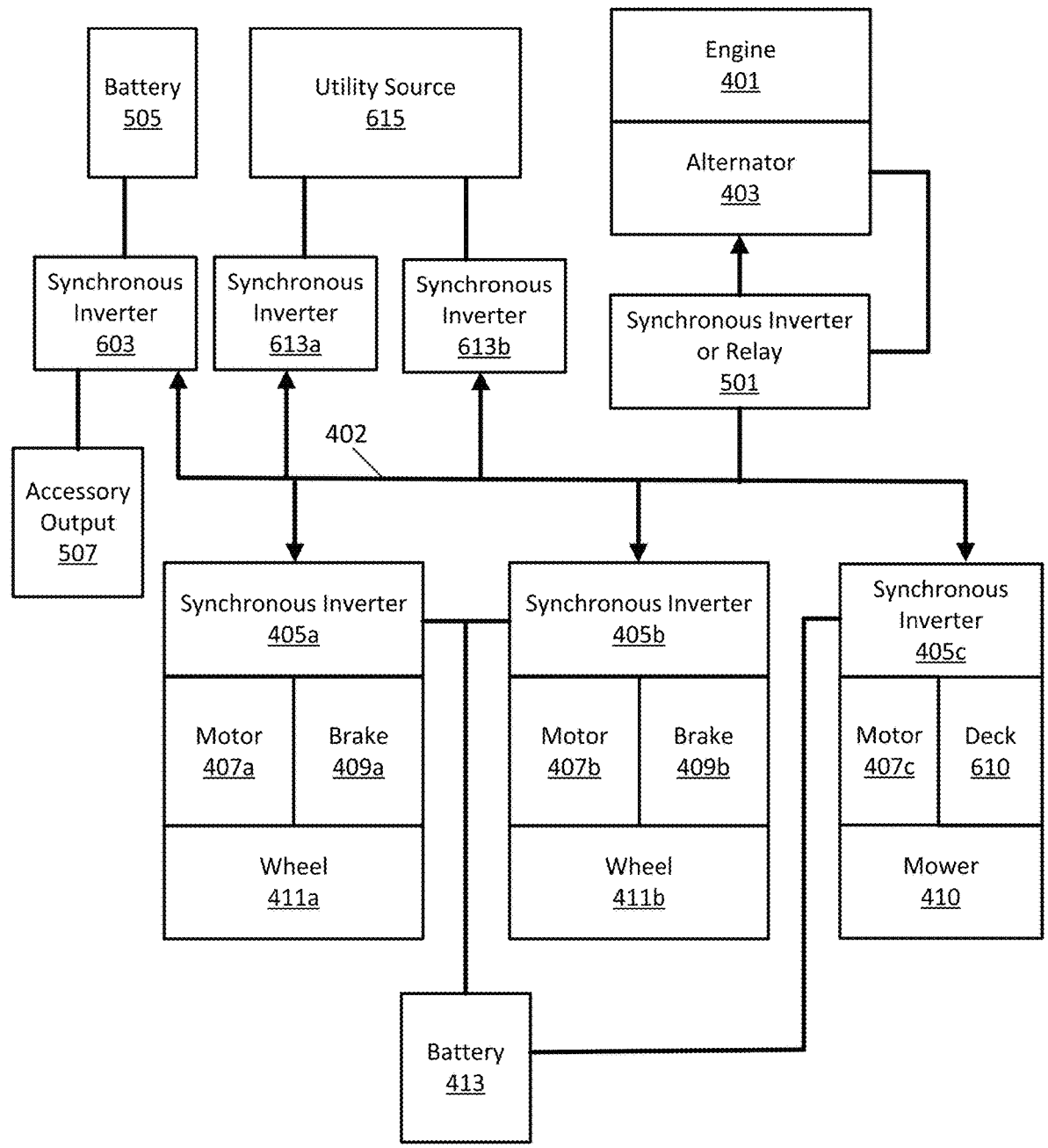
FIG. 23 illustrates an example lawnmower implementing synchronous inverters and supplemental synchronous inverters for battery charging and a utility source.

FIG. 23 illustrates an example lawnmower implementing synchronous inverters for the drive of the motion of the lawnmower, mowing of the lawnmower, and supplemental synchronous inverters for charging the battery 505 and the utility source 615. Similar components illustrated previously are consistent with FIG. 23. Additional, different or fewer components may be included.

Depending on the circumstances or current settings, the utility source 615, the battery 505 and/or the alternator 403 may provide power to the wheels 411a and 411b through synchronous inverters 405a and 405b and/or the mower 410 and/or deck 610 through the synchronous inverter 405c. Also depending on the circumstances or current settings, the utility source 615 and/or the alternator 403 may charge the battery 505 through the synchronous inverter 603.

Figure 24:
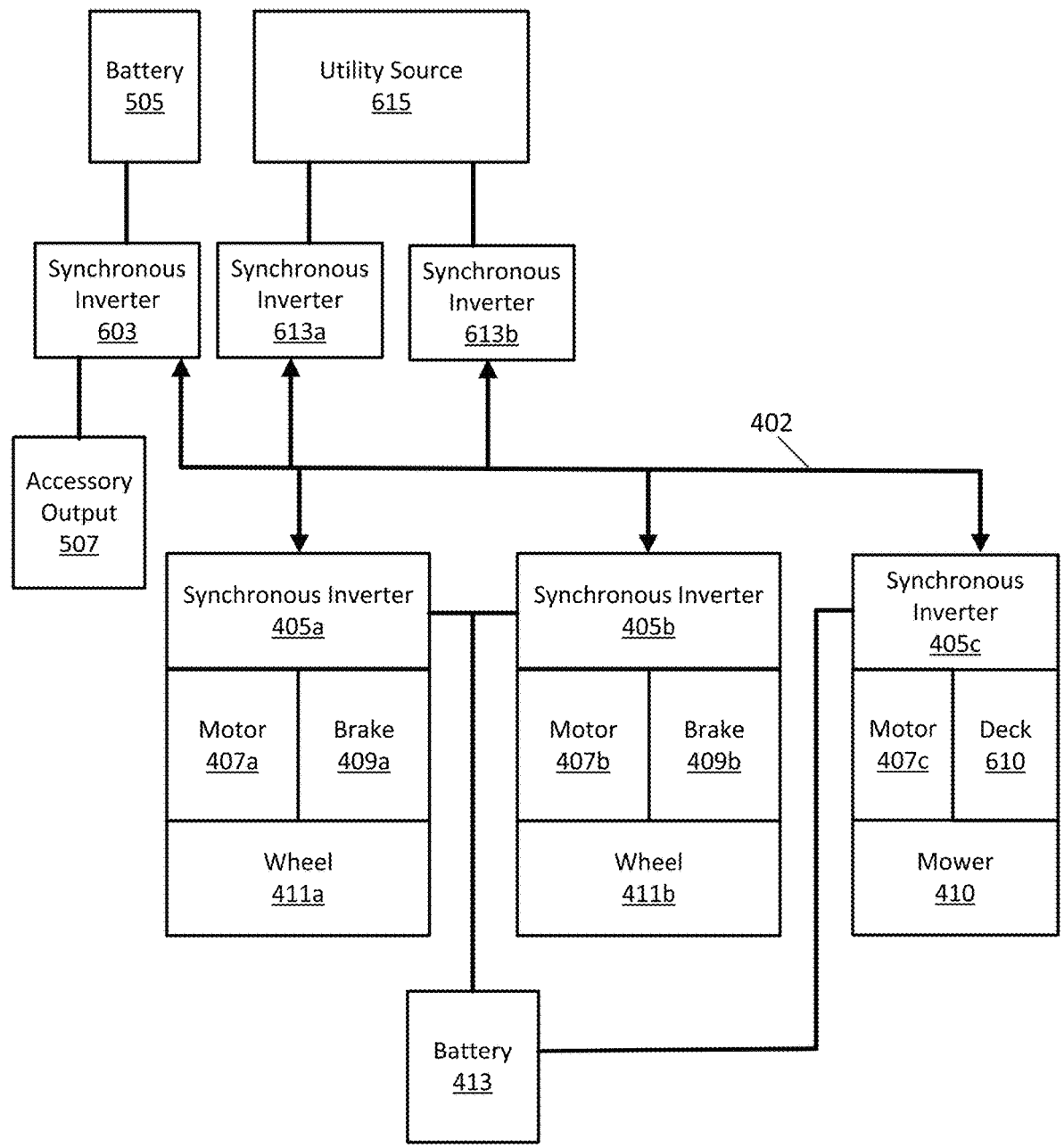
FIG. 24 illustrates an example lawnmower and a utility source.

FIG. 24 illustrates an example lawnmower and a utility source and no engine. Similar components illustrated previously are consistent with FIG. 24. Additional, different or fewer components may be included.

Depending on the circumstances or current settings, the utility source 615 and/or the battery 505 may provide power to the wheels 411a and 411b through synchronous inverters 405a and 405b and/or the mower 410 and/or deck 610 through the synchronous inverter 405c. Also depending on the circumstances or current settings, the utility source 615 may charge the battery 505 through the synchronous inverter 603.

The battery 505 may also provide power to an external device such as a light tower. For example, at some times the utility source 615 charges the battery 505 when the utility (e.g., induction coils) are nearby, and when the lawnmower is remote from the utility source 615, the battery 505 provides power to the external device.

Figure 25:
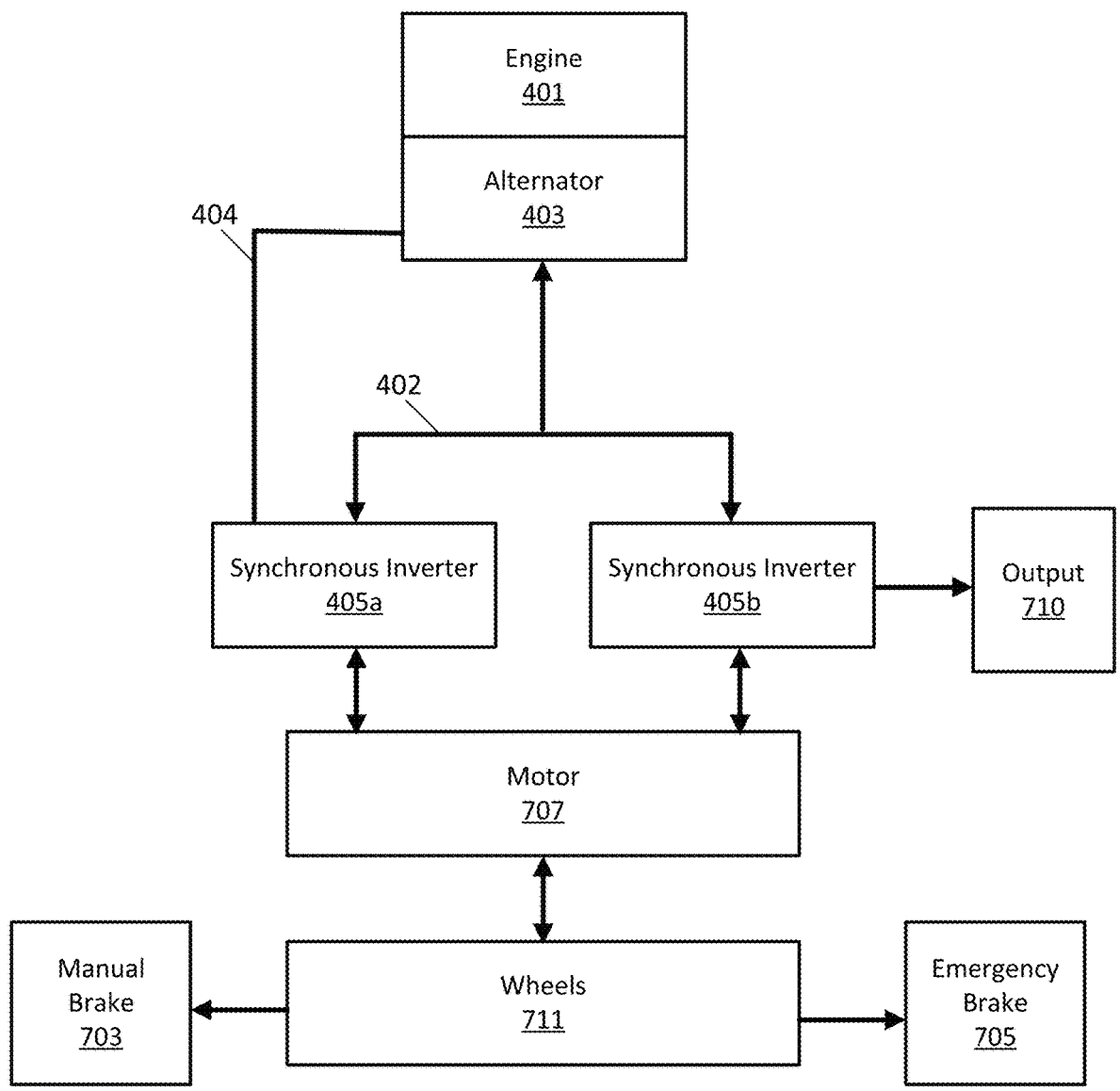
FIG. 25 illustrates an example vehicle including synchronous inverters.

FIG. 25 illustrates an example vehicle including synchronous inverters. Two synchronous inverters 405 are shown, but more or fewer can be used to power motor 707. In the case of more than one synchronous inverter 405, they would be operated in parallel to increase power capacity, increase voltage, increase redundancy, or for improved controllability. Similar components illustrated previously are consistent with FIG. 25. Additional, different or fewer components may be included. The embodiment of FIG. 25 may be a lawnmower but is not a zero turn radius lawnmower. The vehicle includes the engine 401, the alternator 403, one or more synchronous inverters 405a and 405b, a motor 707 coupled with wheels 711, a manual brake 703, an emergency brake 705, and an output 710. The wheels may be connected to the motor directly or via a torque converter (e.g. gear reduction, differential). A steering mechanism turns wheels 711 together. As described in earlier embodiments, power transfer may occur in a forward direction from the alternator 403, through the synchronous inverters 405, to the motor 707, and ultimately to wheels 711. An output of one of the synchronous inverters 405 may provide the output 710, which may be converted from DC to AC (e.g., 120 V convenience output).

Figure 26:
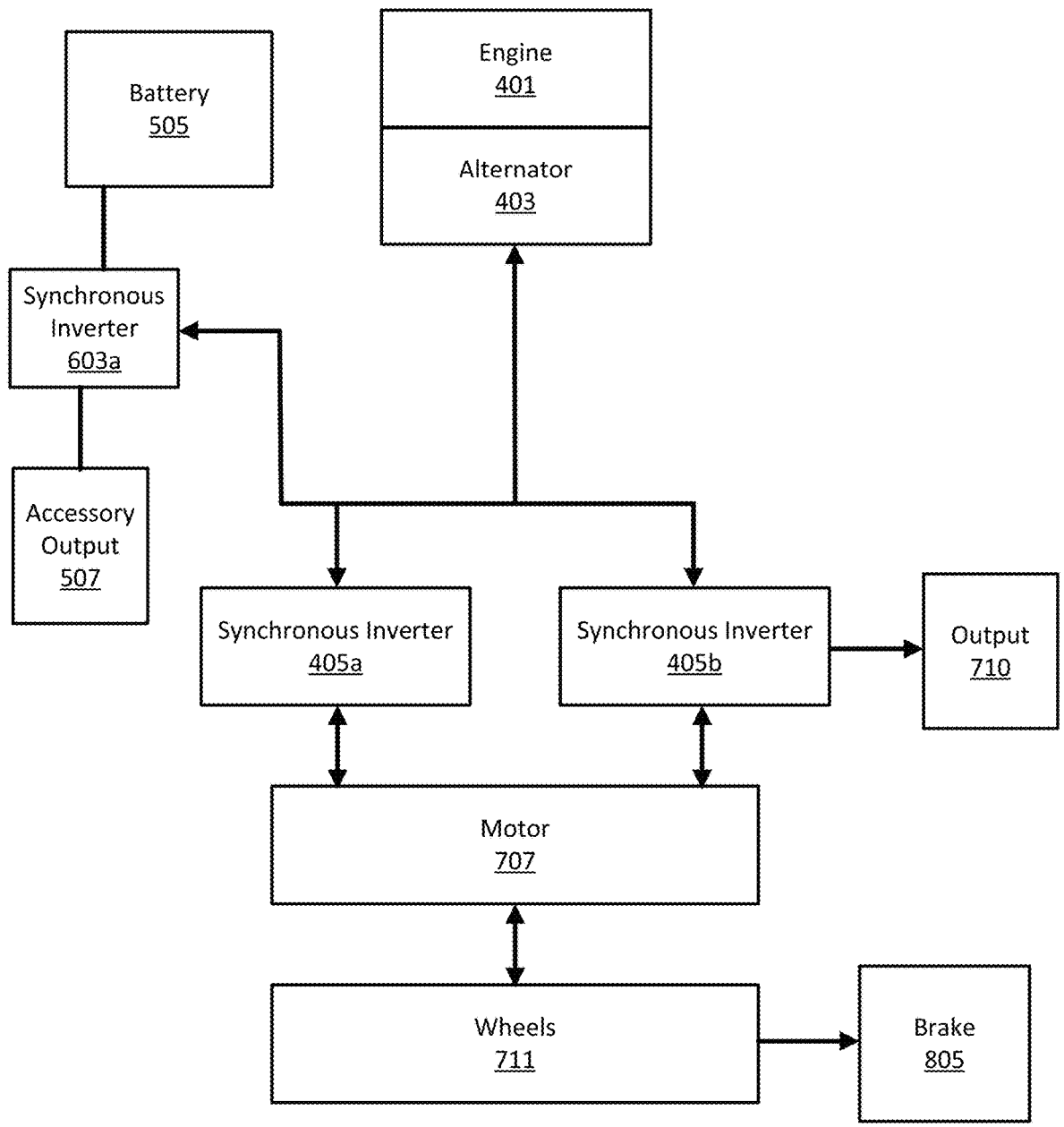
FIG. 26 illustrates an example vehicle including synchronous inverters in addition to a synchronous inverter for battery charging.

FIG. 26 illustrates an example vehicle including synchronous inverters in addition to a synchronous inverter for battery charging. Similar components illustrated previously are consistent with FIG. 26. Additional, different or fewer components may be included.

As described in earlier embodiments, bidirectional power transfer may occur in a forward direction from the alternator 403, through the synchronous inverters 405, to the motor 707, and in a reverse direction from the wheels 711 in response to either emergency brake 705 or manual brake 703 being applied, through the synchronous inverters 405 and 603a to the battery 505.

Rather than the manual brakes in the embodiment of FIG. 25, a brake 805 provides stopping capability in addition to the stopping capability provided in a regenerative control scheme. In the regenerative mode, the motor 707 supplies power through the synchronous inverter 405 to the alternator 403, the battery 505, either output 710 or 507, or any combination thereof.

Figure 27:
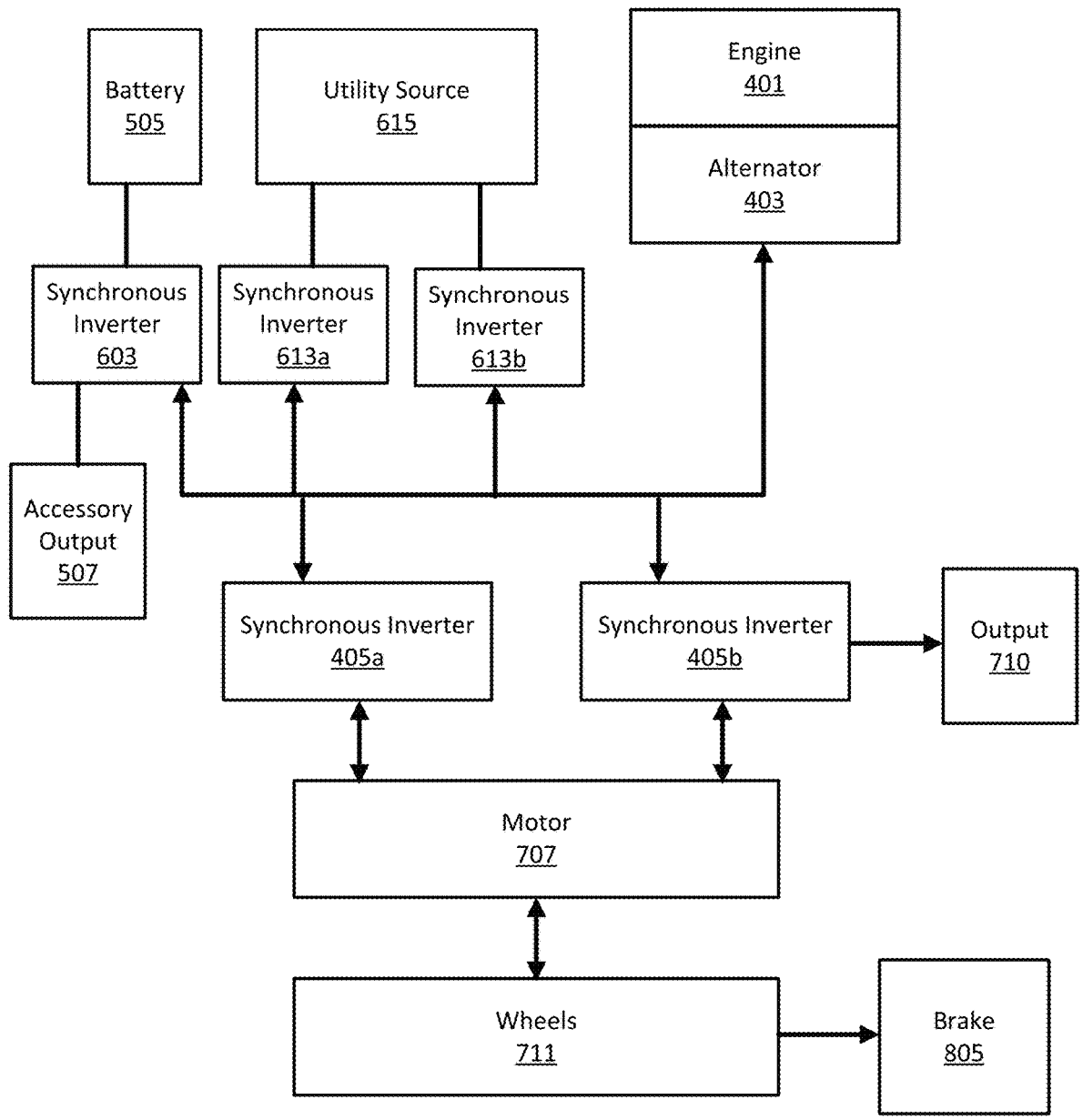
FIG. 27 illustrates an example vehicle including synchronous inverters and a utility source.

FIG. 27 illustrates an example vehicle including synchronous inverters and the utility source 615. Depending on the circumstances or current settings, the utility source 615, the battery 505 and/or the alternator 403 may provide power to the wheels 711 through synchronous inverters 405a and 405b. Also depending on the circumstances or current settings, the utility source 615 and/or the alternator 403 may charge the battery 505 through the synchronous inverter 603.

Figure 28:
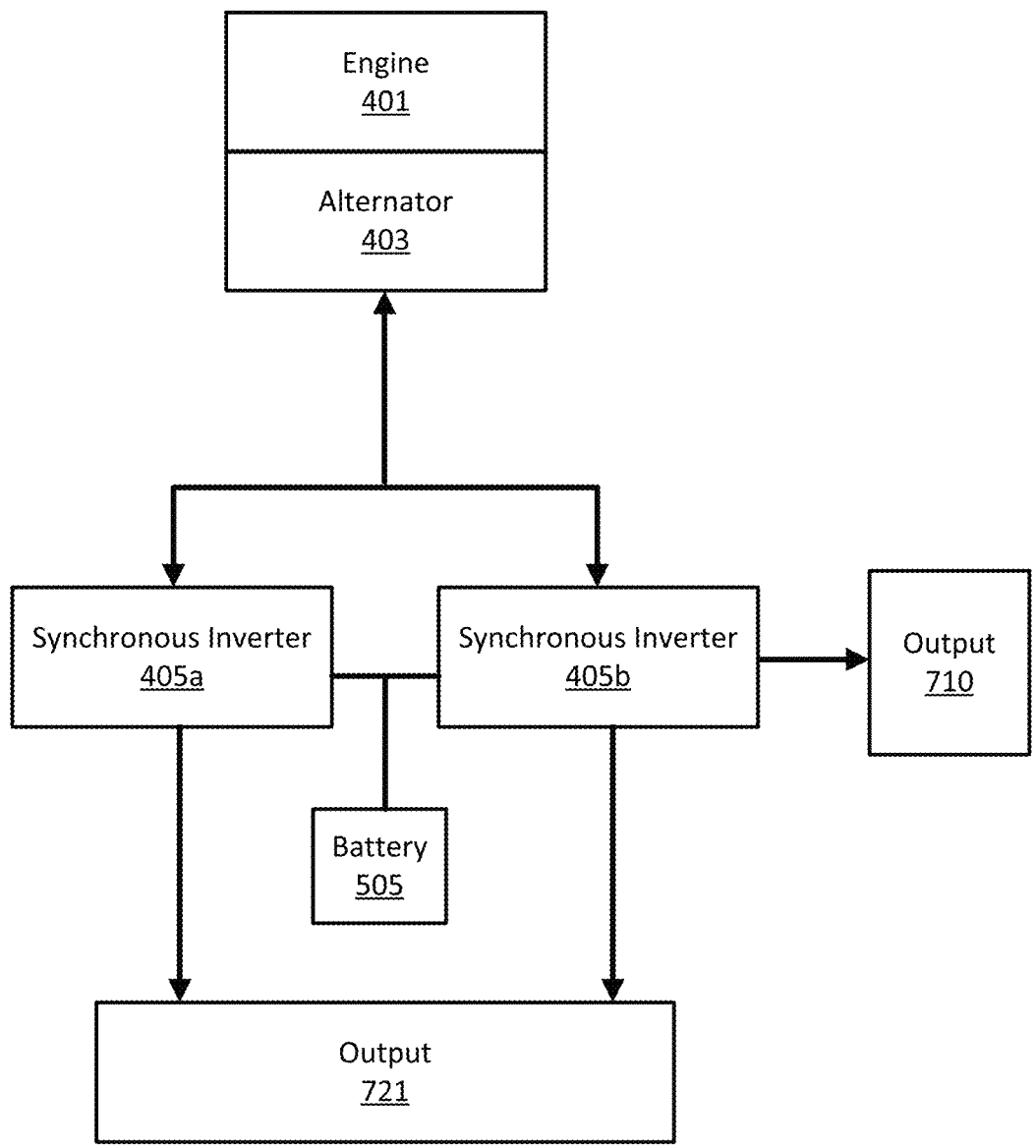
FIG. 28 illustrates an example generator system including a synchronous inverter system.

FIG. 28 illustrates an example generator system including a synchronous inverter system. Similar components illustrated previously are consistent with FIG. 28. Output 710 is a DC output and output 721 is an AC output. Through the synchronous inverters 405a and 405b, the engine 401 may run at variable speeds while providing a constant AC output 721.

Figure 29:
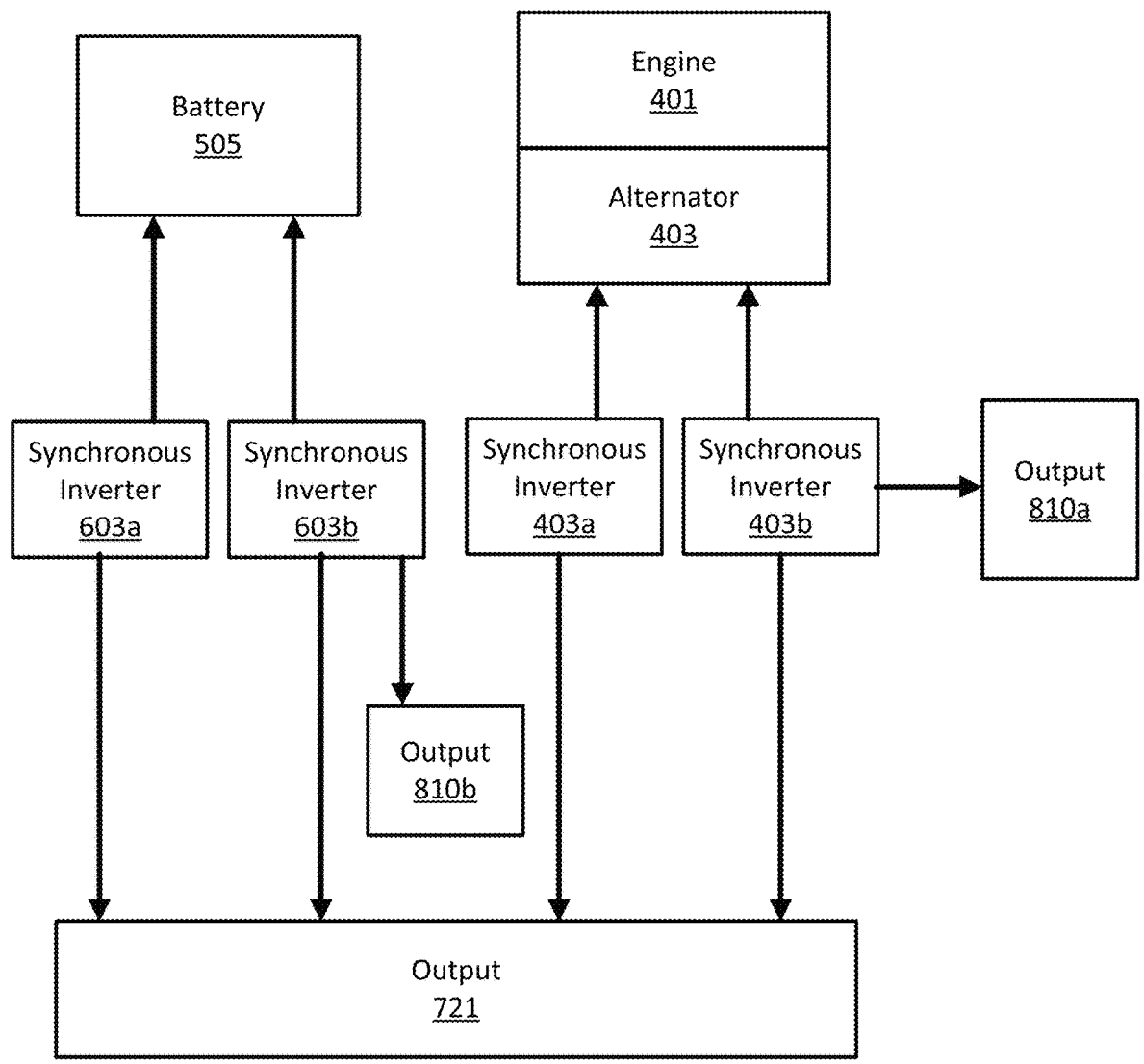
FIG. 29 illustrates an example generator system including a synchronous inverter system for providing power from the generator in addition to a synchronous inverter for providing power from a battery.

FIG. 29 illustrates an example generator system including a synchronous inverter system for providing power from the generator in addition to a synchronous inverter for providing power from a battery. Similar components illustrated previously are consistent with FIG. 29. Each synchronous inverter system may provide a DC output. Synchronous inverters 603a and 603b provide DC output 810b, and synchronous inverters 403a and 403b provide DC Output 810a.

Figure 30:
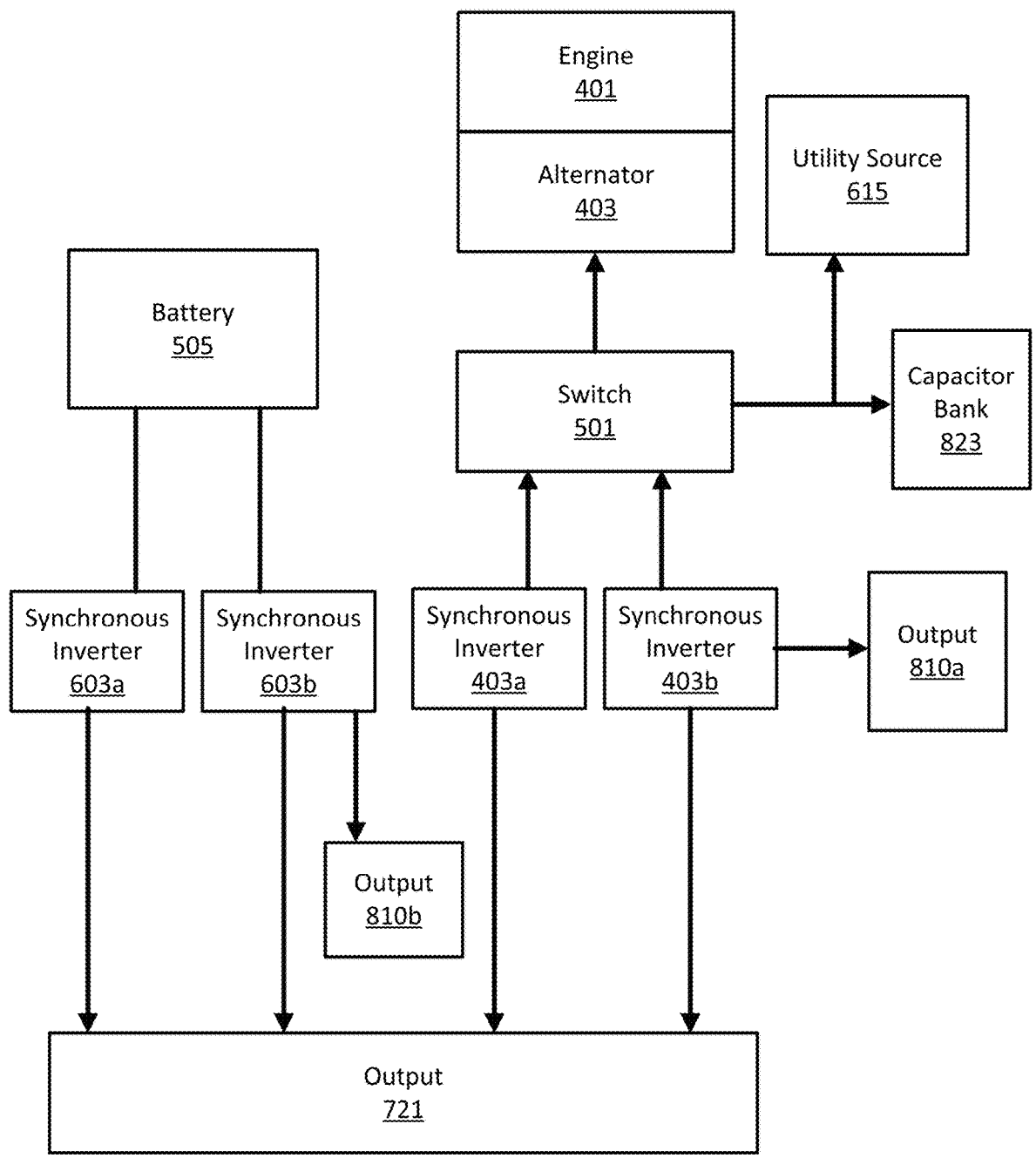
FIG. 30 illustrates another example generator system with a synchronous inverter.

FIG. 30 illustrates another example generator system with synchronous inverter. Similar components illustrated previously are consistent with FIG. 30.

The capacitor bank 823 may adapt the single phase utility from utility source 615 for the synchronous inverters. The capacitor bank 823 generates a poly-phase signal from the single phase utility through phase shifting the single phase source. The difference in phase is utilized to provide polyphase input to the synchronous inverter 403. The capacitor bank 823 may include two or more capacitors, or two or more sets of capacitors to convert single phase source to a three phase signal. The single phase utility source may be designated as phase A, the output of a first capacitor or first set of capacitors may be designated as phase B, and the outputs of a second capacitor or second set of capacitors may be designated as phase C.

Figure 31:
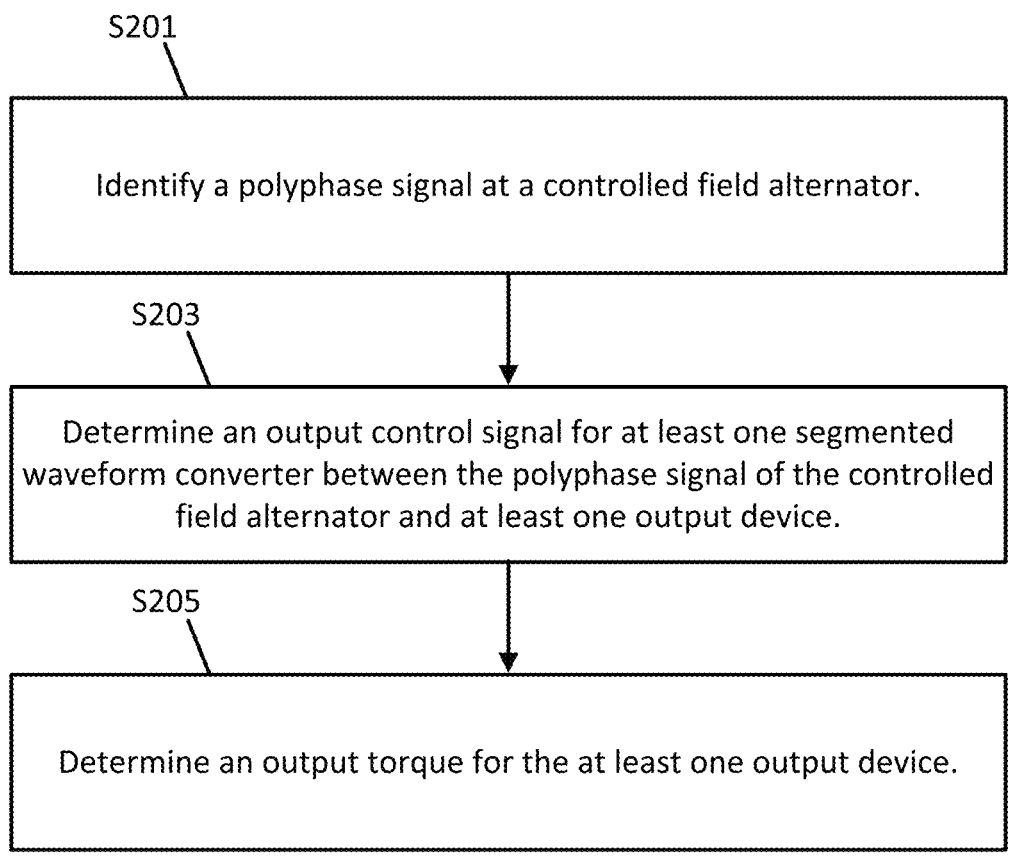
FIG. 31 illustrates a flow chart for the operation of the generator controller of FIG. 16.

FIG. 31 illustrates a flow chart for the operation of the generator controller of FIG. 16. Additional, different of fewer acts may be included.

At act S201, the processor 300 identifies a polyphase signal at a controlled field alternator (e.g., alternator 403). The polyphase signal may be detected by the sensing circuit 311.

At act S203, the processor 300 determines determining an output control signal for at least one synchronous inverter to control switches connected between the polyphase signal of the controlled field alternator and at least one output device. The output control signal determines the output of the at least one synchronous inverter.

At act S205, the processor 300 determines an output torque for the at least one output device. The output device may be a wheel, a drive mechanism, a mowing system, a deck height system, or a generator. In an alternative embodiment, the processor 300 may determine an output speed, position, or other target for the at least one output device. Additionally, the controlled field alternator may be utilized as the electrical power source or electrical power may be supplied by an alternative source (e.g. utility, battery, wind, solar, nuclear).

Referring to FIGS. 14 and 15, one or more segmented waveform converters 205 including a plurality of switches connected to the polyphase signal of the controlled field alternator and configured to generate produce three-phase output power through an output filter circuit including at least one output filter 207. The output power may be referred to as a drive signal, which may drive at least one motor, as described in the examples of FIGS. 24-31. An input circuit to the segmented waveform, which may include input filter 201, includes an input coupled to a controlled field alternator and configured to receive a polyphase signal from the controlled field alternator. At least one output filter 207 is configured to modify the drive signal based on at least one setting for the motor. The controller 200 is configured to generate a control signal to set states of the switches to generate the drive signal for the at least one motor. The control signal may be based on sensor data.

Figure 32A:
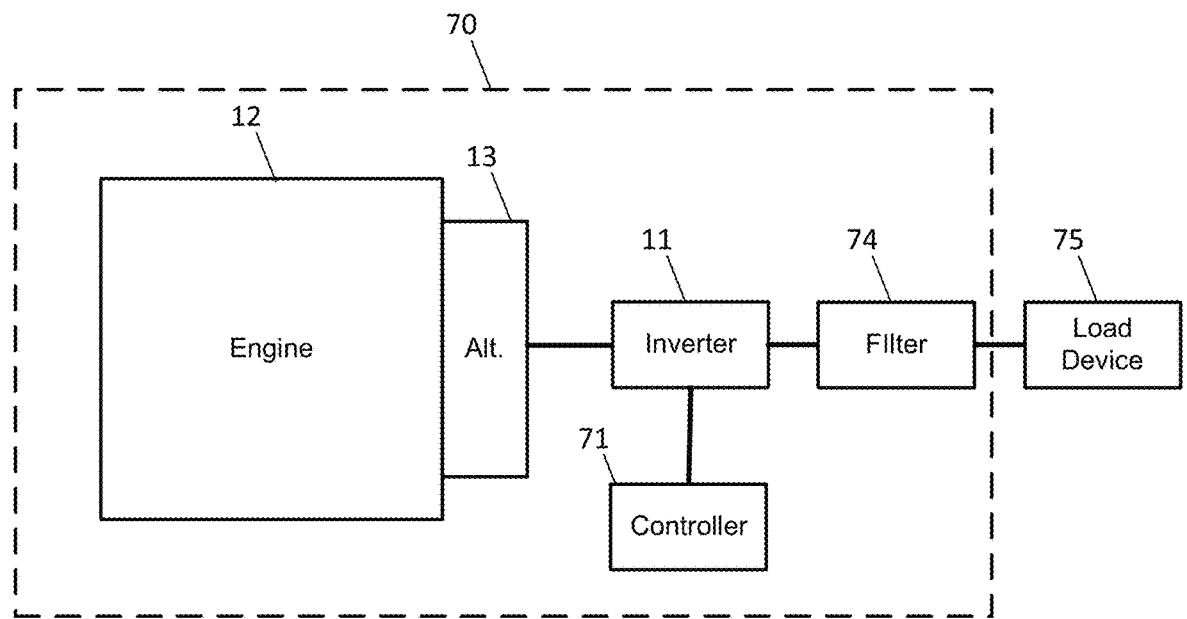
FIG. 32A illustrates an example engine-generator sets including a synchronous inverter and an external load device.

Referring to FIG. 32A, an example engine-generator assembly 70 includes a synchronous inverter 11, an engine 12, an alternator 13, and an output filter 74 and is coupled to a load device 65. The synchronous inverter 11 may include an input coupled to a controlled field alternator configured to receive a polyphase signal from the controlled field alternator and at least one controller (i.e., microprocessor) for controlling a network of switches of a segmented waveform converter connected to the polyphase signal of the alternator 13 and generate a drive signal for at least one load device 75. In addition, the alternator 13 may be a controlled field alternator in which a field current is actively controlled by a generator controller (field current controller) to adjust the output of the alternator 13.

Electrical noise from the alternator, in which the waveform deviates from an ideal sinusoidal, becomes mechanical noise (audio) as the waveform powers the motor. In AC to AC converters, noise is typically not a design concern. On heavy equipment such as mining equipment, mechanical noise from electrical motors may be acceptable with respect to cost, because other noise in the environment often exceeds that of the electrical motors. Other applications may require that less noise is produced by the electric motors. In some examples, the sound from the hydraulics may exceed that of the engine. Sounds becomes a priority in some applications such as carts or lawnmowers that are used in quiet environments such as golf courses. The output filter 74 reduces noise on the waveform output from the alternator 12, which may include audible noise and electromagnetic interference. The output filter 74 may also reduce heating in the motor because the filtered waveform more closely matches the physical characteristics of the motor.

Figure 32B:
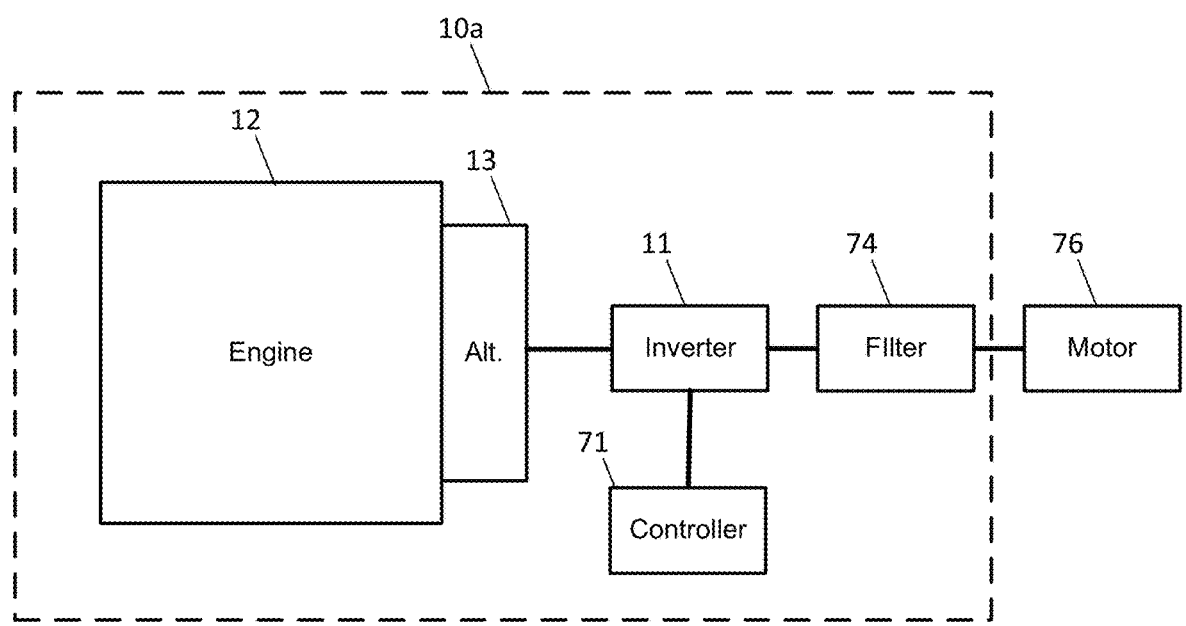
FIG. 32B illustrates an example engine-generator sets including a synchronous inverter and a motor.

The output filter 74 is configured to modify the drive signal based on at least one setting for at least one load device 75. The output filter 74 may include one or more active components include an SCR, a field effect transistor (FET), and an insulated gate bipolar transistor (IGPT), and one or more passive components such as capacitors, inductors, and resistors. The at least one setting may include physical parameters of the load device 75, a tilt setting for traveling on an incline, a decline, or along an incline, a turn setting for low radius turns, a load setting for the motor, a fuel efficiency setting, or a configuration setting. The following sections each of these examples in more detail. As shown in FIG. 32B, the at least one load device 75 may be a motor such as a direct current (DC) motor, an AC induction motor, a synchronous AC motor, a brushless DC motor, a brush-type DC motor, or a combination of multiple of the foregoing designs.

A controller 71 configured to generate a control signal to set states of the plurality of switches to generate the drive signal for the at least one motor. The control signal may be based on sensor data. Examples of sensor data include lever steering sensor data, load sensor data, or orientation sensor data.

The power system apparatus includes a synchronous inverter and at least one motor driven by the synchronous inverter. In one example, the synchronous inverter drives one or more wheels of a vehicle. The power system may include multiple synchronous inverters each electrically coupled with a different electric motor. In addition, the power system may include multiple motors driven by a single inverter.

The power system apparatus may include an electric hybrid power system for a lawnmower or another vehicle. The electric hybrid power system may include a synchronous invertor and electric motor for each of multiple drive wheels. The electric motors and drive wheels may be driven independently according to the techniques described herein. The hybrid power system may include at least one battery that is charged by the alternator at one time or part of a power cycle and later powers at least one motor at a second time or part of the power cycle.

Figure 33:
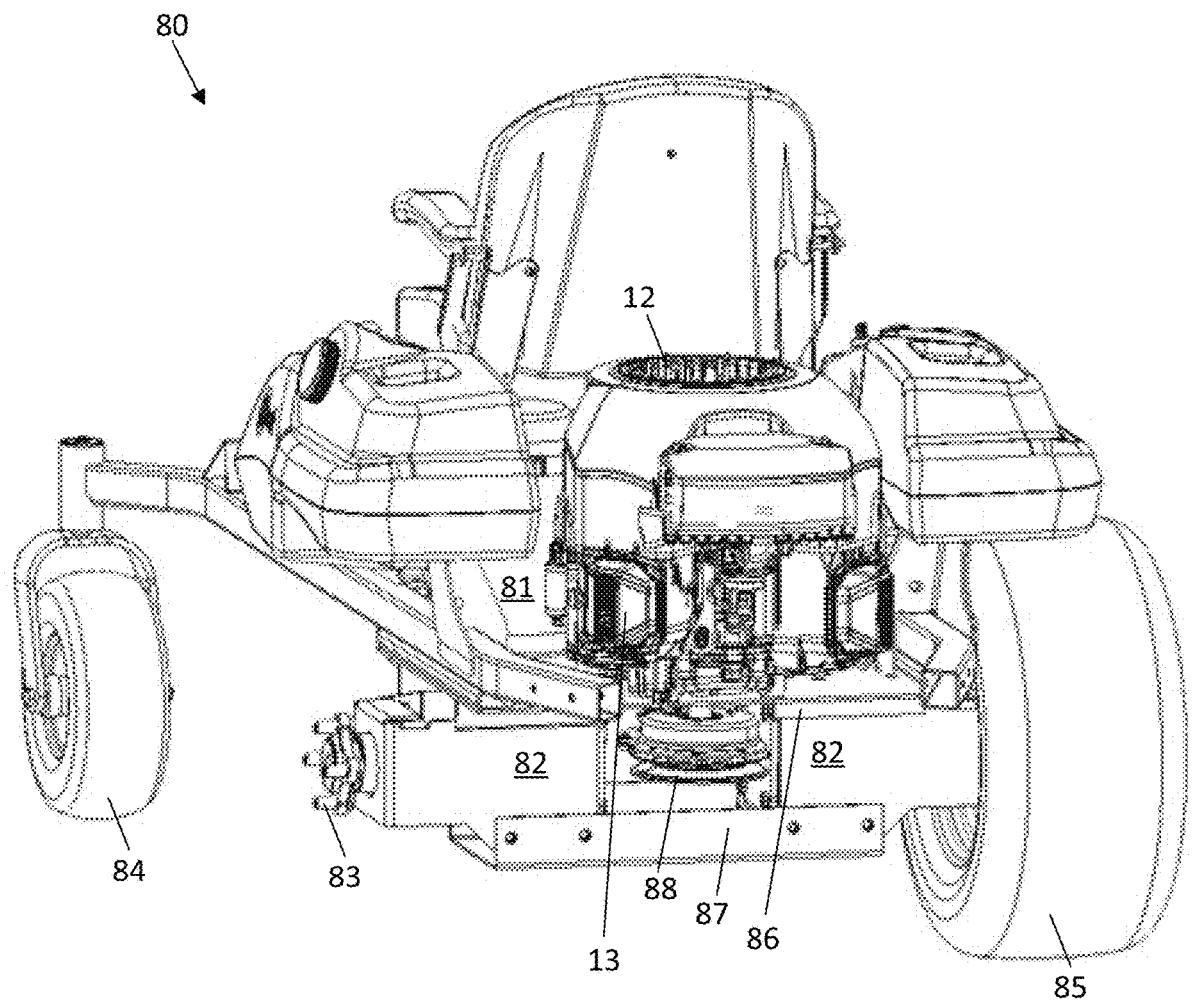
FIG. 33 illustrates an example vehicle including a synchronous inverter and at least one motor.

FIG. 33 illustrates an example vehicle 80 including a synchronous inverter and at least one motor. The vehicle 80 includes the engine 12, alternator 13, and synchronous inverter 11. The vehicle 80 may also include the output filter 74. The vehicle 80 includes a motor 81, a gear transmission 82, a wheel linkage 83, one or more idle wheels 84, one or more driven wheels 85, a flywheel 88 on a driveshaft 89 (FIG. 35), and a subframe including a support frame 86 and a gear frame 87. The motor 81 may be a direct current (DC) motor controlled by voltage or an alternating current (AC) motor controlled by frequency. Additional, different, or fewer components may be included.

The synchronous inverter and at least one motor are an example alternative to replace a hydraulic propulsion system such as used on zero turn radius (ZTR) lawnmowers. The hydraulic propulsion system independently operates two driving mechanisms and drive wheels. Traditional ZTR lawnmowers may include hydraulic valves to control hydrostatic transmissions driven by belts from an internal combustion engine, which may be fueled by gasoline, diesel fuel, liquefied petroleum (LP), compressed natural gas (CNG), or another type of combustible fuel. The hydrostatic transmissions require regular maintenance to maintain performance and durability. In addition, hydraulic fluid may leak, causing damage to the environment (e.g., harm grass or stain garage floors).

On the other hand, a similar lawnmower using electric propulsion eliminates these challenges and enables new benefits and features. The lawnmower using electric propulsion and the synchronous inverter may include traction control to prevent one or both wheels from damaging turf, zero radius turning techniques that prevent one wheel from damaging turf, optimization of engine speed for a given ground speed as load changes (e.g., uphill, downhill, or in sand), and/or optimization of engine speed (and fuel consumption) for power take off load changes when used in conjunction with electric motor drives.

Figure 34:
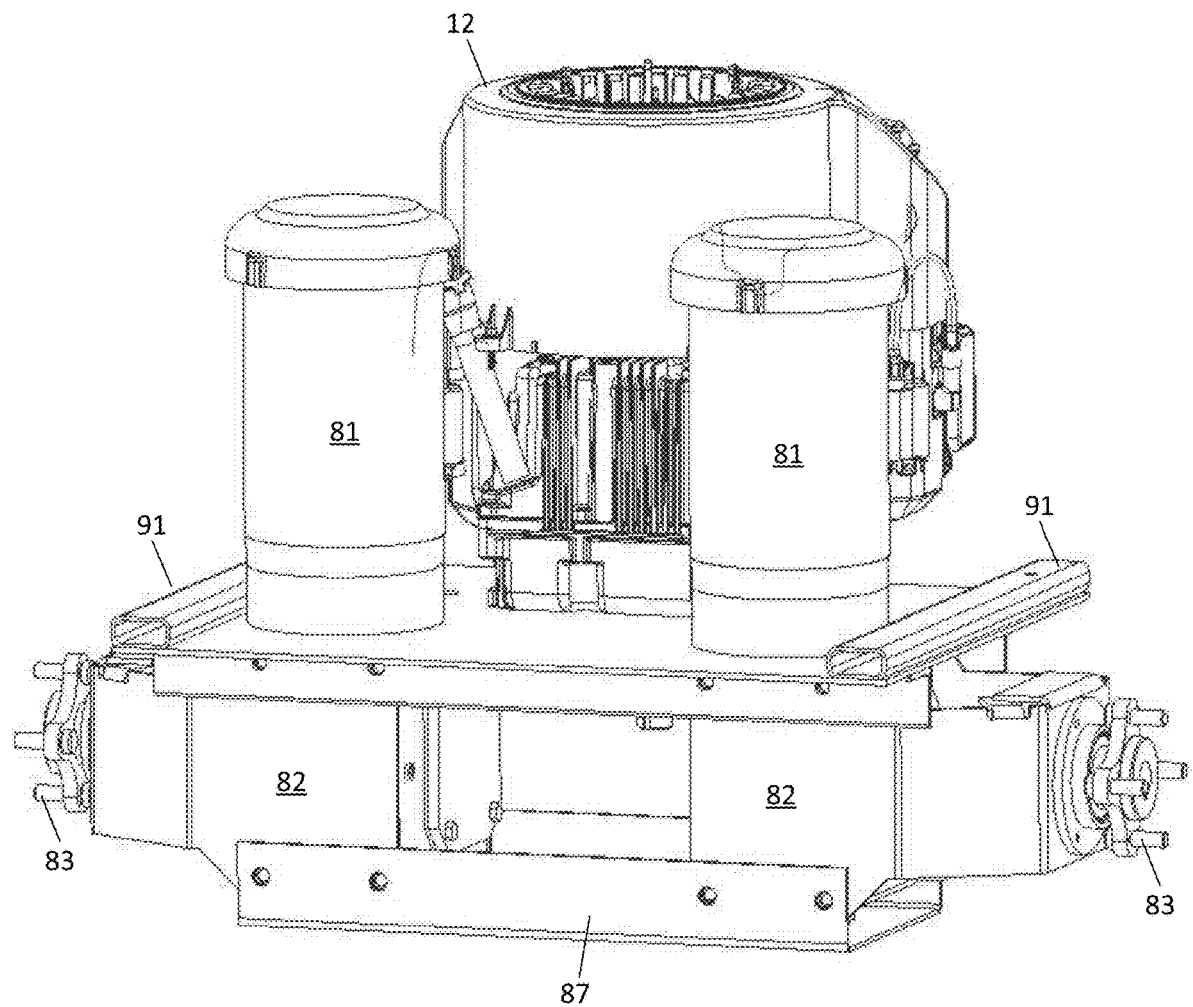
FIG. 34 illustrates an example subassembly for the vehicle of FIG. 33.
Figure 35:
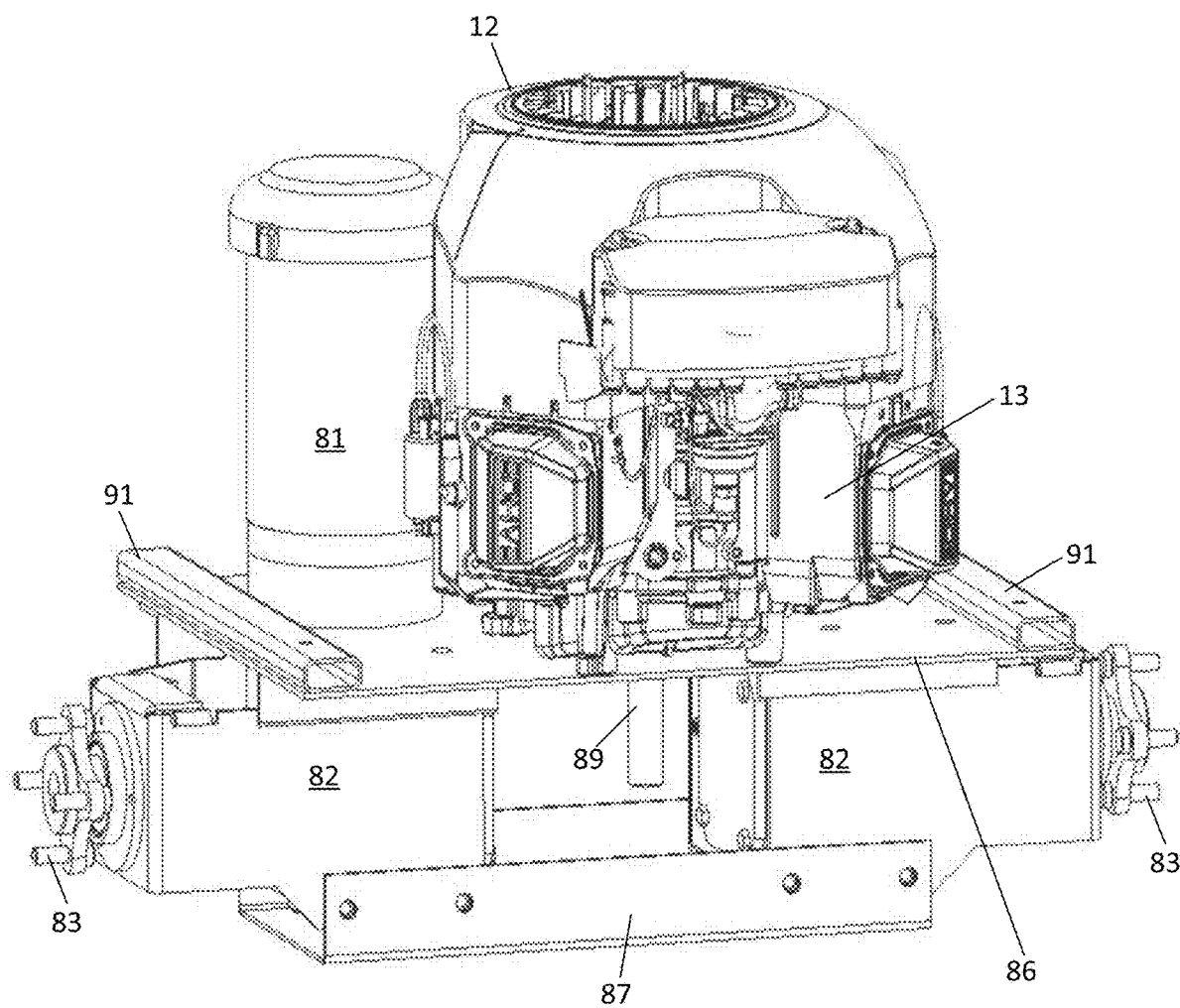
FIG. 35 illustrates a reverse view of the example subassembly of FIG. 34.
Figure 36:
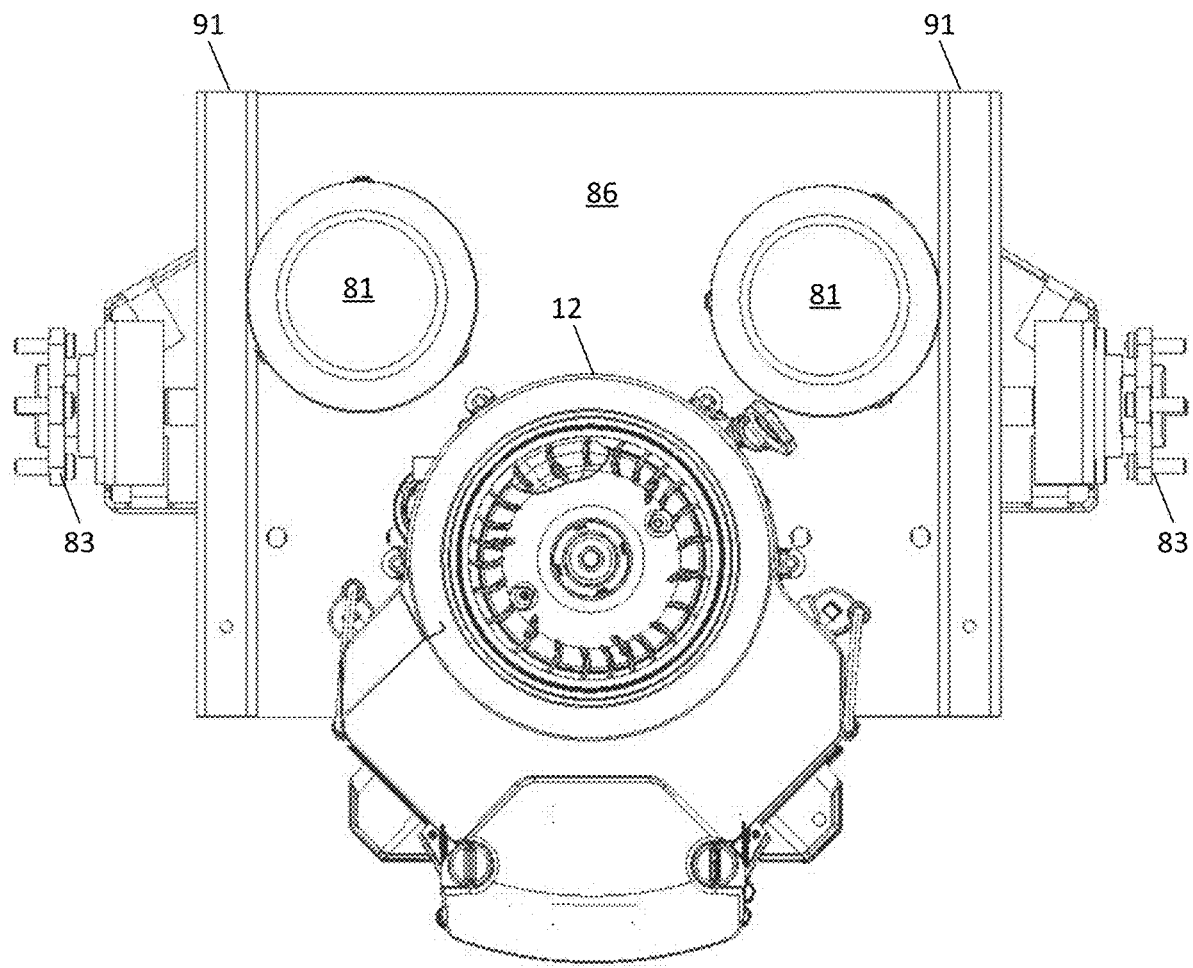
FIG. 36 illustrates a top view of the example subassembly of FIG. 34.

FIG. 34 illustrates an example subassembly for the vehicle of FIG. 33. FIG. 35 illustrates a reverse view of the example subassembly of FIG. 34. FIG. 36 illustrates a top view of the example subassembly of FIG. 34.

The subassembly may include the subframe including the support frame 86 and the gear frame 87. The support frame 86 is secured to the gear frame 87 using one or more connectors. The term connectors as used throughout may include any combination of bolts, screws, rivets, or welded joints. Alternatively, the support frame 86 and the gear frame 87 may be integrally formed. The gear frame 87 is mechanically coupled using one or more connectors to the gear transmissions. The support frame 86 is mechanically coupled using one or more connectors to the engine 12, the alternator 13, which may include the synchronous inverter 11, and the one or more motors 81.

The subassembly may be pre-assembled as a hybrid power system module. The support frame 86 may be coupled to the chassis of the vehicle using support bars 91. The support frame 86 may include a bracket that slides onto the support bars 91 and the assembly may be secured to the chassis of the vehicle using one or more connecters. Thus, any combination of the engine 12, the alternator 13, the synchronous inverter 11, one or more motors 81, one or more gear transmissions 82, one or more wheel linkages 83, the support frame 86, and the gear frame 87 may be coupled to vehicle 80 at the same time using the subassembly. In one example, the only mechanical connections between the subassembly and the vehicle 80 is made through the support bars 91.

The subassembly may also connect to the vehicle through electrical connections. The electrical connections may include accessories for the vehicle 80. That is the subassembly, including the alternator 12 or the synchronous inverter 11, may provide a DC output for running the accessories for the vehicle 80 such as lights, a radio, a mower deck lift, gauges, a control panel, or other features. In one example, high voltage circuitry associated with the alternator 12 or the synchronous inverter 11 are isolated from the electrical connections between the subassembly and the vehicle 80. The subassembly may be installed without exposure to any high voltage areas. The subassembly may be installed by a user or technician that is not trained in high voltage installations.

The controller 71 determines a drive signal for the load device 75 and generates a control signal for the switches of the synchronous inverter 11. The synchronous inverter 11 outputs the drive signal, which may be modified by the output filter 74. The drive signal may include a frequency that specifies a speed of the motor 81. The motor 81 rotates a shaft in the gear transmission 82 at an input speed, and the gear transmission 82 changes the input speed to an output speed. The gear transmission 82 may include a series of gears of different gear ratios in order to convert from the input speed to the output speed. Alternatively, the motor may be directly coupled to the wheel without a transmission.

The gear transmission 82 may be a right-angle gearbox that transfers the mechanical output of electric motor 81 to a drive wheel 85 of the vehicle 80. The gear transmission 82 may include a worm gear for transferring the direction of rotation of the drive shaft of the motor 81 to the direction of rotation of the wheel linkages 83. The wheel linkages 83 are coupled to the drive wheel 85 and apply a rotational force to the drive wheel 85.

Optionally, when the gear transmission 82 includes a worm drive gear reduction system, a brake system is not needed because the output shaft is naturally locked unless the input shaft turns. In addition, an override clutch may be included in the gear transmission 82 to take one or more gears out of mesh. When the override clutch is engaged, the drive wheels 85 are free to operate independently of the gear transmission 82. Thus, when the override clutch is engaged, the vehicle 80 may be moved or pushed manually or in tow without the motors 81 rotating the gear transmission 82. In another example, the gear transmission 82 may include one or more limited to set a maximum speed for the drive wheels. Alternatively, the motor may incorporate a spring-applied and electrically-released brake to prevent unintended movement of the vehicle 80.

Figure 37:
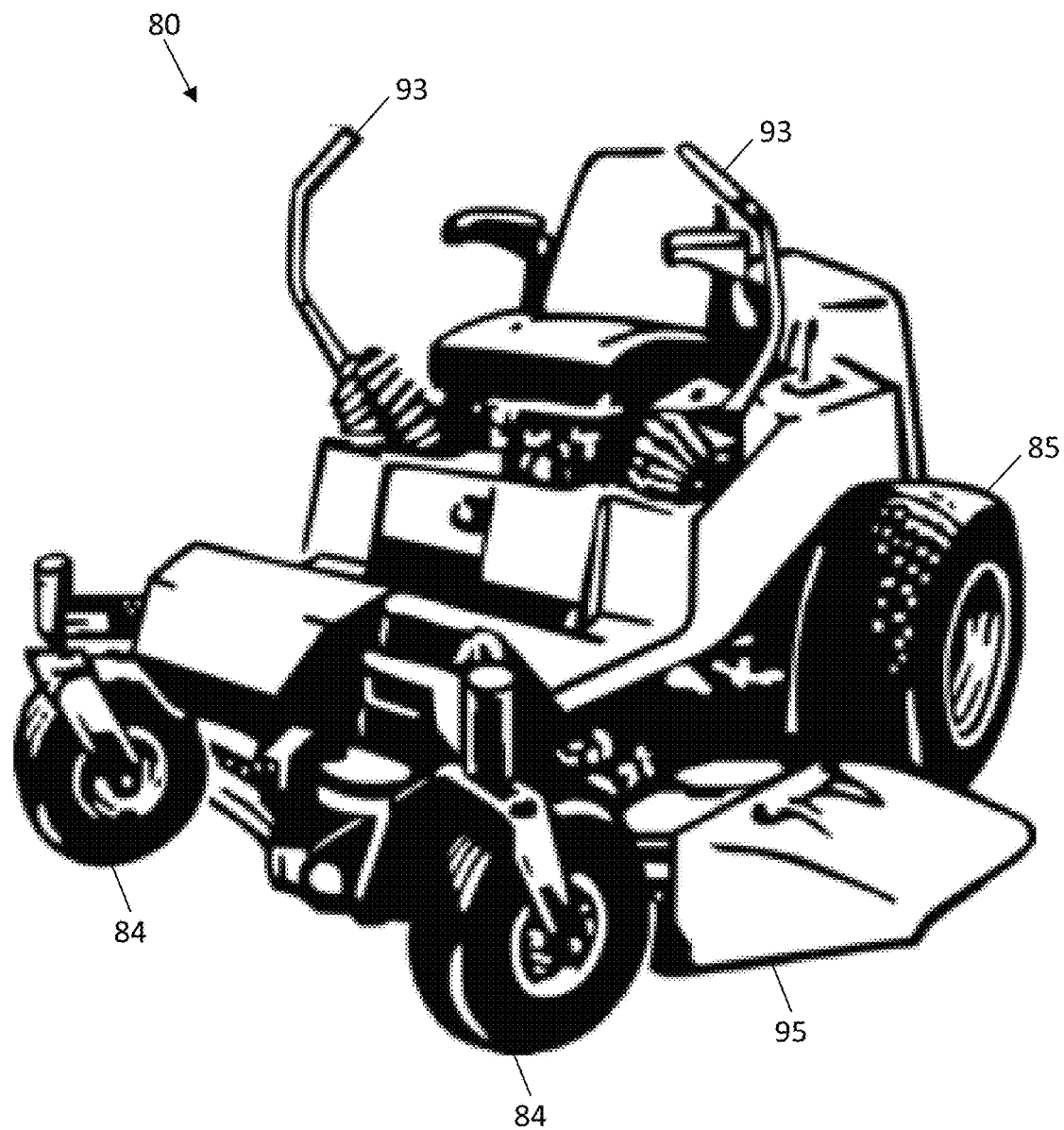
FIG. 37 illustrates a perspective view of the vehicle.

FIG. 37 illustrates a perspective view of the vehicle 80 as a zero turn radius (ZTR) lawnmower. The lawnmower includes drive wheels 85, idle wheels 84, a mower deck 95, and one or more control levers 93. The subassembly if FIGS. 34-36 may include a mechanical link to one or more control levers 93 to transfer a user input level as at least one setting for the motor 91. One or both of the control levers may be interchangeable with a joystick or another steering mechanism.

Either or both of the control levers 93 may be matched with a position sensor. The position sensor may include an optical sensor, a potentiometer or resistive sensor, a displacement sensor, or a rotation sensor. As a control lever 93 is rotated forward or backward, the position sensor determines a direction and amount of the rotation. The position sensor may generate an output that is proportional to the rotation of the control lever 93. The output of the position sensor for each control lever 93 is analyzed by the controller 71 to generate a control signal for the synchronous inverter 11, which output a drive signal for motor 81 and corresponding drive wheel 85. The controller 71 may determine a position of the control lever 93 from the sensor data.

The controller 71 may include a lookup table that relates positions of the position sensor to respective speeds of the motor 81, drive signal levels that correspond to respective speeds of the motor 81, or settings for the synchronous inverter 11 that correspond to the respective speeds of the motor 81. The lookup table may be based on the responsiveness of a hydraulic systems. That is, the lookup table may be selected to cause the controller 71 to mimic a hydraulic system. That is, if a 10 degree rotation in a control lever 93 would result in a 0.5 second delay before applying a target rotation of 20 revolutions per minute in a hydraulic system, the lookup table may instruct the synchronous inverter 11 to delay for 0.5 seconds before creating a drive signal that causes the motor 81 to rotate at 20 revolutions per minute. Alternatively, the lookup table may be selected to specify the torque applied to the drive wheel 85, which may mimic a hydraulic system.

The controller 71 may provide a variety of additional controls for transferring the positional sensor data of the control levers 93 to the drive signal from the synchronous inverter 11 for driving the motor 81. The additional controls may include a turn setting for turf protection, an incline setting for safety, a steering setting for inclined surfaces, an optimized mowing setting, and a traction control setting.

The turn setting for turf protection may prevent the drive wheels 85 from damaging the turf when one wheel is driven and the other is held stationary. When one wheel is held stationarity, that wheel may spin in place when the other wheel moves forward. The wheel spinning in place may damage the turf, pulling grass away from the ground.

The controller 71 may identify this situation and reduce the risk of damage. The controller 71 may identify this type of turn (e.g., potentially turf damaging turn) when one control lever 93 is pushed forward or backward past a threshold position and the other control lever 93 is maintained in a substantially stationary position. An outer wheel of the vehicle 80 corresponds to the control lever 93 is pushed forward or backward past the threshold position, and an inner wheel of the vehicle 80 corresponds to the control lever 93 maintained in the substantially stationary position. The substantially stationary position may be a position deflection of 0 degrees or within a predetermined range of 0 degrees. Examples for the predetermined range may include within 5, 10, or 15 degrees. Examples of the threshold position to be indicative of forward or backward may be 30, 40, or 50 degrees.

When a potentially turf damaging turn is identified, the controller 71 adjusts the control signal for the synchronous inverter 11 and the corresponding drive signal for the drive wheel 85. The controller 71 may pass the control signal for the one control lever 93 is pushed forward or backward past the threshold position under normal conditions. The controller 71 may modify the control signal for the wheel in the substantially stationary position. The controller 71 may generate the control signal for the synchronous inverter 11 and the corresponding drive signal for the drive wheel 85 to introduce a nominal adjustment, a feathering, or multiple directional control. The nominal adjustment may include a speed increment or decrement added to the inner wheel associated with a substantially stationary position. The speed increment or decrement may be an adjustment in the speed of the inner wheel by the nominal amount (e.g., 1 revolution per minute, or 1 inch per second). Feathering or multiple directional control may include a series of adjustments to the inner wheel associated with the substantially stationary position. The controller 71 may cause the inner wheel to be advanced forward for a first time, rotated backward for a second time, and repeated between forward and backward motion. In addition, the controller 71 may include a hysteresis control so that if the user adjusts the control of the inner wheel, which would normally provide the nominal speed or feathering control of the inner wheel, the controller 71 maintains the automated speed increment or decrement to the inner wheel rather than that supplied by the user, until the user input exceeds a threshold set by the hysteresis control.

The controller 71 may provide an incline setting for safety. The controller 71 may receive orientation data from an inertial sensor coupled to the vehicle 80. The inertial sensor may include any combination of an accelerometer, a magnetic sensor, or a gyroscope. The orientation data may describe up to three angles such as roll, pitch, and yaw of the vehicle. The orientation data may include a total angular value that describes a sum of the angular difference from the horizontal (e.g., sum of roll angle and pitch angle).

The controller 71 may determine whether the vehicle 80 is traveling uphill or downhill based on at least one of the angles (e.g., pitch angle). The controller 71 may adjust a speed or braking mechanism of the vehicle 80 to reduce the risk of tipping the vehicle 80 or bringing one or more of the wheels away from the driving surface. The vehicle 80 may be determined to be driving uphill or downhill when the orientation data indicates the pitch angle of the vehicle 80 exceeds a threshold (e.g., greater than a positive angle threshold or less than a negative angle threshold).

When the vehicle is traveling uphill, when the angle exceeds an uphill threshold, the controller 71 may adjust the speed for the motor 81 by increasing the speed of the motor 81 or the speed of the engine 12 by adjusting the control signal for the synchronous inverter 11 and the corresponding drive signal for the drive wheel 85. When the vehicle is traveling downhill, when the angle exceeds a downhill threshold, the controller 71 may adjust the speed for the motor 81 by decreasing the speed of the motor 81 or the speed of the engine 12 by adjusting the control signal for the synchronous inverter 11 and the corresponding drive signal for the drive wheel 85.

In addition, the controller 71 may selectively remove current from the electrical release mechanism of the brake on the wheel (if equipped). The controller 71 may also apply a counter-rotating field to the motor to provide reversing torque. This may be used to load the engine 12 to prevent an engine overspeed condition.

The controller 71 may provide a steering setting for inclined surfaces. The controller 71 may receive orientation data from the inertial sensor coupled to the vehicle 80. For the inclined surfaces steering, the orientation data may describe the roll angle. When the vehicle travels along an incline, the roll angle is substantially nonzero and substantially constant. A vehicle traveling along an incline has one set of wheels (e.g., right side) higher in elevation than the other set of wheels (e.g., left side). The controller 71 may determine that the roll angle is greater than a minimum incline value (e.g., 10 degrees or 5 degrees) and consistent with a predetermine variance (e.g., 10% or another percentage) for a time period. A vehicle traveling along an incline may be a lawnmower traveling perpendicular to a hill.

A ZTR lawnmower traveling along an incline may be particularly difficult to maintain in a forward direction. Due to gravity, the vehicle 80 may tend to veer in the downhill direction. Operators of ZTR lawnmower may develop a skill to hold the downhill wheel's control lever at slightly more of a forward direction than the uphill wheel's control lever. The controller 71 may supplement this control. The controller 71 may identify when a user input for forward travel occurs when the roll angle is greater than a minimum incline value and consistent with a predetermined variance for a time period. In response, the controller 71 may adjust the speed of the downhill motor to be greater than the speed of the uphill motor. For example, the controller 71 may adjust the control signal for the synchronous inverter 11 and the corresponding drive signal for the drive wheel 85 of the downhill motor.

When the vehicle 80 is traveling on an incline the controller 71 may adjust the control signal for the synchronous inverter 11, and effectively the drive signal for the drive wheels 85 in response to the incline.

The controller 71 may provide an optimized mowing setting based on sensor data for the turf. The sensor data may include a moisture sensor that detects when wet grass is present. The controller 71 may increase a speed of the engine 12 in response to the need for increased power required heavier loads like to cut grass that is tall, thick, or wet grass. Thus, the alternator 13 provides a higher output voltage (if DC motor) or frequency and/or voltage (if AC motor) to maintain mower blade speed. Conversely at light loads, the controller 71 would decrease engine speed. The controller 71 causes the synchronous inverter 11 to maintain the electrical output to maintain the selected motor speed.

The controller 71 may provide a traction control setting based on sensor data from slippage of the drive wheels 85. For example, each of the drive wheels 85 may be associated with a speed sensor or position sensor that tracks the movement of the device wheels 85 and generates data indicative of the speed or position of the drive wheels 85. The controller 71 compares the speeds and/or positions of the drive wheels 85 to determine if one is traveling significantly faster or slower than the other. The controller 71 may compare the difference in speed of the wheels to a traction threshold to determine if slippage is occurring. Slippage may occur because of a wet surface (e.g., wet trailer ramps, wet pavement, wet grass), mud, or an unstable surface (e.g., loose stones). In response to determining slippage, the controller 71 may apply traction control by generating a command for a brake for applying a braking force to one or more of the drive wheels 85. In one example, the brake force may be applied to the faster (e.g., slipping) wheel.

The controller 71 may adjust the control signal for the synchronous inverter 11 based on characteristics of the motor 81. In one example, physical characteristics may include the structural dimensions of the motor 81 or the amount of metal that makes up the motor 81. Electrical characteristics may include the pitch, the number of poles or the number of windings for the motor 81. The characteristics of the motor 81 may define the harmonics produced by the motor 81 or a resonant frequency for noise or vibrations produced by the motor 81, adjusting the control signal for the synchronous inverter 11 may include adjusting a target waveshape to minimize generated harmonics in the motor.

The controller 71 may receive data indicative of the characteristics from a sensor such as a vibration sensor. The controller 81 may receive data indicative of the characteristics from a user input such as a setting for the model or manufacturer of the install motor 81. The controller 81 may access data indicative of the characteristics from a memory that includes a table of motor models with characteristics.

The characteristics of the motor 81 may be associated with an ideal waveform. The ideal waveform may include a frequency that is tuned to the particular motor 81. The frequency may be spaced by a set amount from the resonant frequency in order to reduce vibration. The frequency may be selected to reduce harmonics. Using the ideal waveform causes the motor 81 to produce less internal heat, which improved the efficient of the system.

The controller 71 may adjust the control signal for the synchronous inverter 11 so that the ideal waveform is applied to the motor 81. The subassembly may be assembled before the controller 71 and synchronous inverter 11 are calibrated according to the characteristics of the motor 81. In this manner, the harmonics and resonant frequencies for the subassembly are measured before installation in the vehicle 80, which further reduced the manufacturing burden in assembling the vehicle 80. The calibration eliminates or dampens vibration or harmonics internally by the subassembly.

A typical inverter (DC to AC or AC to AC) regulates to a root mean squared (RMS) voltage and not a sinusoidal target. Regulating to a sinusoidal target allows a subcycle (much faster) response to changes in load on the generator or vehicle. The synchronous inverter 11 may respond much more quickly to the changes. The term subcycle refers to a change that occurs in less than a cycle of the drive signal that is outputted from the synchronous inverter 11.

The controller 71 may implement optimal operation sequences for the engine 12, alternator 13, and synchronous inverter 11 based on the demands placed by the vehicle 80. For example, the controller 71 may implement a hybrid algorithm that switches between power produced at the alternator 13 and energy stored in one or more batteries.

In one example, the controller 71 implements a charging cycle for a battery and the optimal operating characteristic of the least one motor 81. The optimal operating characteristics for the engine 12 may be a predetermined percentage (e.g., 80%) of the output of the engine 12 or the speed of the engine 12. Even when less is demanded by the load, the engine 12 is operating at optimal capacity and any excess is stored in the batteries. The controller 71 may determine when the one or more batteries read full charge, or a specific level of charge, and turn off the engine 12 and alternator 13 and this point. The synchronous inverter 11 is then run from the stored energy in the battery until the battery reaches a minimum level. At this point, the engine 12 is started again and run at the optimal level. The sequence repeats.

The controller 71 may determine an electrical configuration of the synchronous inverter 11 based on the load connected to the synchronous inverter 11. The electrical configuration may be indicative of a single phase load or a three phase load. The electrical configuration may be a load characterization indicative of the type of load connected to the synchronous inverter 11.

The controller 71 may determine whether the load is single phase or three phase based on a test signal. For example, consider three outputs for the synchronous inverter (A, B, C). The controller 71 may send a test voltage to one of the outputs (A) and measure the resulting voltage on one or more of the other outputs (B, C). When the other outputs (B, C) are measured at a level substantially similar to the test voltage, the controller 71 determines that the load is single phase. Otherwise, the controller 71 determines that the load is three phase.

The controller 71 also may determine the type of load based on a test signal. Example types of load include resistive, nonlinear, capacitive, inductive, and reactive. Example nonlinear loads include battery chargers, uninterruptible power system (UPS), or variable frequency drives (VFD). The controller 71 is configured to adjust the gains of the synchronous inverter 11 through the states of the switches in the control signal in response to a load characterization of a load of the segmented waveform converter.

The controller 71 may identify subcycle load changes based on the type of load. For example, nonlinear loads may include a load spike that occurs at a particular time in the cycle. The load spike may occur when a SCR fires at a particular subcycle position (e.g., 60 degrees). The controller 71 may modify the control signal for the synchronous inverter 11 so that the output of the synchronous inverter increases at a predetermined time (e.g., a set number of milliseconds) or a set position in the cycle before the predicted load spike. The pre-emptive change in output may reduce the dip in power that could occur after the load spike. A similar control may be applied to the reduction of a load, avoiding the overshoot in power.

As described above in associated with FIGS. 19-28, multiple synchronous inverters may be linked together to provide power to a load in parallel (providing increased current output) or in series (providing increased voltage output). The synchronous inverters may also communicate with one another using a synchronizing signal in order to match phase angle across different inverters, adjusting their supply voltage using the communications network. In addition or in the alternative, the controller 71 may generate a communication signal that is modulated on the output drive signal of the synchronous inverter 11 by a communication interface. The communication signal may be a high frequency signal encoded with data using frequency modulation or pulse width modulation. The modulated communication may be high enough in frequency so as to not interrupt the operation of the motors or other load but still detectable by controllers for the other synchronous inverters in the system.

The synchronous inverters may communicate in order to equalize loading and ensure equal wear among a group of connected synchronous inverters 11. For example, for a 25 kW load and four synchronous inverters, the inverters may communicate their loads so that each synchronous inverter converges to supplying 6.26 kW to the load.

Figure 38:
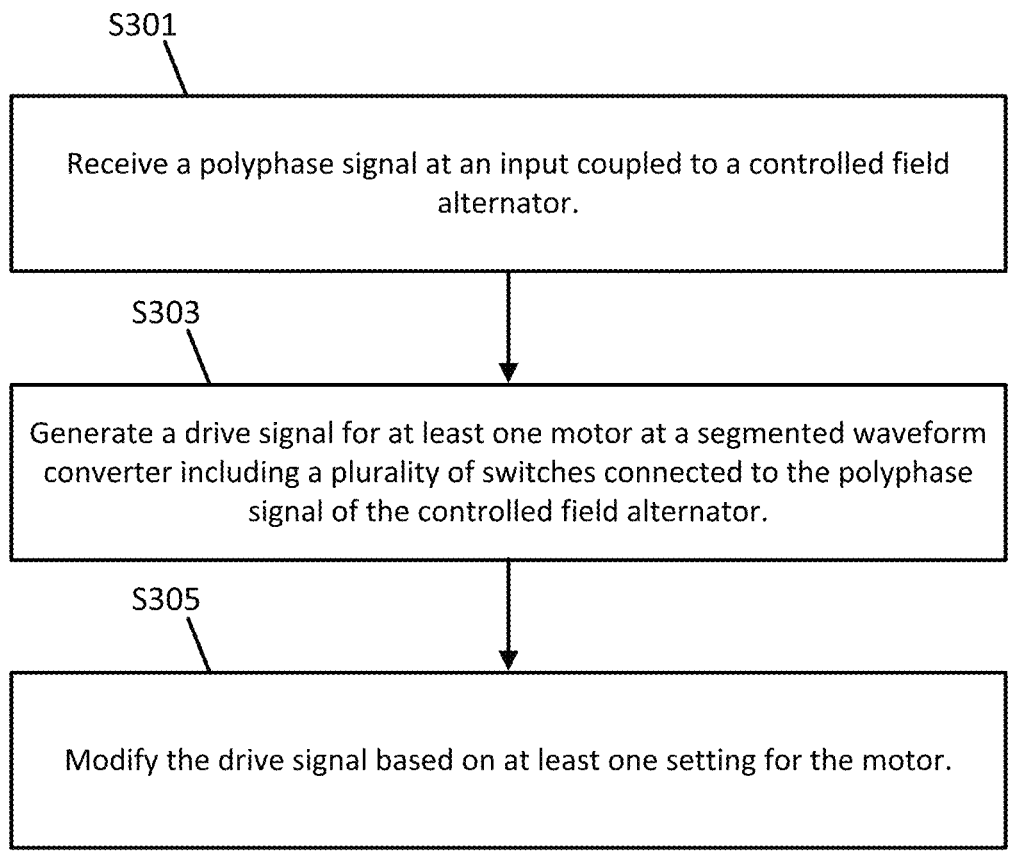
FIG. 38 illustrates a flow chart for powering a vehicle with a synchronous inverter.

FIG. 38 illustrates a flow chart for the operation of the controller 71, which may be implemented by the generator controller of FIG. 16. Additional, different or fewer acts may be included.

At act S301, the processor 300 is configured to receive, at an input coupled to a controlled field alternator, a feedback signal. The feedback signal may be indicative of the current output of the controlled field alternator. The processor 300 may access a target output from memory 352 or receive the target output from communication interface 353 from workstation 359 or another synchronous inverter.

At act S303, the processor 300 generates a drive signal for at least one motor at a segmented waveform converter or synchronous inverter including switches connected to the feedback signal of the controlled field alternator. At act S305, the processor 300 modifies the drive signal based on at least one setting for the motor. At least one setting may include physical parameters of the load motor, a tilt setting for traveling on an incline, a decline, or along an incline, a turn setting for low radius turns, a load setting for the motor, a fuel efficiency setting, or a configuration setting.

Figure 39:
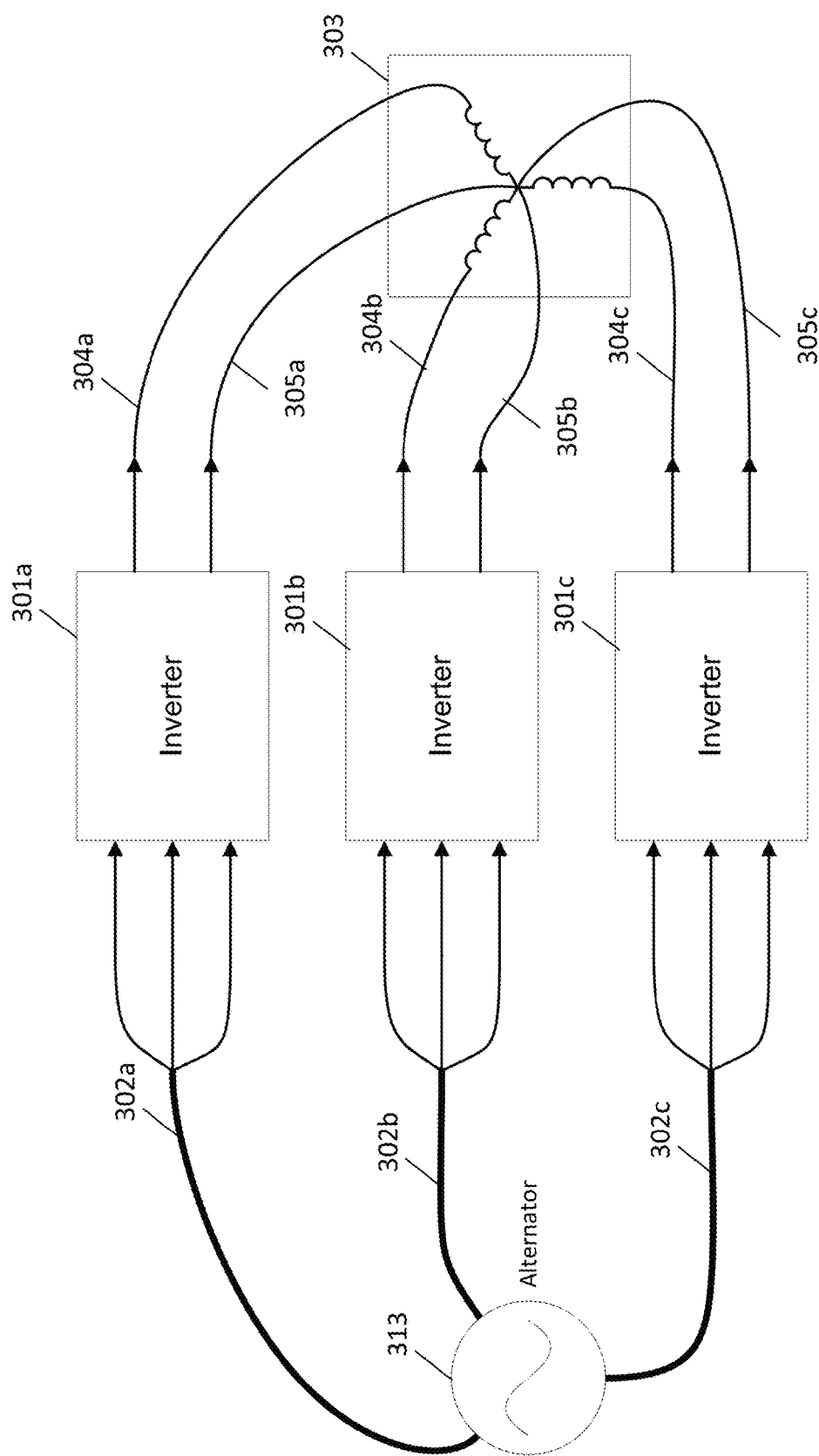
FIG. 39 illustrates an example set of inverters for driving a motor in a wye configuration.
Figure 40:
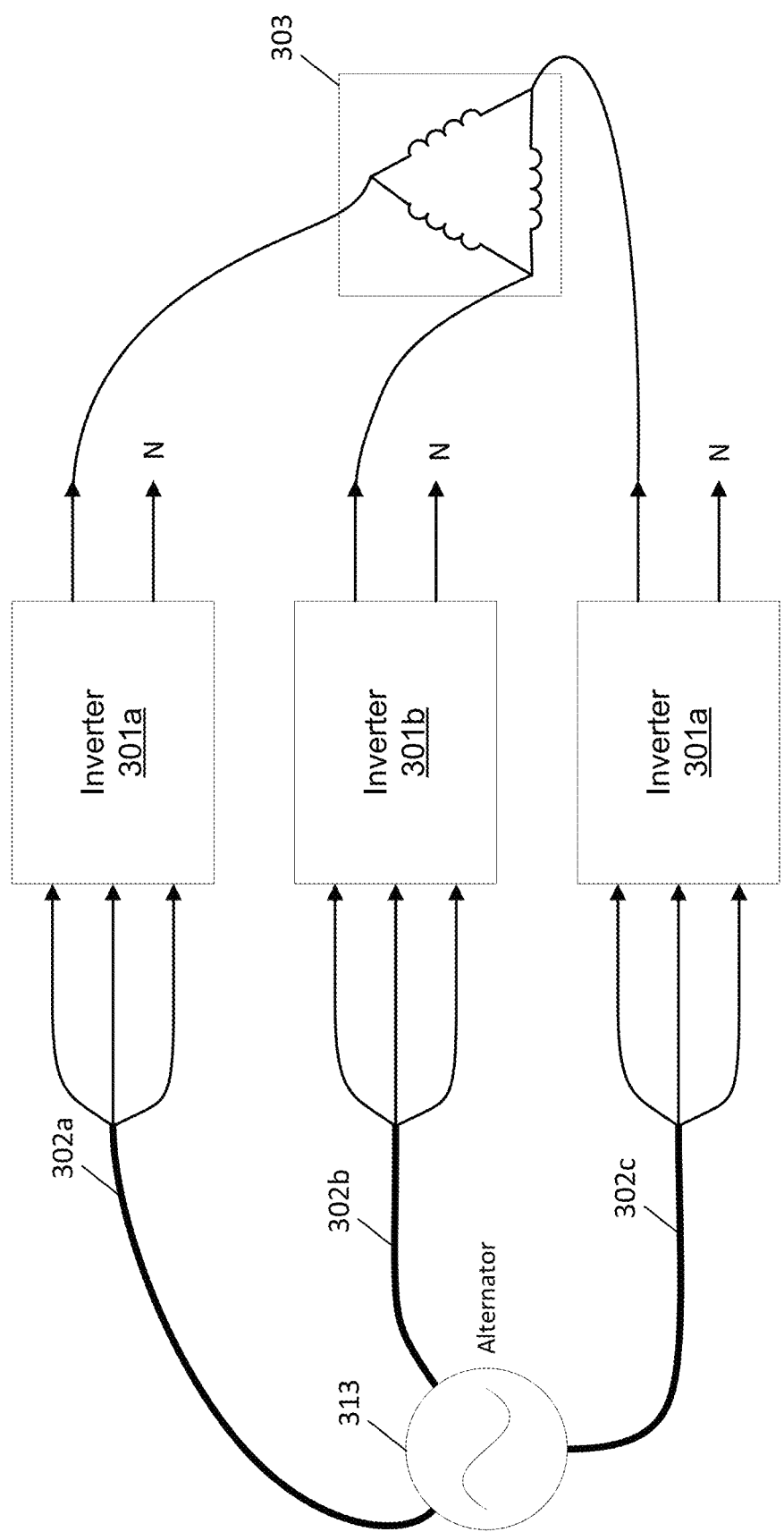
FIG. 40 illustrates an example set of inverters for driving a motor in a delta configuration.

FIG. 39 illustrates an example set of inverters 301a-c connected to an alternator 313 for driving a motor 303 in a wye configuration. FIG. 40 illustrates an example set of inverters 301a-c connected to the alternator 313 for driving a motor 303 in a delta configuration. Other configurations such as high wye or low wye may be used.

The alternator 313 provides three three-phase bundles 302a-c each having three phase connections (i.e., bundle 302a includes three phases for the input of inverter 301a, bundle 302b includes three phases for the input of inverter 301b, and bundle 302c includes three phases for the input of inverter 301c).

Each of the set of inverters 301a-c generator provides one phase to the motor 303. For example, as described above each of the inverters may include an input coupled to a controlled field alternator and configured to receive a polyphase signal from the controlled field alternator and a segmented waveform converter including switches connected to the polyphase signal of the controlled field alternator and generate a drive signal for at least one motor. The segmented waveform converter includes a network of switches that selectively controls passing a combination of the components of the poly-phase signal to the output. The combination is switched multiple times per cycle. When the polyphase signal includes two components, A and B, example combinations include only the A component, only the B component, an additive signal of A+B, a subtracted signal of A−B or B−A, and 0 or a null signal, which may be achieved by A−A or B−B.

Figure 41:
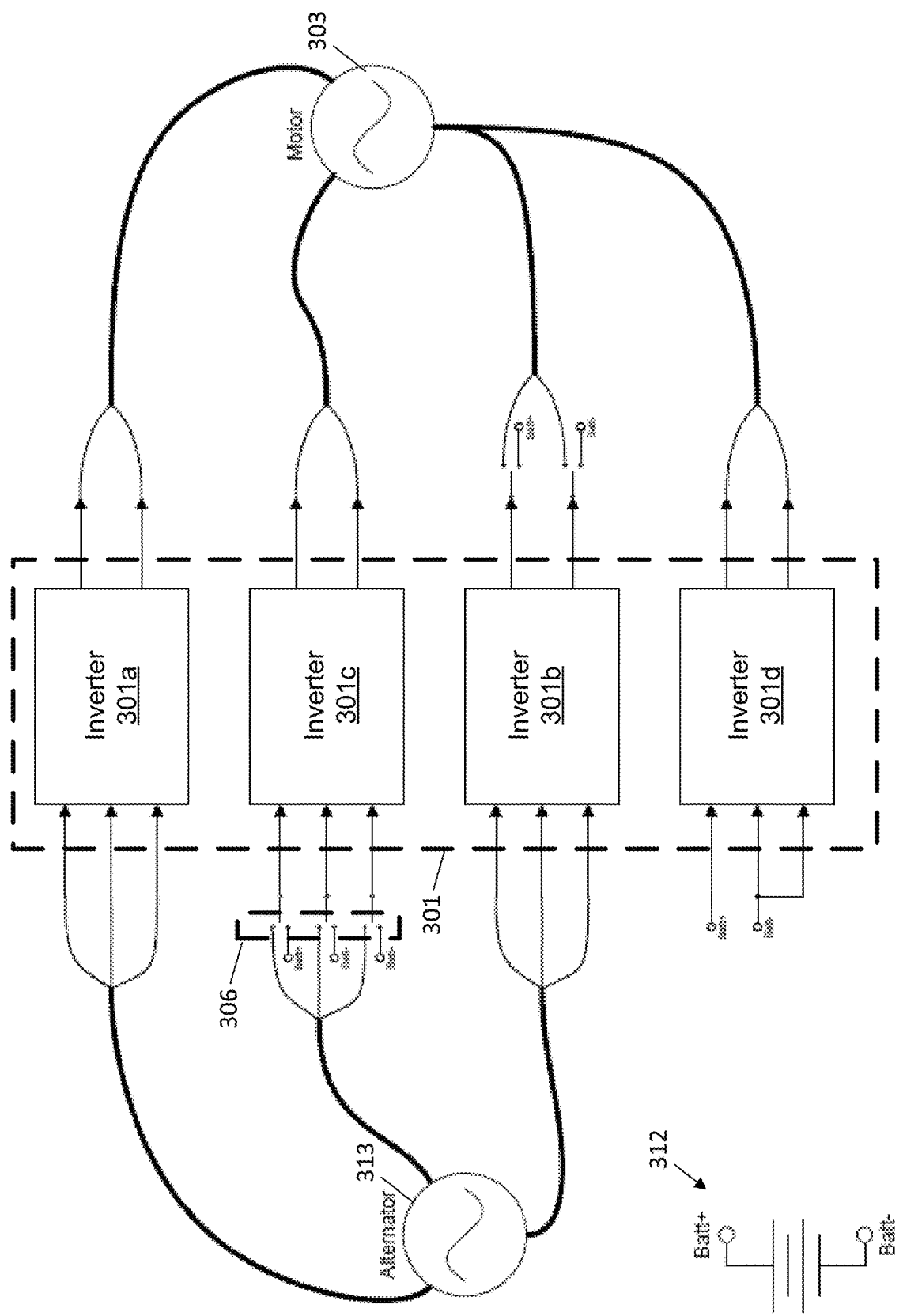
FIG. 41 illustrates a hybrid arrangement of a set of inverters for driving a motor.

FIGS. 41-44 illustrate various hybrid arrangements of a set of inverters for driving a load. FIG. 41 illustrates a set of inverters 301a-d for driving a motor 303. An example application is a hybrid lawnmower or a hybrid zero turn radius lawnmower. The alternator 313 and the battery 312 supply power to the motor 303 from the set of inverters 301a-d. In addition, the alternator 313 may charge the battery 312 directly or through the motor 303. A switch 306 (e.g., a relay) may be configured to switch the inputs of the inverter between the battery 312 and the alternator 313. In one example, the switch 306 in integrated into the invertor circuit.

The set of inverters 301a-d may be included in package 301. The package 301 may be a supporting enclosure or case that supports the semiconductors or other electronics that make up the set of inverters 301a-d. The package 301 may include a series of pins corresponding to the inputs and outputs of the set of inverters 301a-d. Any of the inverters described here may be embodied in a single combined package or an individual package for each inverter.

In the hybrid arrangement of set of inverters 301a-d for driving a motor 303, the battery 312 may provide power the motor 303 and the alternator 313 may provide power to the motor 303 in varying proportion. The battery 312 may provide power to the alternator 313 to start the engine. The alternator 313 may provide power to charge the battery 312.

The alternator 313 may provide one, two, or three phases to the motor 303. The alternator 313 may provide one or two phases and the battery 312 provides the other phase. The battery 312 may provide two phases to the motor 303, through inverter circuit 301c and inverter circuit 301d, and the third phase is provided by closing switches in inverter circuit 301a so that current flows. In this case, the motor 303 is powered at reduced power (i.e., less than rated power). This is an underrated operating condition of the motor 303.

Figure 45:
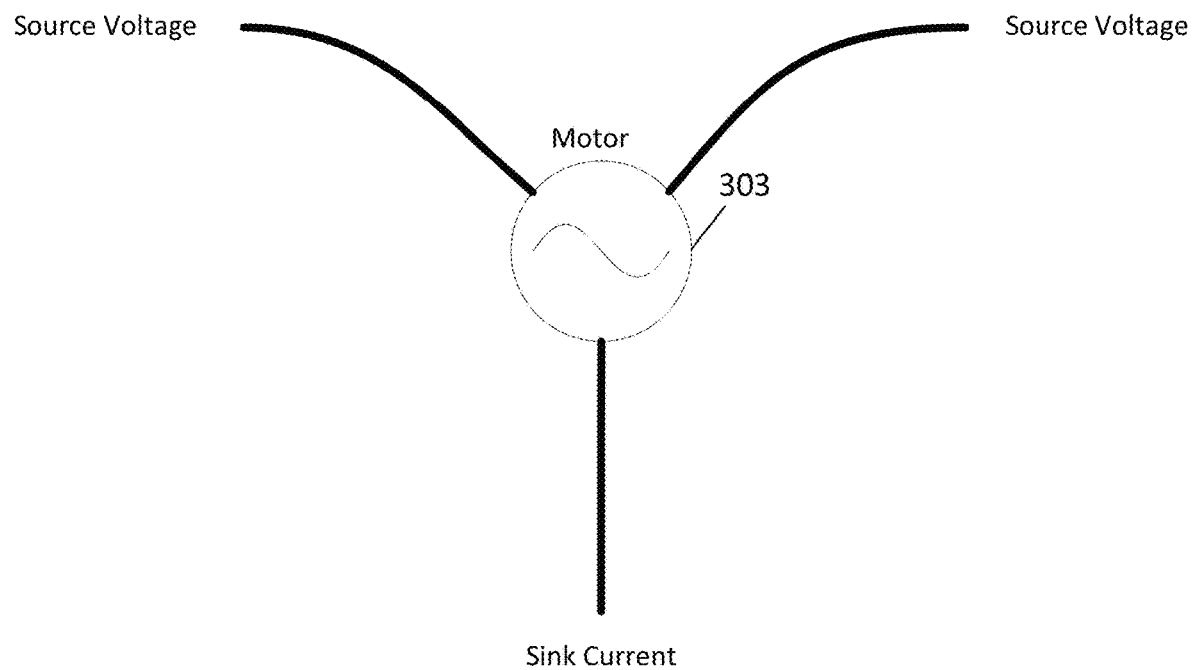
FIG. 45 illustrates an example of the motor of FIGS. 41-44.

FIG. 45 illustrates an example of the motor 303 having two phases connected to voltage sources (e.g., inverter circuit 301c and 301d) and the third phase connected to a current sink (e.g., inverter circuit 301a). The arrangement of two voltage sources connected to a motor, which is connected to a current sink, may be referred to as a biphase motor. The motor 303, provided with power from two phases (e.g., inverter circuit 301c and 301d), may still operate (e.g., rotate) under the power from two phases. The excitation from two of the phases causes the motor to generate the third phase as long as there is a path for the current to flow. The output of a biphase motor may be less than that of a fully powered three phase motor. In one example, when a three phase motor operates at 80-90% efficiency, a corresponding biphase motor may operate at 70-80% efficiency. In one example, the minimum efficiency of the biphase motor is about 67% and the biphase motor provides full rated torque. The hybrid arrangement of the set of inverters 301a-d may provide a biphase motor by connecting two phases of motor 303 to a source (e.g., battery 312, alternator 313, or a combination thereof) through two of the inverters 301a-d and one phased of the motor to a sink through another of the inventors 301a-d.

On the other hand, the motor 303 may operate in an overrated condition with all four of the inverter circuits 301a-d. For example, the alternator 313 may provide power to the motor 303 through both the inverter circuit 301a and the inverter circuit 301c, and the battery may provide power to the motor 303 through both the inverter circuit 301c and 301d. In this example, ⅔ of the rated current of the motor 303 may be provided by the alternator 213 and ⅔ of the rated current of the motor 303 may be provided by the battery 312.

Any of the set of inverters 301a-c may be referred to as first inverter, second inverter and so on. One example includes a first inverter circuit 301a, a second inverter circuit 301b, a third inverter circuit 301c, and a fourth inverter circuit 301d. The first invertor circuit 301a is configured to couple the alternator 313 and the motor 303 to deliver a driving signal from the alternator 313 to the load device 303. The driving signal may include components of different phases of the output of the alternator 313 that are summed or subtracted from each other according to switches in the inverter circuit 301a.

Each of the inverters, or any combination thereof, may be connected to the battery on either the output side (right side, or motor side in FIG. 41) or the input side (left side, or alternator side in FIG. 41). On the input side the battery terminals may be connected to phases of one of the bundles of conductors coupled with the alternator 313. The negative terminal of the battery may be connected to two of the phases and the positive terminal of the battery may be connected to the other phase. On the output side the output side, the terminals of the battery are connected to the output, optionally through diodes, and to one of the phases of the motor 303. An inverter with the battery 312 connected on the output side (e.g., inverter circuit 301*b*) charges the battery 312 or the battery 312 is charged through the motor 303. An inverter with the battery 312 connected on the input side is powered by the battery 312. Different batteries may be coupled to different inverters.

The second invertor circuit 301*b* is configured to couple the alternator 313 to the motor 303 to deliver a driving signal from the alternator 313 to the motor 303 in some instances, and also configured to couple the battery 312 to the alternator 313 to deliver a charging signal from the alternator 313 the battery 312.

When providing the driving signal to the motor 303, the second inverter circuit 301*b* receives an AC signal from the alternator 313 and generates another AC signal, which may be a different frequency than the AC signal received from the alternator 313.

The second inverter circuit 301*b* is configured to couple the battery to the load device to deliver a charging signal from the motor 303 to the battery 312. When providing the charging signal to the battery 312, the second inverter circuit 301*b* still receives the AC signal from the alternator 313 but generates the charging signal for the battery 312. The charging signal may still be an AC signal but may be a much higher frequency. In one example, the charging signal generated by the second inverter circuit 301*b*, which is electrically connected to inverter circuit 301*d*, is provided through inverter circuit 301*d* to the battery 213. The higher frequency may be a predetermined frequency or any frequency above a predetermined frequency. Examples for the predetermined threshold may be 1 kHz, 2 kHz, or another value. Because of the impedance of the motor 303, the higher frequency signal does not substantially affect the operation of the motor 303.

The second inverter circuit 301*b* is configured to couple the battery 312 to the alternator 313 to deliver a cranking signal from the motor 303 to the battery 312 to an engine coupled to the alternator 313. The inverter 301*b* may be used to crank the engine or initiate engine rotation by converting battery power from battery 313 provides an AC voltage waveform on the alternator stator windings. The resulting rotating magnetic flux in the stator applies a torque on the rotor. The torque causes the engine to spin, causing air and fuel to be compressed in the cylinders and allowing the engine to initiate combustion, which starts the engine.

A third inverter circuit 301*c* is configured to couple the battery 312 to the motor 303 or couple the alternator 313 to the motor 303 to deliver a second driving signal to the motor 303. A fourth inverter circuit 301*d* is configured to couple the battery 312 to the motor 303 to deliver a third driving signal from the battery 312 to the motor 303.

Figure 42:
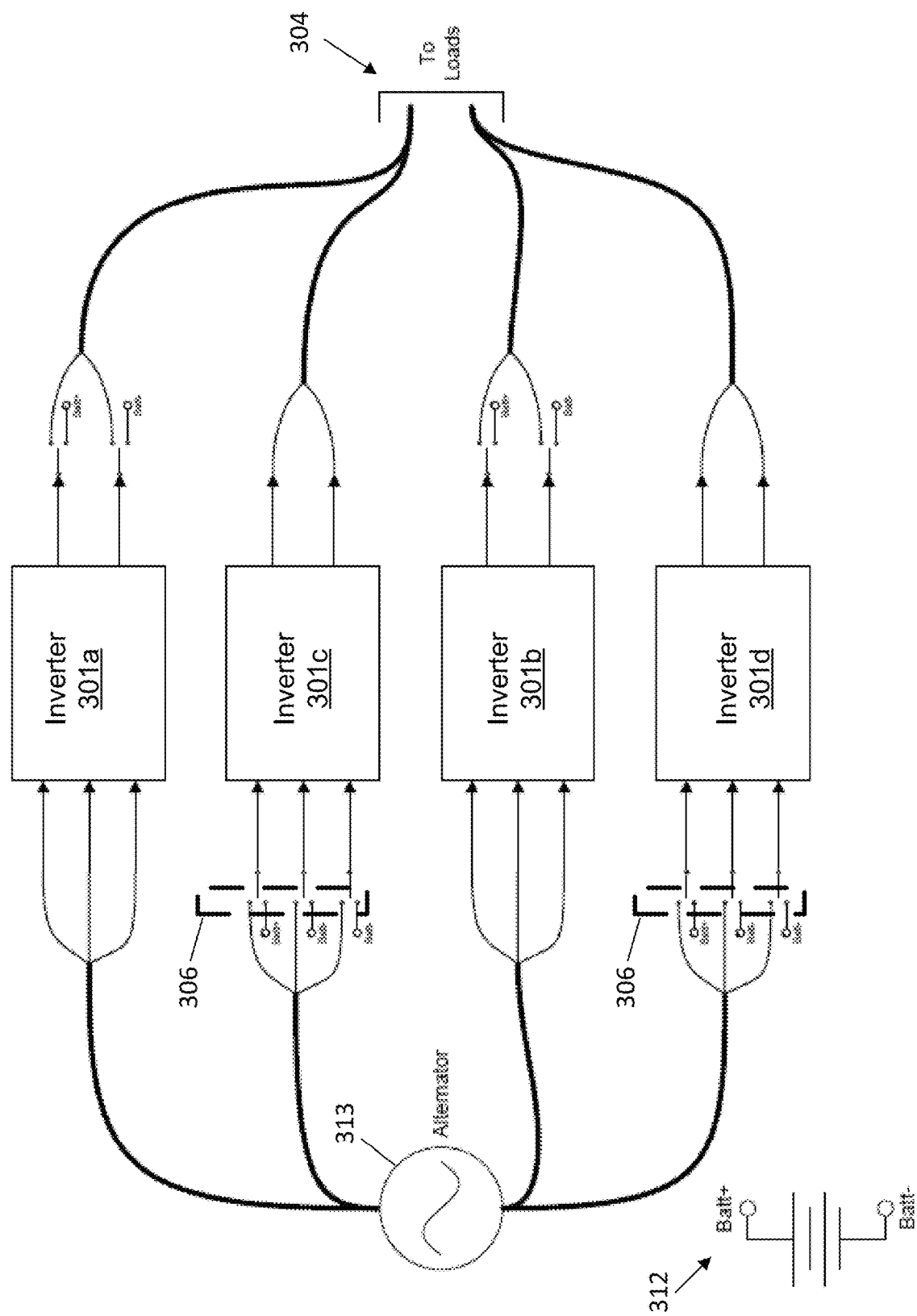
FIG. 42 illustrates a hybrid arrangement of a set of inverters for driving a load.

FIG. 42 illustrates a hybrid arrangement of a set of inverters 301*a-d* for driving a load 304. Each of the inverter circuits are connected to the battery 312. Inverter circuits 301*a* and 301*b* are connected to the battery 312 on the output side for charging the battery from the load 304. Inverter circuits 301*c* and 301*d* are connected to the battery 312 on the input side for charging the battery from the alternator 313 and/or providing power to the load 304. Alternatively, different batteries may be connected to different inverter circuits.

The battery 312 provides power to the load 304 in various scenarios. The controller (e.g., controller 91 or controller 200) may switch one or more of the inverters circuits 301*a*-301*d* to connect the battery 312 to the load 304 based on a user input, a control schedule, or based on the current level of the battery 312. For example, the battery 312 may provide power to the load 304 until the battery 312 falls below a predetermined level. At this point, the battery 312 may also be connected to the alternator 313 to crank the engine by one or more of the inverters circuits 301*a*-301*d*. In one example, power flows through the set of inverters 301*a-d* in two directions in order to start the generator set. For example, power may flow from battery 312 to the load 304 through inverter circuits 301*c* and 301*d* in a first direction and back from the load 304 through invert circuits 301*a* and 301*b* to start the engine.

One or more of the inverters circuits 301*a*-301*d* may be overloaded for a short period of time, placing a burden on the heat sink, but the overloading and burden is only temporary. In this case, temporary means a predetermined amount of time (e.g., about one second to a few seconds or up to 30 seconds) sufficient to start the generator set. In response to the generator set running, the inverters circuits 301*a*-301*d* return to normal load.

Figure 43:
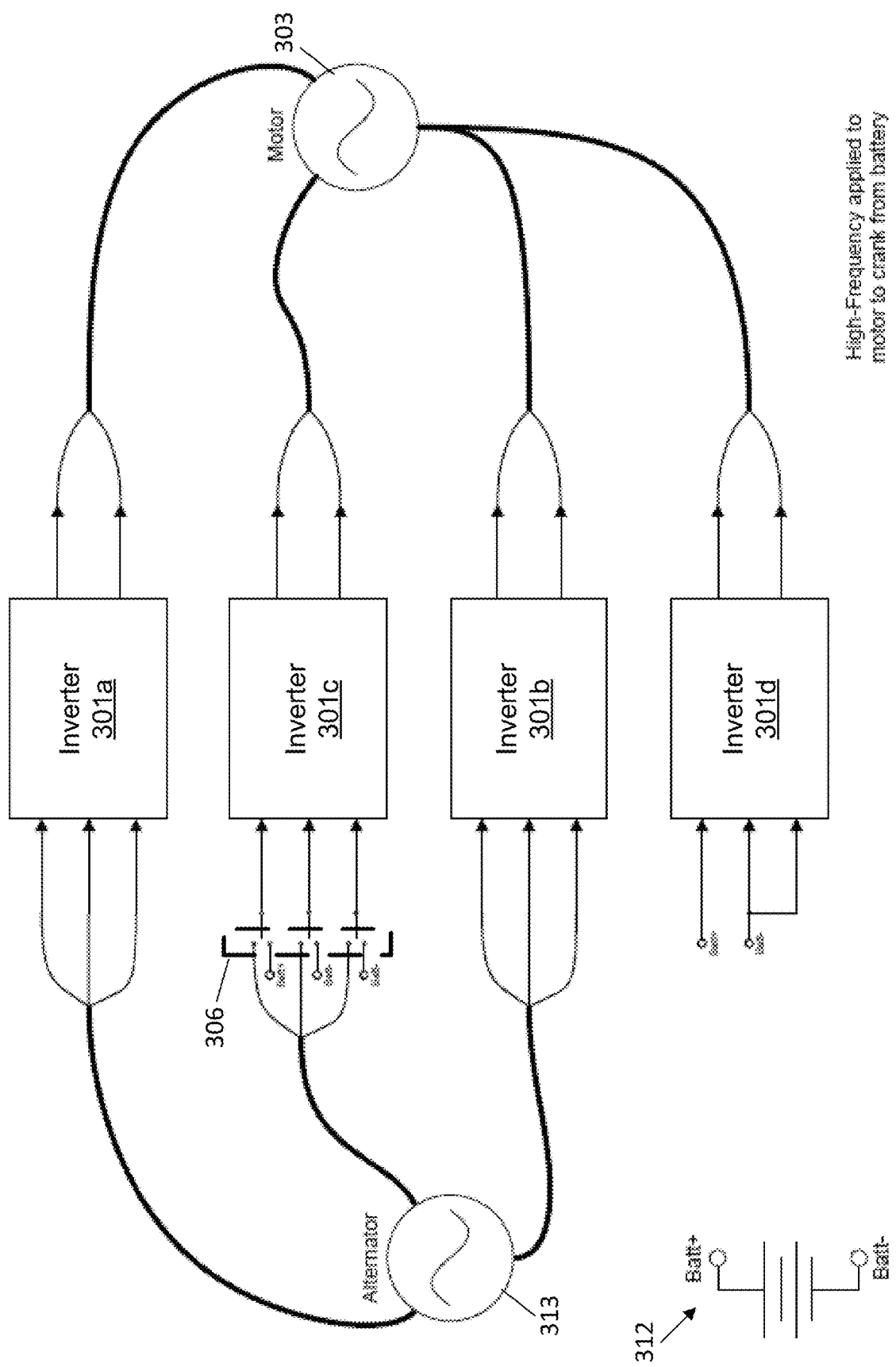
FIG. 43 illustrates a simplified hybrid arrangement of a set of inverters for driving a motor.

FIG. 43 illustrates a simplified hybrid arrangement for the set of inverters 301*a-d* for driving a motor 303. In the embodiment of FIG. 43, as compared to the embodiment of FIG. 41, no battery is connected to inverter circuit 301*b*. Therefore, at least one fewer switching circuit or relay is required. In the embodiment, because no switching is required for any of the inverter circuits, no relays or switching circuits may be included. FIG. 43 illustrates an embodiment for the set of inverters 301*a-d* with an absence of relays and contactors.

In the embodiment of FIG. 43, the inverter circuit 301*d* may generate a driving signal for motor 303 at a high frequency. Example high frequencies includes 1 kHz, 5, kHz, and 10 kHz. The motor 303 is a conductive path for the high frequency driving signal to pass in a reverse direction through inverter circuit 301*b* or inverter circuit 301*a* to the alternator 313 for starting the engine.

Figure 44:
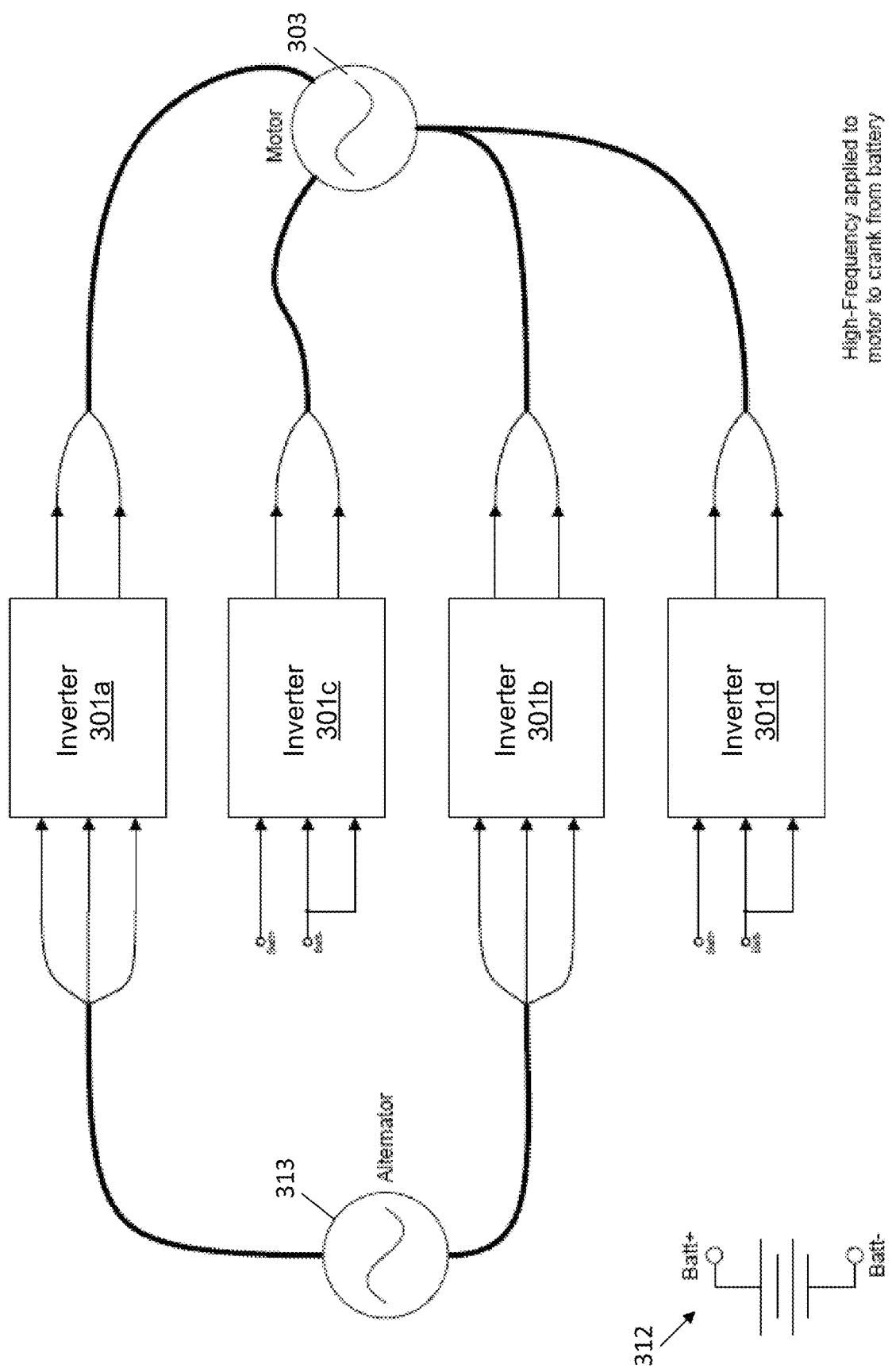
FIG. 44 illustrates another simplified hybrid arrangement of a set of inverters for driving a motor.

FIG. 44 illustrates another simplified hybrid arrangement of a set of inverters 301*a-d* for driving a motor 303. The embodiment of FIG. 44, as compared to the embodiment of FIG. 43, does not include a connection to the alternator 313 to the inverter circuit 301*c*. Therefore, at least one fewer switching circuit or relay is required as compared to FIG. 43, or at least two fewer switching circuits or relays are required as compared to FIG. 41.

In FIG. 44, the battery 312 may be charged through either inverter circuit 301*c* or inverter circuit 301*d*, which generate a DC signal or high frequency AC signal from motor 303, which is powered by alternator 313 through inverter circuit 301*a* and inverter circuit 301*b*. The alternator 313 may drive the motor 303 through inverter circuit 301*a* and inverter circuit 301*b*. In addition, the battery 312 may supplement the alternator 313 through either inverter circuit 301*c* or inverter circuit 301*d*.

FIGS. 46-51 illustrate block diagram representations of a set of inverters 301*a-d* for driving a motor 303. The set of inverters 301*a-d* may be controlled by a generator controller (e.g., controller 91 or controller 200), described herein and including at least processor 300, memory 352, and communication interface 353. Additional, different, or fewer components may be included.

The controller may select a position of switch 320 and the positions of switches, which may include at least one energy storing device, in the set of inverters 301a-d. The position of switch 320 may either be at an engine/alternator setting (i.e., the load 303 is connected by the switch 320 to the alternator 313) or a battery setting (i.e., the load 303 is connected by the switch 320 to the battery 312). The battery setting is conductive to allow a current from the battery 312 to the inverter circuit 301b. The engine/alternator setting is conductive to allow a current from the inverter circuit 301b to the battery 312.

Figure 46:
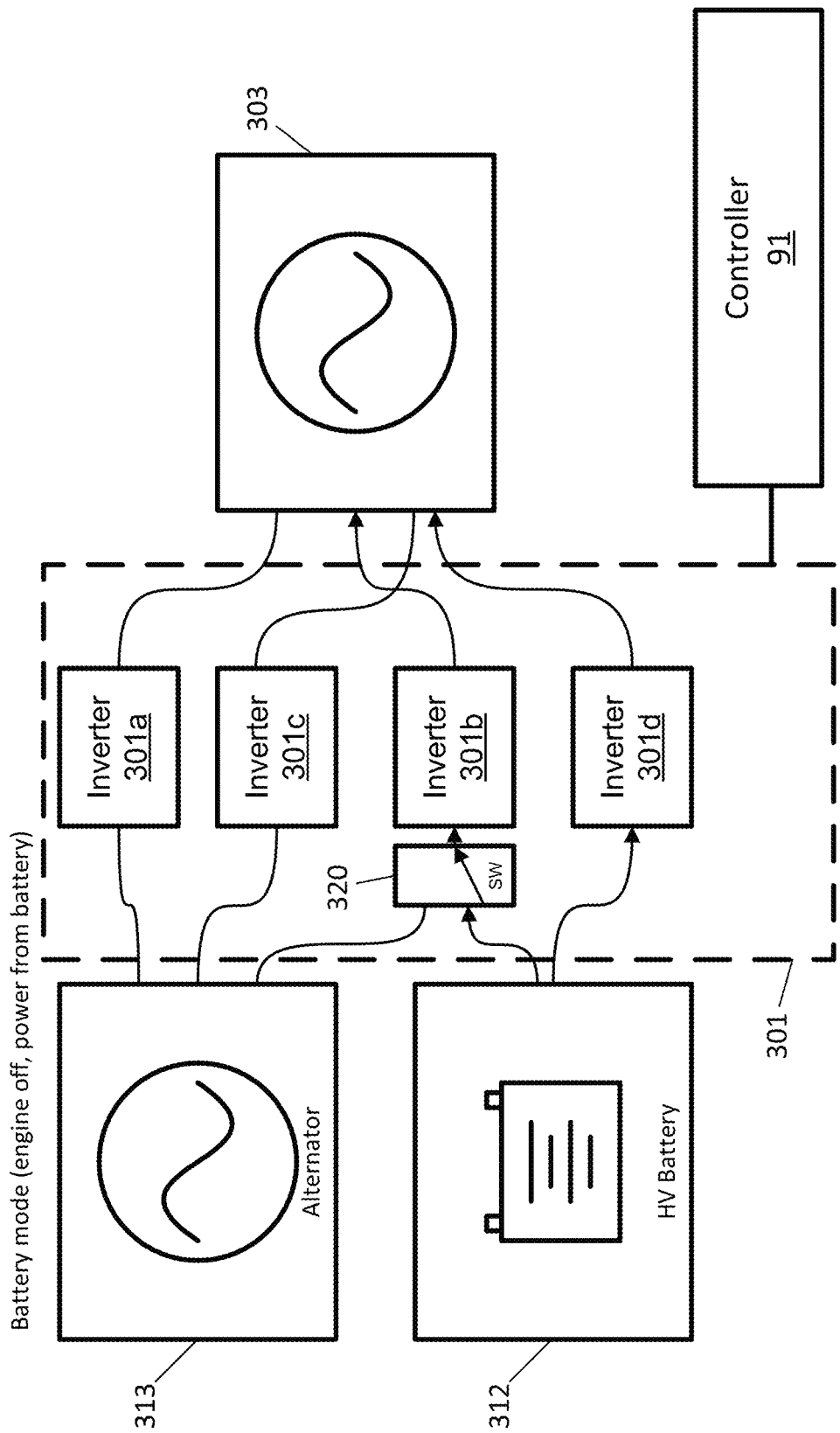
FIG. 46 illustrates an example battery mode for hybrid operation of a motor.

FIG. 46 illustrates an example battery mode for operation of a motor powered by battery 312 in which the switch 320 is in the battery setting. The engine and alternator 313 may be off in the battery mode. Battery 312 provides power through inverter circuit 301b, in the forward direction, to a first phase of the motor 303, and the battery 312 provides power through inverter circuit 301d, in the forward direction, to a second phase of the motor 303. The inverter circuit 301a may be a current sink in the battery mode, and the inverter circuit 301c may be an open circuit or otherwise unused in the battery mode. For an inverter circuit to be an open circuit, one or more switches may be open. In one example, all switches of the inverter circuit are open. In another example, at least enough switches are open such that no path is complete through the inverter circuit. For the inverter circuit to sink current, the inverter circuit closes switches for that phase of the motor. The inverter circuit may be commutating for a particular phase.

Figure 47:
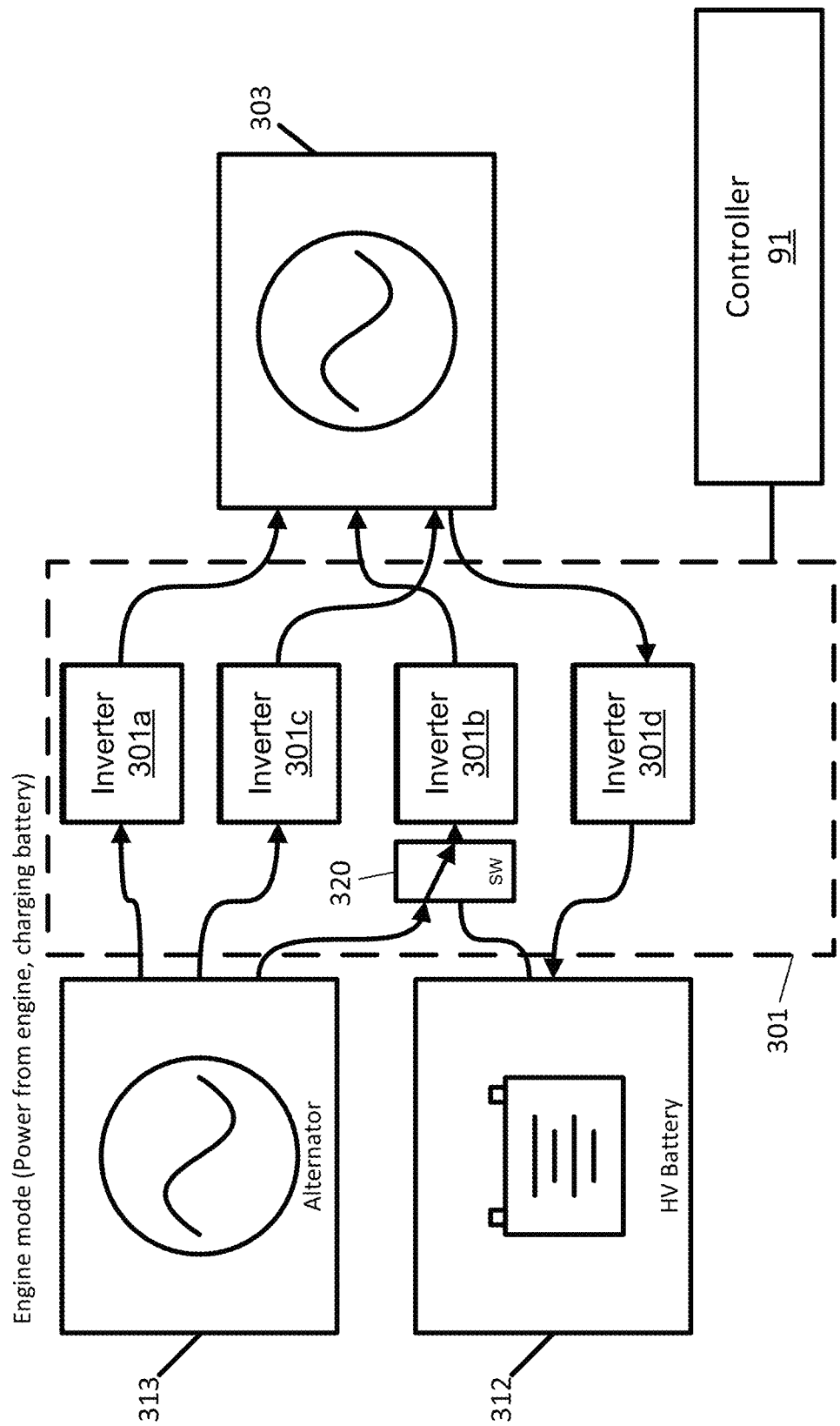
FIG. 47 illustrates an example engine mode for hybrid operation of a motor.

FIG. 47 illustrates an example engine mode for hybrid operation of the motor 303 in which all power originates with the engine and alternator 313 and the battery 312 is charged from the alternator 313. The switch 320 is in the engine setting. Each of inverter circuits 301a-c generates a different drive signal for a different phase of the motor and each may operate in the forward direction. Power flows from the motor 303 through inverter circuit 301d to charge the battery 312 in the reverse direction.

Figure 48:
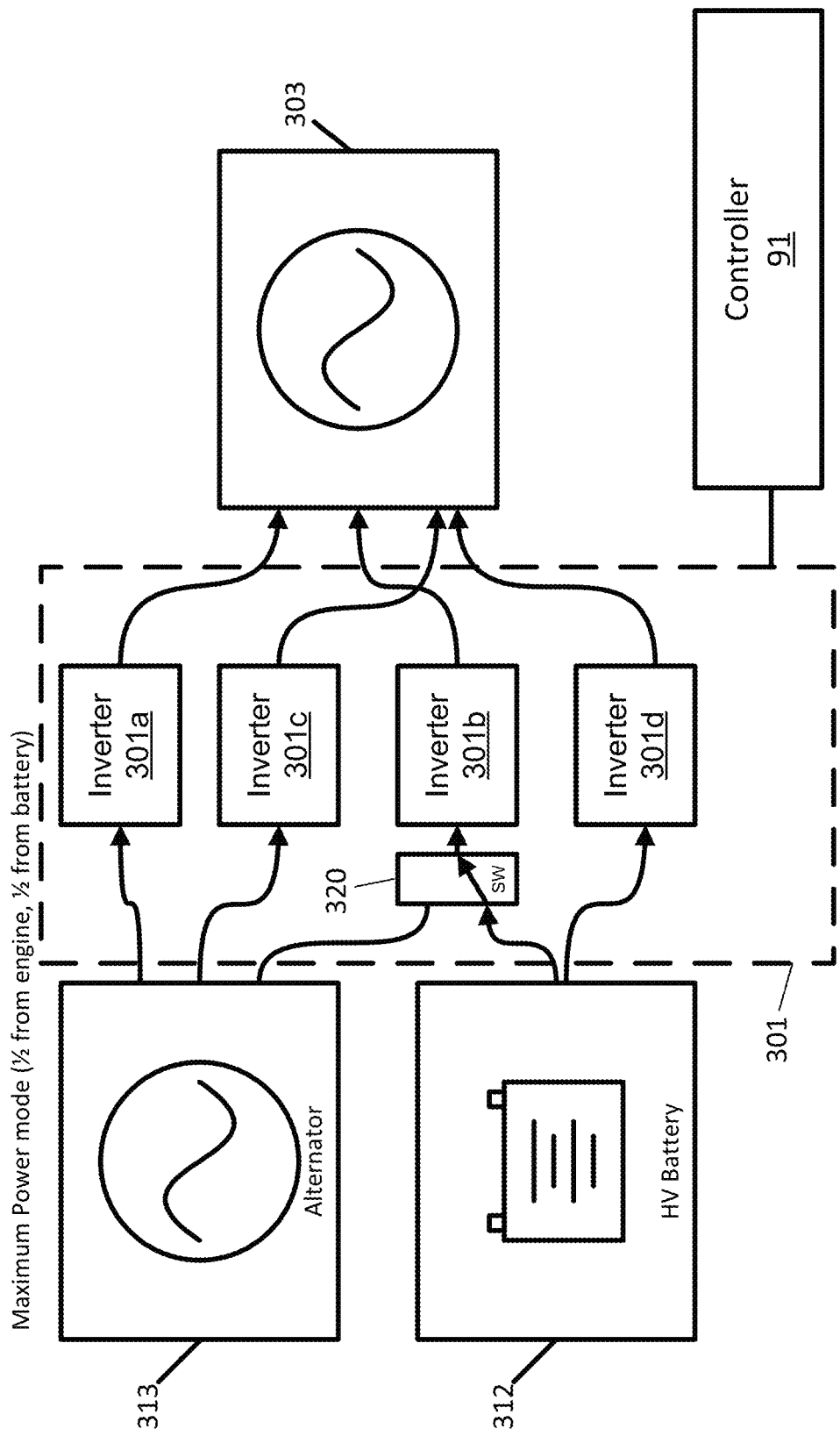
FIG. 48 illustrates an example maximum power mode for hybrid operation of a motor.

FIG. 48 illustrates an example maximum power mode for hybrid operation of the motor 303. The switch 320 is in the battery setting. The motor 303 receives power in a first phase and third phase through inverter circuit 301a and inverter circuit 301c in the forward direction. The motor 303 receives power in a second phase and the third phase through inverter circuits 301b and 301d from the battery 312 in the forward direction. The maximum power mode may provide more than a rated power to the motor 303. For example, up to ⅔ of the rated power may be provided by the battery 312 and up to ⅔ of the rated power may be provided by the alternator 313.

Figure 49:
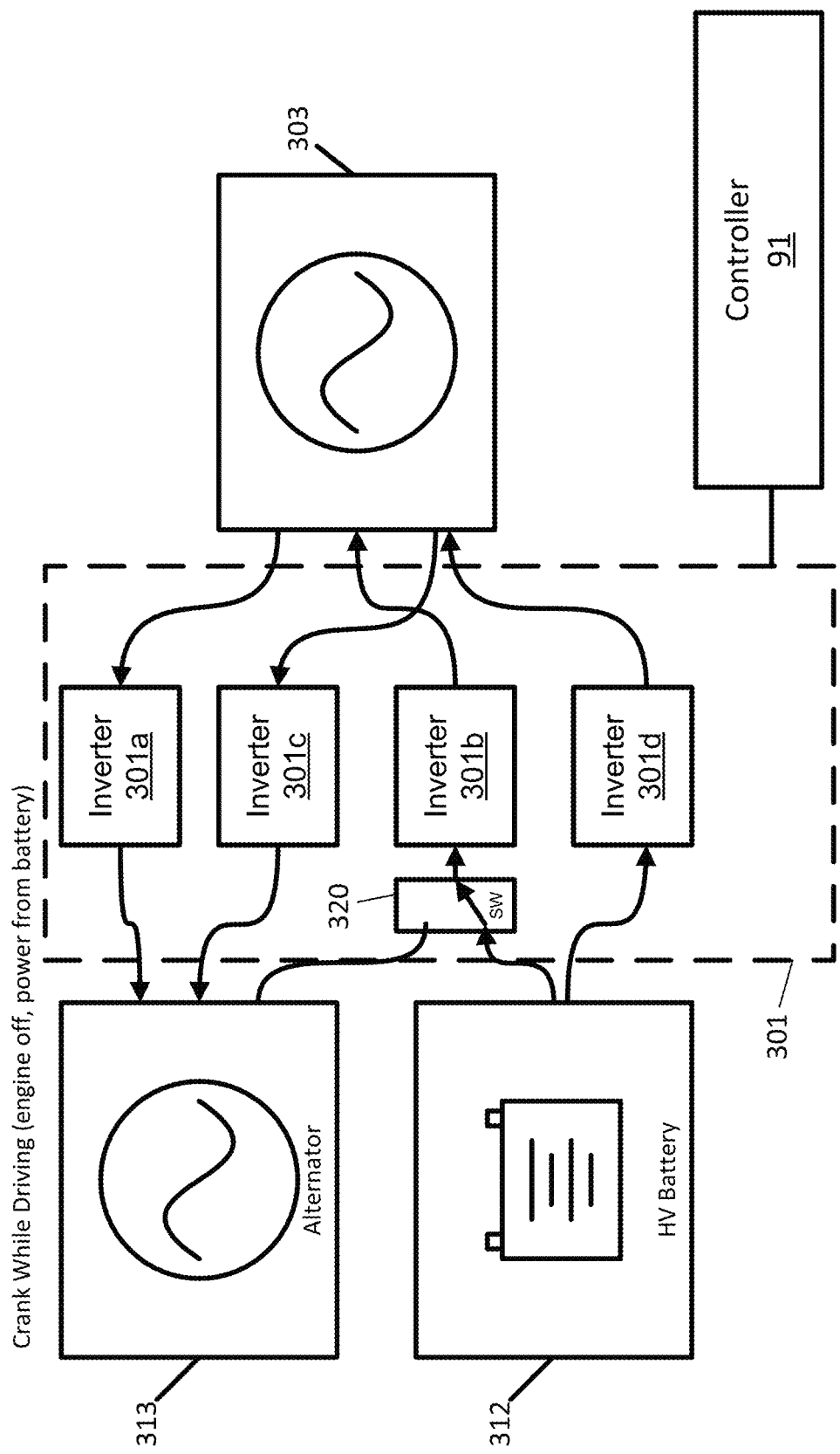
FIG. 49 illustrates an example crank while driving mode for hybrid operation of a motor.

FIG. 49 illustrates an example crank while driving mode for hybrid operation of a motor. The switch 320 is in the engine setting. The motor 303 receives a high frequency cranking signal from inverter circuit 301b and/or inverter circuit 301d in the forward direction. The motor 303 provides the high frequency inverter signal through inverter circuit 301a and/or inverter circuit 301c in the reverse direction.

Figure 50:
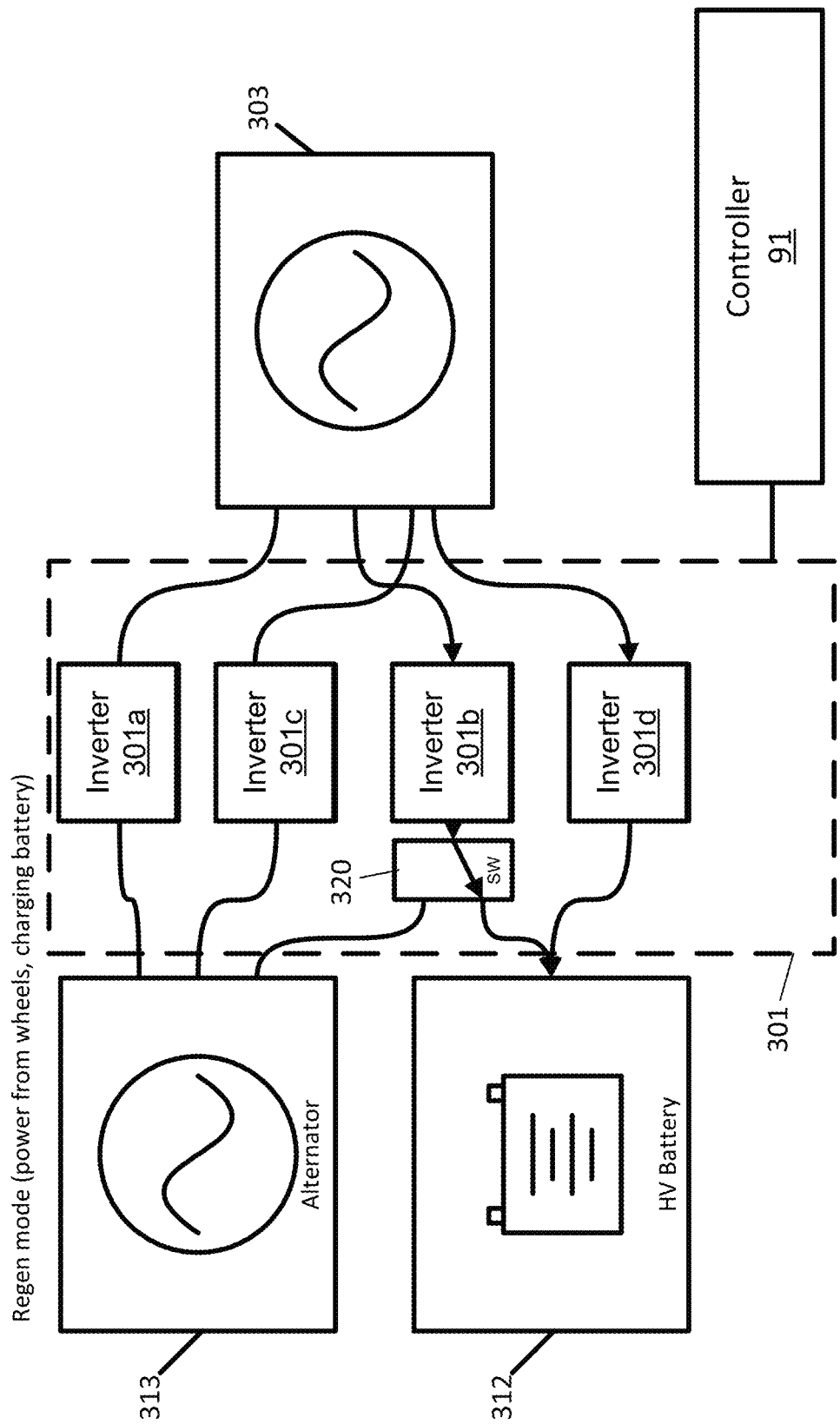
FIG. 50 illustrates an example regenerative mode for hybrid operation of a motor.

FIG. 50 illustrates an example regenerative mode for hybrid operation of a motor. The switch 320 is in the battery setting. Power from the wheels of the vehicle is converted to electrical energy by motor 303. The inverter circuit 301b and/or 301d provides a charging signal to the battery 312 in the reverse direction. The inverter circuit 301c may be an open circuit or otherwise inactive in the regenerative mode. The inverter circuit 301a may be a current sink to provide a path for the motor 303 driven by the inverter circuits 301b and/or 301d.

Figure 51:
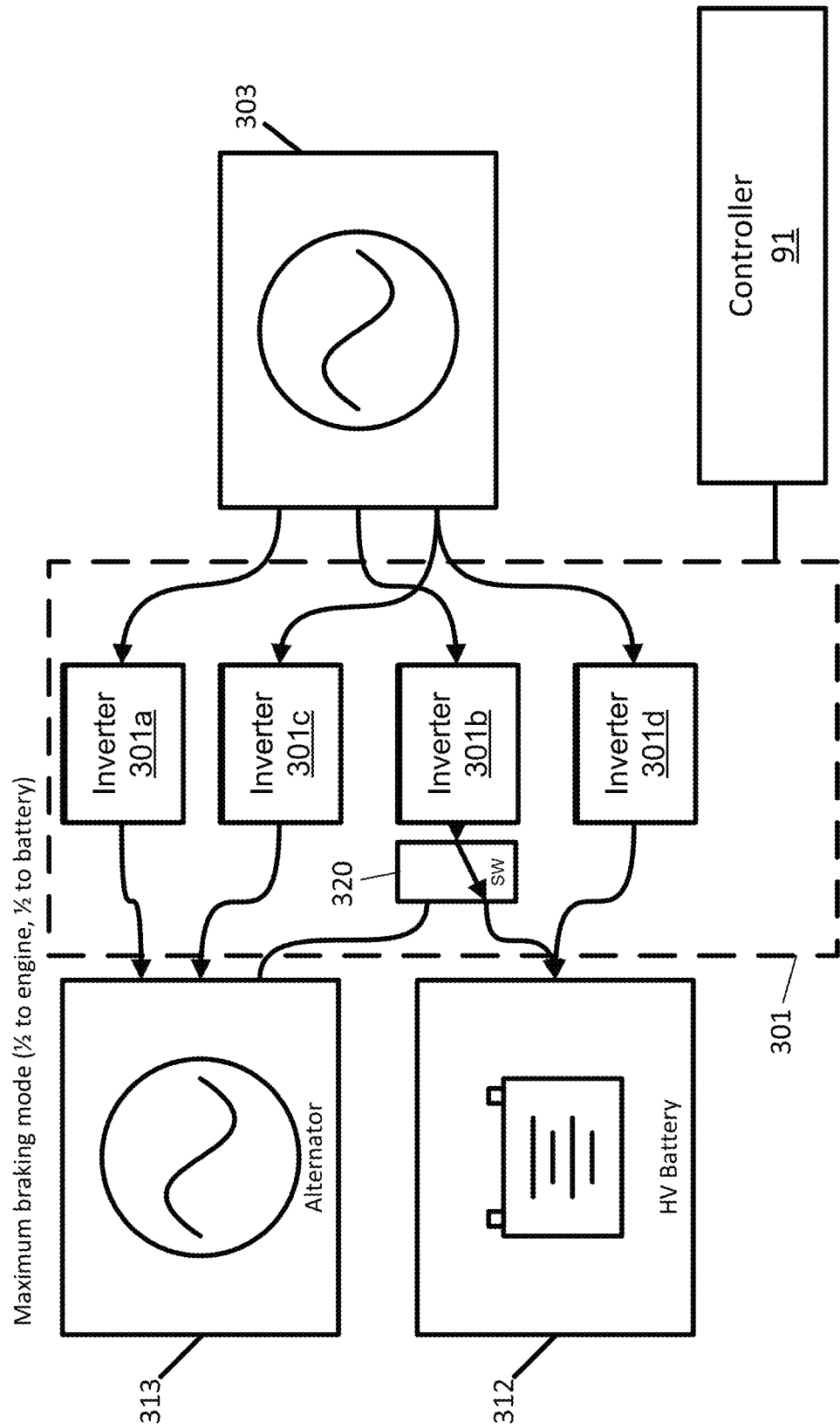
FIG. 51 illustrates an example maximum braking mode for hybrid operation of a motor.

FIG. 51 illustrates an example maximum braking mode for hybrid operation of a motor. The switch 320 is in the reverse direction. The motor 303 returns power to the system, which is provided to both the battery 312 and the alternator 313.

Table 3 illustrates the settings of the switch 320 and the inverters 301a-d.

| Mode | FIG. | Inverter 301a | Inverter 301b | Inverter 301c | Inverter 301d | Switch 320 |
|---|---|---|---|---|---|---|
| Battery | FIG. 46 | Sinking current | Forward | Open | Forward | Battery |
| Engine | FIG. 47 | Forward | Forward | Forward | Reverse | Engine |
| Maximum power | FIG. 48 | Forward | Forward | Forward | Forward | Battery |
| Cranking | FIG. 49 | Reverse | Forward | Reverse | Forward | Engine |
| Regenerative | FIG. 50 | Sinking current | Reverse | Open | Reverse | Battery |
| Maximum braking | FIG. 51 | Reverse | Reverse | Reverse | Reverse | Battery |

Figure 52A:
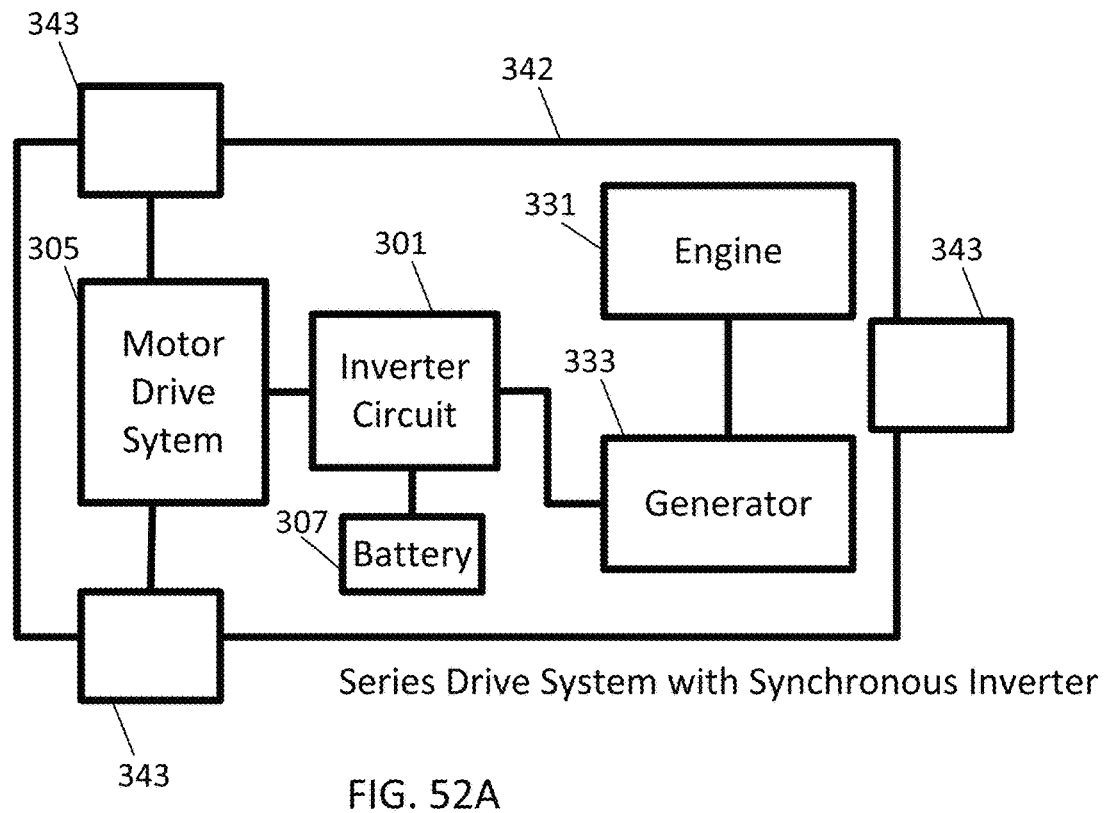
FIG. 52A illustrates a vehicle and a series drive system for the inverter.
Figure 52B:
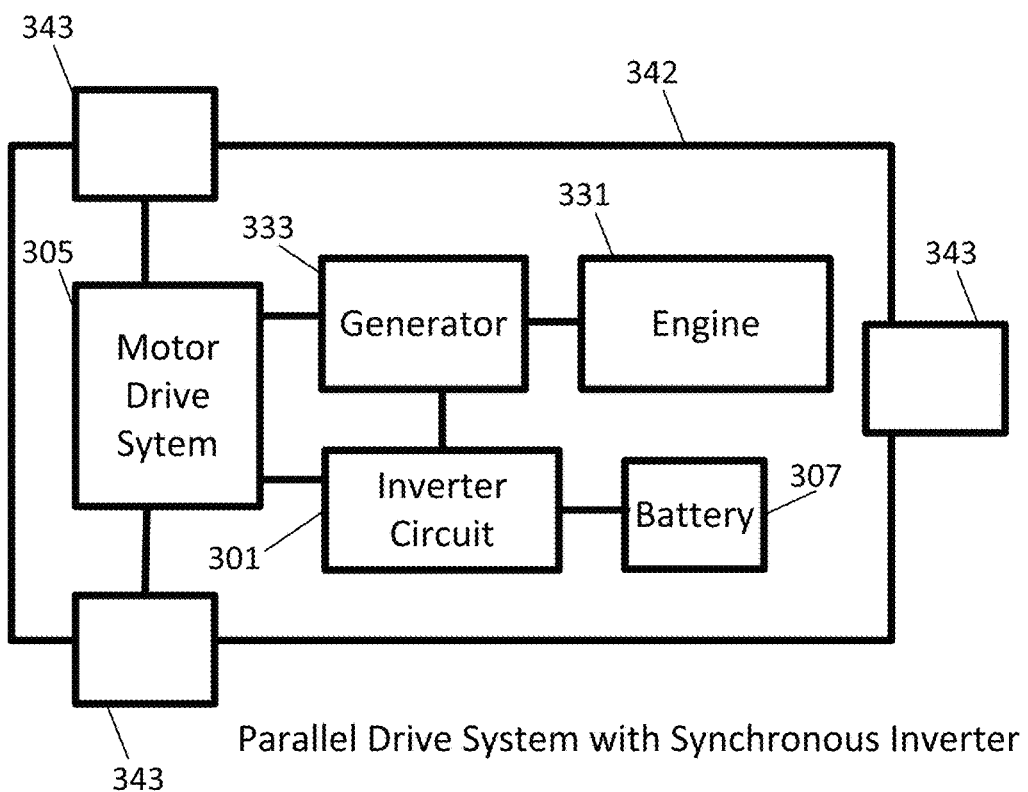
FIG. 52B illustrates a vehicle and a parallel drive system for the inverter.

FIG. 52A illustrates a series hybrid drive system for the inverter 301 in the vehicle 342. FIG. 52B illustrates a parallel hybrid drive system for the inverter 301 in the vehicle 342. Both systems include an engine 331, an alternator 333, a battery 307, an inverter circuit 301, and a motor drive system 305 coupled to at least one wheel 343. Additional, different, or fewer components may be included.

In the series hybrid drive system, the engine 331 is not mechanically coupled to the driven load (e.g., wheel 343). Instead, mechanical power is transferred from the engine 331 to the generator 333 and converted to electrical energy which is modified by the inverter 301, which provides power to the driven load (e.g., wheel 343) via the motor drive system 305. In the parallel hybrid drive system, there is a mechanical connection between the engine 331 and motor drive system 305 in addition to the mechanical connection to the generator 333.

In one embodiment, the inverter circuit 301 is configured for an emergency mode, which may be referred to as battle mode or limp home mode. Consider to vehicles 342 traveling together, and at least one of the vehicles ("limited vehicle") is presently relying on stored electrical power (e.g., battery). The limited vehicle may have run out of fuel, rendering the engine 331 unavailable. The limited vehicle may only have electrical power. The inverter circuit 301 of the vehicle may be connectable using an external cable (e.g., extension cord). Thus, the limited vehicle receives elected power from the inverter circuit 301 of the other vehicle, which operates the motor drive system 305. Tethered together, the vehicles 342 are able to limp home together under limited power. In some examples, the limited example may have a malfunctioning or missing inverter circuit 301, and the inverter circuit 301 of the other vehicle is connected directly to the motor drive system 305 of the limited vehicle.

Figure 54A:
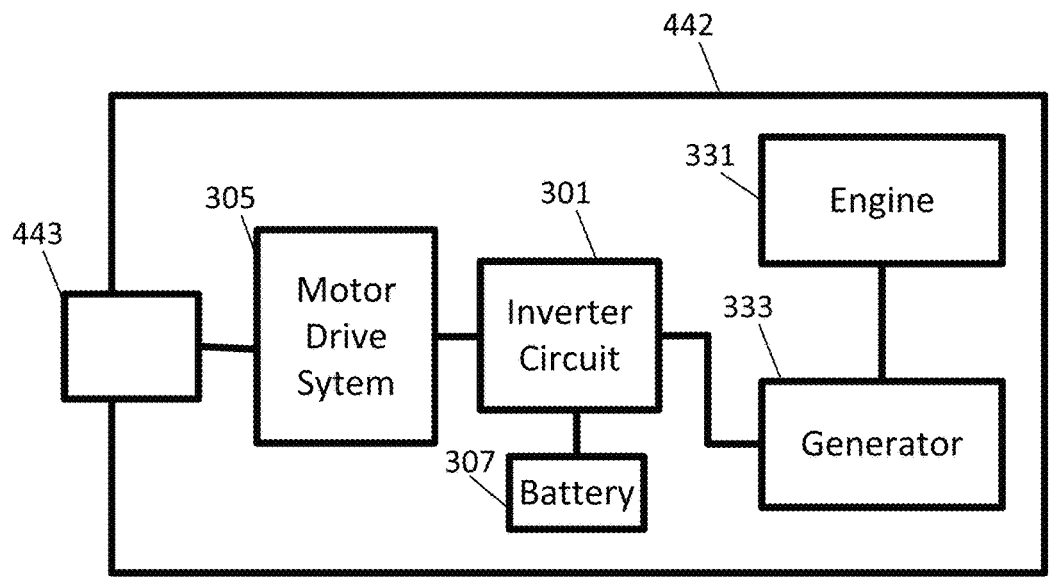
FIG. 54A illustrates a marina application for a series drive system for the inverter.
Figure 54B:
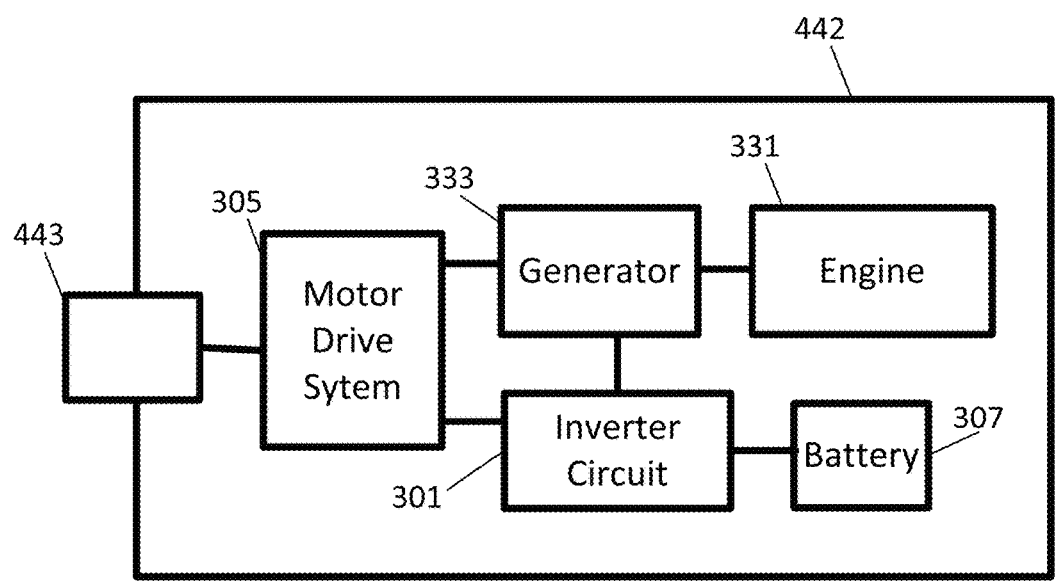
FIG. 54B illustrates a marina application for a parallel drive system for the inverter.

FIGS. 54A and 54B illustrates an example marine application for the inverter. FIG. 54A illustrates a series hybrid drive system for the inverter 301 in the marine vehicle 442. FIG. 54B illustrates a parallel hybrid drive system for the inverter 301 in the marine vehicle 442. The marine vehicle 442 may include a boat, a submersible craft, a fan boat, or another vehicle. The descriptions of the engine 331, the alternator 333, the battery 307, the inverter circuit 301, and the motor drive system 305 described with respect to FIGS. 52A and 52B apply to the marine vehicle 442. The motor drive system 305 is mechanically coupled to the propulsion device 443, which may include a propeller, an impeller, a fan, or similar device to propel the marine vehicle 442 via water. Additional, different, or fewer components may be included.

Figure 53:
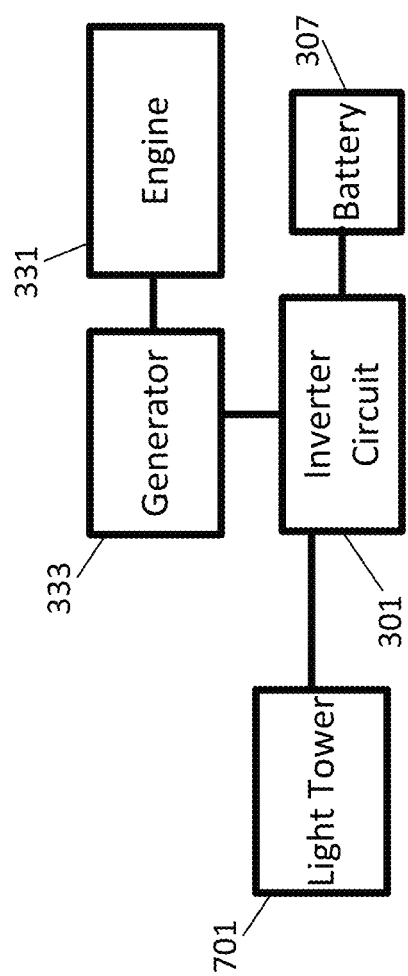
FIG. 53 illustrates an example light tower application for the inverter.

FIG. 53 illustrates an example light tower 701 application for the inverter. The invertor 301 applied to a light tower 701 include one or more light sources powered by the generator 333 through inverter circuit 301. The light tower 701 may include a structure that is extendible at variable distances above the ground and supporting the one or more light sources. The output of the generator 333 may be modified by the inverter circuit 301 for different applications. The inverter circuit 301 may control the intensity of the light(s) of the light tower 701. In high output applications, a first drive signal is generated for the light tower 701, and in low output application, a second drive signal is generator for the light tower 701.

The inverter circuit 301 may include multiple portions corresponding to multiple inverter circuits 301*a-d* as described in embodiments herein. Various effects may be provided by connecting the different at different lights (e.g., light emitting diodes or LEDs) at different arrangements or colors. The lights may form a sign including text or images formed by the LEDs.

Considering four inverter circuits 301*a-d*, in one embodiment inverter circuit 301*a* may correspond to red LEDs, inverter circuit 301*b* may correspond to green LEDs, inverter circuit 301*c* may correspond to blue LEDs, and inverter circuit 301*d* may correspond to an AC output. In another embodiment, inverter circuits 301*a-c* may correspond to a three phase AC output (e.g., for powering a load such as a motor), and inverter circuit 301*d* may correspond to a DC output for the light tower 701 with varying intensity levels. Other quantities and arrangements of inverter circuits are possible. The battery 307 may provide power to the light tower 701 and/or be charged by the generator 333 and described in the operation modes shown in FIGS. 46-51.

Figure 55:
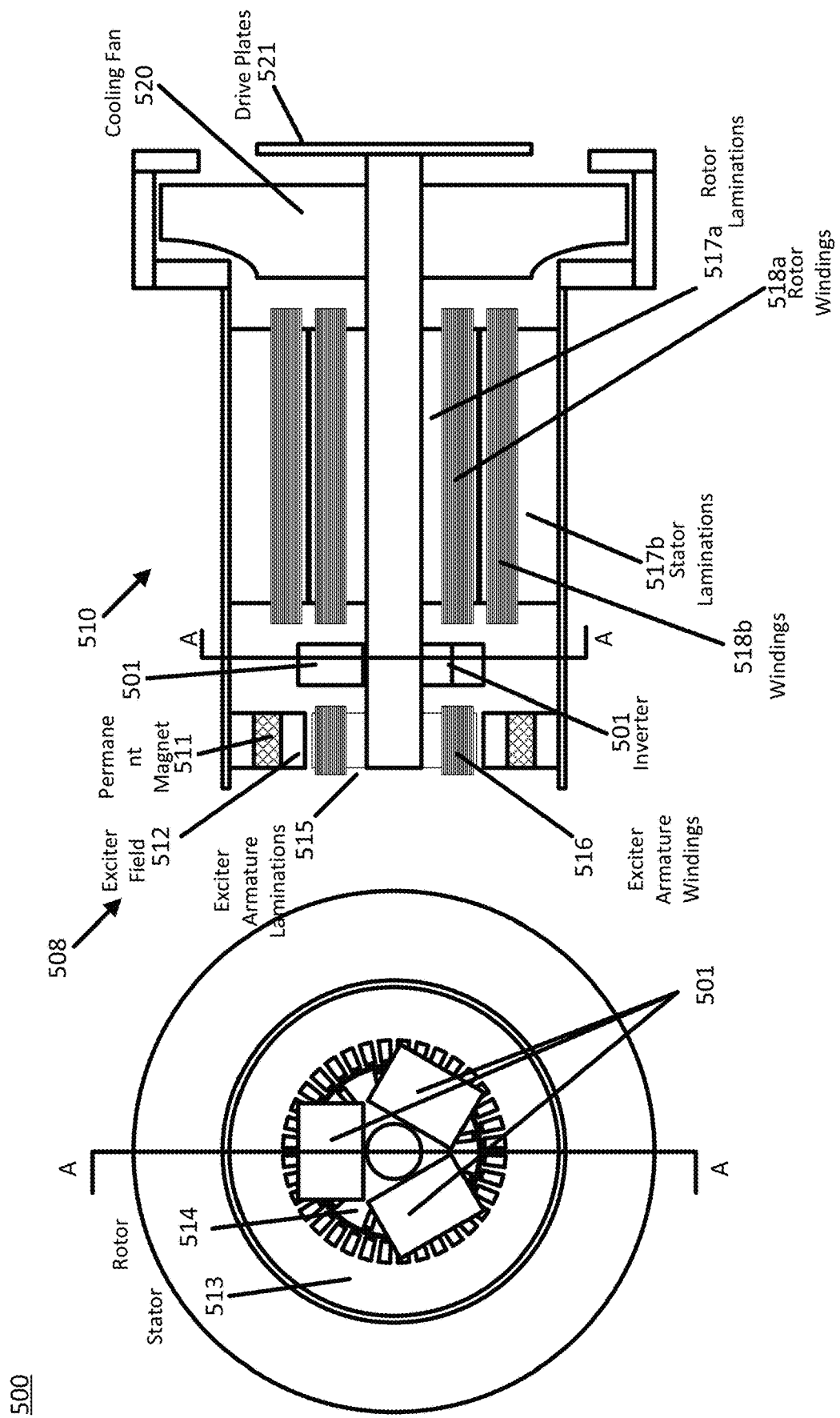
FIG. 55 illustrates an example doubly fed machine using the inverter.

FIG. 55 illustrates a doubly fed machine 500 for the inverter. The doubly fed machine 500 includes an exciter portion 508 and a main generator portion 510. The exciter portion 508 includes permanent magnets 511, an exciter field 512, exciter armature laminations 515, and exciter armature windings 516. The main generator portion 510 includes a stator 513, a rotor 514, rotor laminations 517*a*, stator laminations 517*b*, rotor windings 518*a*, stator windings 518*b*, a cooling fan 520 and drive plates 521. Additional, different, or fewer components may be included.

Cross section A illustrates the relative position of inverters 501, which are mounted to the rotor 514, as a rotating circuit board or rotating inverter package. In this embodiment, the inverters 501 generate a rotating magnetic field and may be referred to as a rotating field generator and/or a magnetic flux sourcing device.

The cooling fan 520 pushes air across the rotor windings 518*a* and stator windings 518*b* to cool the generator. The cooling fan 520 pushes air across the inverters 501 for cooling.

The inverters 501 may each generate a phase for the field current. The inverters 501 may receive a target output frequency and control the field current in order to set the rotating field current. The target output frequency may be set by an internal configuration setting (e.g., stored as a value in memory). The target output frequency may be received from an external device. The inverter 501 may detect the speed of the engine, or calculate the speed of the engine, based on the passing speed of the permanent magnet 511. When the speed of the engine is different that the target output frequency, the inverter 501 may determine a superposition frequency based on the difference. The inverter 501 adjusts the field current according to the superposition frequency to supplement the speed of the engine. By adjusting the field current, the output of the doubly fed machine 500 may vary independently from the speed of the engine. The superposition frequency may be a non-integer multiple of a mechanical frequency of the alternator.

In one example, the engine and alternator may be driven at 1600 rpm. The inverter 501 identifies a target speed of 1800 rpm, which corresponds to a target frequency of 60 Hz for alternator with two poles. The inverter 501 detects that the speed of the alternator is less than the target speed and determines a superposition frequency of 60/9 or 6.66 Hz or superposition speed corresponding to 200 rpm. The inverter 501 generates a field current having the rotating field at the superposition frequency to supplement the alternator. In effect, the supposition frequency is summed with the initial output of the alternator to reach the target frequency.

Figure 56:
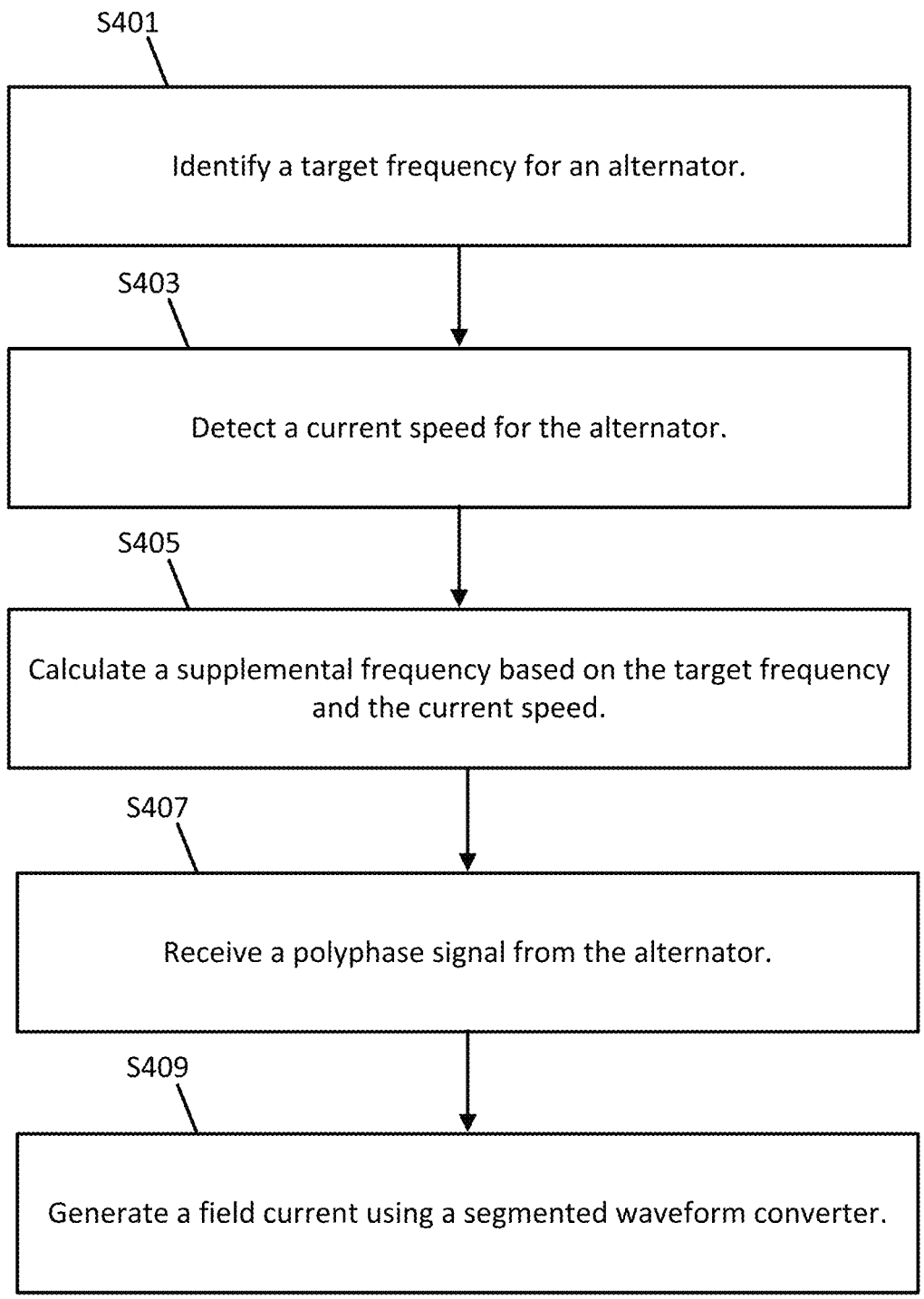
FIG. 56 illustrates an example a flow chart for operating the doubly fed machine.

FIG. 56 illustrates an example a flow chart for operating the inverter circuit using a controller, which may be implemented by the generator controller of FIG. 16. Additional, different or fewer acts may be included.

At act S401, the controller identifies a target frequency for an alternator. The target frequency may be received from a user input. The target frequency may be identified from a switch or jumper in electrical connection to the controller. The target frequency may be received over a network from another device. The target frequency may be adjusted over time.

At act S403, the controller detects a current speed of the alternator. The speed of the alternator may be detected by detecting the movement of the rotor. For example, a magnetic sensor may detect how many times and/or how often a magnet or a coil based the sensor. In another example, the speed of the alternator may be detected from an electric parameter sensor measuring the current or voltage output of the alternator. The speed may be inferred from a control signal that instructs the speed of the engine.

At act S405, the controller calculates a supplemental frequency based on the target speed and the current speed. The controller may calculate a difference speed the absolute value of the difference between the target speed and the current speed. The difference speed is compared to the target speed to calculate a ratio. The ratio is applied to (e.g., multiplied by) the target frequency to calculate a supplemental frequency.

At act S407, the controller receives a poly-phase signal from the alternator. At act S409, the controller generates a field current based on the supplemental frequency. The field current may have a frequency equal to the supplemental frequency. The field current may have a frequency that is a predetermined fraction of the supplemental frequency or a predetermined multiple of the supplemental frequency. The field current may be generated using a segmented waveform converter including the switches connected to the poly-phase signal of the alternator as described in any embodiment herein.

In another embodiment, the synchronous inverter according to any of the previous embodiments may be applied to a generator load banking device. The generator load banking device may be configured to test the generator by applying a load to the generator and dissipating the resultant output of the generator. The load may be select to respond similar to a typical load such as a heater, a motor, refrigeration, lights, or another load.

Figure 57:
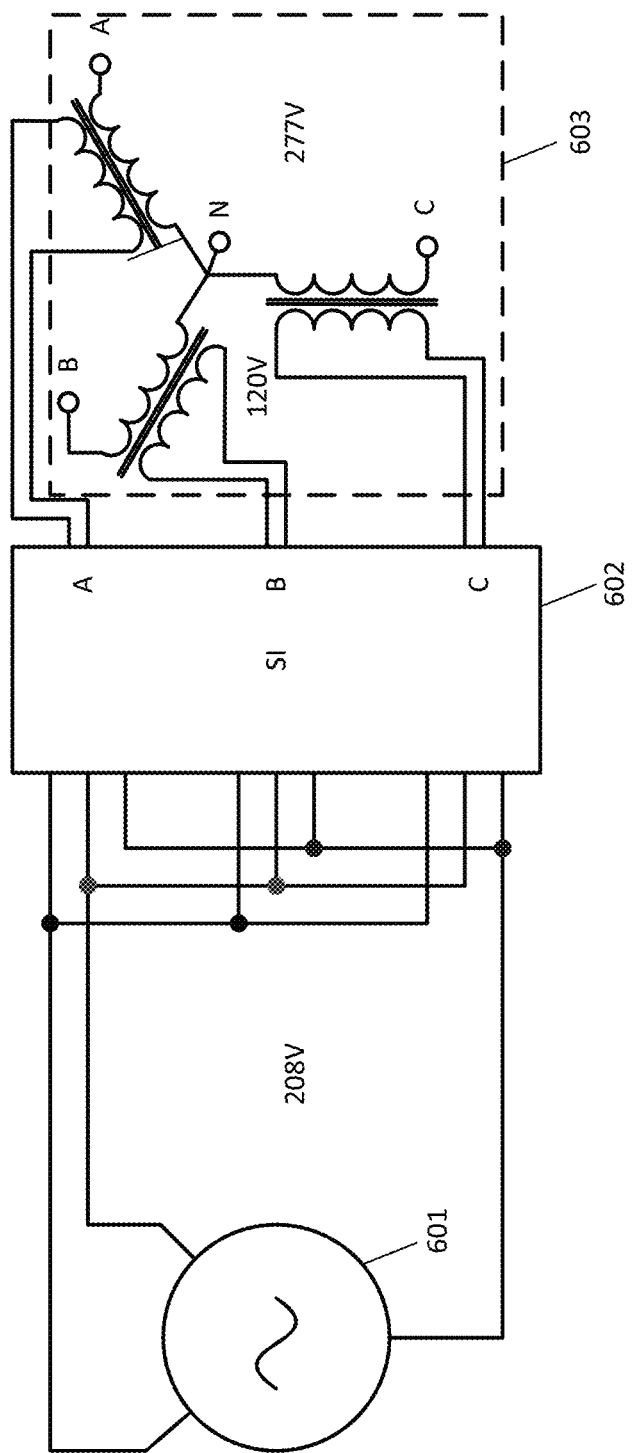
FIG. 57 illustrates a load banking device.

FIG. 57 illustrates a load banking device. The synchronous inverter may be configured to provide load adjustments on a generator load banking device. A load bank is a collection of resistive or reactive elements utilized for testing a generator. Typically, each element has a relay or contactor associated with it to provide control. For example, there may be a set number such as 20 parallel connected resistive elements in a 100 kW load bank of different magnitudes that can be switched on or off to provide load at a desired power level. The desired power level may be 57 kW and require actuating a set number such as 14 of the relays or contactors. If a synchronous inverter is connected between the generator and the load elements, the system may be lower cost and more reliable. Utilizing the synchronous inverter, a single resistive or reactive element can be utilized and leveraged for load selection by adjusting the synchronous inverter output voltage up or down. For example, in a 100 kW load bank at 480V, a single resistive element of 2.3 ohms can be used on each phase. To configure a load of 57 kW, the input to the synchronous inverter from the generator would remain 480V, but the synchronous inverter output would be targeted to 362V into the 2.3 ohm load. This eliminates the cost and complexity of the relays and contactors.

A generator is used to supply power to a building or facility. Loads in a building or facility may include relatively constant loads (e.g. lighting) that do not change over the course of minutes or hours, periodic loads (e.g. refrigeration compressors) that turn on and off over the course of minutes or hours, and non-linear loads (e.g. variable frequency drives) that turn on and off over the course of an electrical cycle. Typically, a load bank is utilized to provide a building equivalent load to the generator that does not change. A load bank is a good representation of a constant load but a poor representation of a periodic or non-linear load. The contactors or relays used to switch elements in and out of the load circuit do not switch fast enough to represent a non-linear load and, being mechanical devices, have a limited number of actuations over the course of their lifetime. The contactors and relays cannot readily be switched to represent a non-linear load and would suffer a short lifespan in representing a periodic load. By utilizing the synchronous inverter between the generator and the load bank, the relays and contactors are eliminated, and the full range of load types may be represented. Further, if the loads in the building are known, the synchronous inverter may be programmed with a load profile that is representative of the building or facility load to load the generator in a more representative fashion, including profiles that provide a worst case plurality of periodic and non-linear loads (e.g. there may be a time when a plurality of loads will turn on simultaneously and look like a single, much larger load to the generator).

A load bank is typically utilized for commissioning testing (before supplying power to a building or facility) or maintenance testing at periodic intervals (e.g. quarterly, annually) of a generator. It is used to load the generator without having a building or facility relying on power from the generator. Typically, this is done with resistive (e.g. resistors) or reactive (e.g. inductors) elements. Using the synchronous inverter, it is possible to use the utility grid to provide a load to the generator and exclude the use of resistive or reactive elements altogether. This may lower the cost and size of a loading apparatus and allow the generator power to be sold to the utility. FIG. 57 shows an example system. FIG. 57 shows a 3 phase generator 601 connected to a synchronous inverter 602. The output of the synchronous inverter 602 feeds the primary side of a 3 phase transformer 603 with isolated windings. The transformer 603 has its secondary side connected to the utility grid. In this example, the nominal voltage output from the generator 601 is 208V line to line, the line to neutral nominal voltage output from the synchronous inverter 602 is 120V, and the line to neutral nominal voltage on the utility is 277V. The synchronous inverter 602 is used as a current phase and current amplitude controlling device to control the amount of power the generator 601 is delivering to the utility; for a given target current, the voltage output from the synchronous inverter 602 is adjusted up or down to respectively increase or decrease load on the generator 601. For example, to have no load on the generator, the synchronous inverter may control current to 0. The voltage observed on the primary side of the transformer 603 would be 120V line-to-neutral, generated by the utility voltage. For example, to have load on the generator 601, the synchronous inverter 602 may increase voltage on the primary side of the transformer 603 until a commanded current output from the generator 601 is reached; this increased voltage may be 122V line to neutral on the primary of transformer 603. The commanded current may incorporate an amplitude and phase element to accommodate both real and reactive power elements.

The processor 300 may include a general processor, digital signal processor, an application specific integrated circuit (ASIC), field programmable gate array (FPGA), analog circuit, digital circuit, combinations thereof, or other now known or later developed processor. The processor 300 may be a single device or combinations of devices, such as associated with a network, distributed processing, or cloud computing.

The memory 352 may be a volatile memory or a non-volatile memory. The memory 352 may include one or more of a read only memory (ROM), random access memory (RAM), a flash memory, an electronic erasable program read only memory (EEPROM), or other type of memory. The memory 352 may be removable from the network device, such as a secure digital (SD) memory card.

In addition to ingress ports and egress ports, the communication interface 303 may include any operable connection. An operable connection may be one in which signals, physical communications, and/or logical communications may be sent and/or received. An operable connection may include a physical interface, an electrical interface, and/or a data interface.

The communication interface 353 may be connected to a network. The network may include wired networks (e.g., Ethernet), wireless networks, or combinations thereof. The wireless network may be a cellular telephone network, an 802.11, 802.16, 802.20, or WiMax network. Further, the network may be a public network, such as the Internet, a private network, such as an intranet, or combinations thereof, and may utilize a variety of networking protocols now available or later developed including, but not limited to TCP/IP based networking protocols.

While the computer-readable medium (e.g., memory 352 or database 357) is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored. The computer-readable medium may be non-transitory, which includes all tangible computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

We claim:

1. An apparatus including:
   a first inverter circuit configured to couple an alternator and a load device to deliver a first driving signal from the alternator to the load device, wherein the alternator is driven by an engine; and
   a second inverter circuit configured to couple the alternator to the load device to deliver a second driving signal from the alternator to the load device and configured to couple a battery to the alternator to deliver a first charging signal from the alternator the battery;
   a third inverter circuit configured to couple the battery to the load device to deliver a second charging signal from the load device to the battery; and
   a fourth inverter circuit configured to couple the battery to the load device to deliver a third driving signal from the battery to the load device,
   a switch operable in a plurality of settings, at least one of the plurality of settings selected to correspond to a selected mode of a plurality of modes for the first inverter circuit, the second inverter circuit, the third inverter circuit, or the fourth inverter circuit,
   wherein the plurality of modes includes a maximum power mode in which the alternator provides power to the load device through the first inverter circuit or the second inverter circuit and the battery provides power to the load device through the third inverter circuit or the fourth inverter circuit.

2. The apparatus of claim 1, wherein the plurality of modes includes a crank while driving mode in which the battery provides power to the load device through the third inverter circuit or the fourth inverter circuit,
   wherein a cranking signal is provided to the alternator through first inverter circuit or the second inverter circuit.

3. The apparatus of claim 1, wherein the plurality of modes includes a regenerative mode in which the load device provides the second charging signal from the load device to the battery through the third inverter circuit or a maximum braking mode in which the load device provides power from the load device to the alternator and from the load device to the battery.

4. The apparatus of claim 1, further comprising:
   a combined package including at least the first inverter circuit and the second inverter circuit.

5. An apparatus including:
   a first inverter circuit configured to couple an alternator and a load device to deliver a first driving signal from the alternator to the load device, wherein the alternator is driven by an engine; and
   a second inverter circuit configured to couple the alternator to the load device to deliver a driving signal from the alternator to the load device and configured to couple a battery to the alternator to deliver a first charging signal from the alternator the battery;
   a third inverter circuit configured to couple the battery to the load device to deliver a second charging signal from the load device to the battery; and
   a fourth inverter circuit configured to couple the battery to the load device to deliver a second driving signal from the battery to the load device,
   wherein the first inverter circuit, the second inverter circuit, the third inverter circuit, and the fourth inverter circuit are operable in a plurality of modes,
   wherein the plurality of modes includes a maximum power mode in which the alternator provides power to the load device through the first inverter circuit or the second inverter circuit and the battery provides power to the load device through the third inverter circuit or the fourth inverter circuit.

6. The apparatus of claim 5, further comprising:
   a switch configured to connect the load device to the alternator via the second inverter circuit in a first setting and connect the battery to the load device via the second inverter circuit in a second setting.

7. The apparatus of claim 6, wherein current flows through the second inverter circuit when the switch is in the first setting and when the switch is in the second setting.

8. The apparatus of claim 5, wherein the first charging signal comprises an alternating current.

9. The apparatus of claim 5, further comprising:
   a combined package including at least the first inverter circuit and the second inverter circuit.

10. The apparatus of claim 5, wherein the plurality of modes includes a battery mode in which only the battery provides power to the load device through the second inverter circuit or the fourth inverter circuit.

11. The apparatus of claim 10, wherein the engine is off during the battery mode.

12. An apparatus including:
    a first inverter circuit configured to couple an alternator and a load device to deliver a first driving signal from the alternator to the load device, wherein the alternator is driven by an engine; and
    a second inverter circuit configured to couple the alternator to the load device to deliver a second driving signal from the alternator to the load device and configured to couple a battery to the alternator to deliver a first charging signal from the alternator the battery;
    a third inverter circuit configured to couple the battery to the load device to deliver a second charging signal from the load device to the battery; and
    a fourth inverter circuit configured to couple the battery to the load device to deliver a third driving signal from the battery to the load device, a switch operable in a plurality of settings, at least one of the plurality of settings selected to correspond to a selected mode of a plurality of modes for the first inverter circuit, the second inverter circuit, the third inverter circuit, or the fourth inverter circuit, wherein the plurality of modes includes a crank while driving mode in which the battery provides power to the load device through the third inverter circuit or the fourth inverter circuit, wherein a cranking signal is provided to the alternator through first inverter circuit or the second inverter circuit.

13. The apparatus of claim 12, wherein the plurality of modes includes a battery mode in which only the battery provides power to the load device through the second inverter circuit or the fourth inverter circuit.

14. The apparatus of claim 13, wherein the engine is off during the battery mode.

15. The apparatus of claim 12, wherein the plurality of modes includes an engine mode in which the alternator provides power to the load device through the first inverter circuit, the second inverter circuit, or the third inverter circuit.

16. The apparatus of claim 15, wherein the battery is charged from the load device through the fourth inverter circuit during the engine mode.

17. The apparatus of claim 12, wherein the plurality of modes includes a maximum power mode in which the alternator provides power to the load device through the first inverter circuit or the second inverter circuit and the battery provides power to the load device through the third inverter circuit or the fourth inverter circuit.

18. The apparatus of claim 12, wherein the plurality of modes includes a regenerative mode in which the load device provides the second charging signal from the load device to the battery through the third inverter circuit or a maximum braking mode in which the load device provides power from the load device to the alternator and from the load device to the battery.

19. The apparatus of claim 12, wherein the second charging signal comprises an alternating current.

20. The apparatus of claim 12, further comprising:
a combined package including at least the first inverter circuit and the second inverter circuit.

* * * * *